United States Patent
Olson

(10) Patent No.: US 12,089,537 B2
(45) Date of Patent: Sep. 17, 2024

(54) TRACK DRIVEN SWEEP SYSTEM FOR GRAIN BINS

(71) Applicant: Sukup Manufacturing Co., Sheffield, IA (US)

(72) Inventor: Ryan Thomas Olson, Dows, IA (US)

(73) Assignee: SUKUP MANUFACTURING CO., Sheffield, IA (US)

( * ) Notice: Subject to any disclaimer, the term of this patent is extended or adjusted under 35 U.S.C. 154(b) by 0 days.

(21) Appl. No.: 17/960,491

(22) Filed: Oct. 5, 2022

(65) Prior Publication Data

US 2023/0172112 A1 Jun. 8, 2023

Related U.S. Application Data

(60) Provisional application No. 63/253,161, filed on Oct. 7, 2021.

(51) Int. Cl.
*B65G 65/48* (2006.01)
*A01F 25/18* (2006.01)

(52) U.S. Cl.
CPC ........ *A01F 25/186* (2013.01); *B65G 65/4836* (2013.01)

(58) Field of Classification Search
CPC ............ B65G 65/4836; B65G 65/4845; B65G 68/4854; B65G 65/4863
See application file for complete search history.

(56) References Cited

U.S. PATENT DOCUMENTS

| | | |
|---|---|---|
| 2,998,123 A | 8/1961 | Kooiker et al. |
| 3,014,575 A | 12/1961 | Klein |
| 3,057,608 A | 10/1962 | Patz |
| 3,064,831 A | 11/1962 | Cook |
| 3,151,749 A | 10/1964 | Long |
| 3,175,676 A | 3/1965 | Vander Schaaf |

(Continued)

FOREIGN PATENT DOCUMENTS

JP 63074821 A * 4/1988

OTHER PUBLICATIONS

Brock, 16:1 Reduction Wheel Upgrade Kit S055938 for Bin Sweeps, All pages, Oct. 2016, Milford Indiana.

(Continued)

*Primary Examiner* — Joseph A Dillon, Jr.
(74) *Attorney, Agent, or Firm* — BrownWinick Law Firm; Christopher A. Proskey

(57) ABSTRACT

A sweep system is presented for a grain bin. The sweep system includes an elongated body extending a length between an inward end and an outward end and having a leading side and a trailing side. The elongated body is connected to a pivot point at the center of the grain bin and is configured to rotate around the pivot point. In one or more embodiments, a tail section of the sweep system is located as the outward end of the elongated body. In one or more arrangements, a track-driven drive system is positioned in the tail section. The track-driven drive system has a continuous track formed by a continuous chain and a plurality of paddles connected thereto. The track-driven drive system is configured to move the outward end of the elongated housing around the grain bin thereby facilitating emptying of grain from the grain bin by the sweep system.

26 Claims, 73 Drawing Sheets

(56) References Cited

U.S. PATENT DOCUMENTS

| | | | |
|---|---|---|---|
| 3,356,235 A * | 12/1967 | Laidig | A01F 25/2018 414/311 |
| 3,394,825 A * | 7/1968 | Reed | A01F 25/2018 198/606 |
| 3,532,232 A * | 10/1970 | Sukup | A01F 25/20 414/287 |
| 3,538,618 A | 11/1970 | Neuenschwander | |
| 3,648,660 A | 3/1972 | Wennberg | |
| 3,749,259 A | 7/1973 | Stock | |
| 3,755,917 A * | 9/1973 | Lambert, Jr. | F26B 9/10 34/236 |
| 3,800,964 A | 4/1974 | Patterson | |
| 3,851,774 A | 12/1974 | Laidig | |
| 3,974,908 A * | 8/1976 | Keichinger | B65G 65/40 198/594 |
| 4,008,816 A | 2/1977 | Harrison | |
| 4,029,219 A * | 6/1977 | Rutten | B65G 65/466 414/308 |
| 4,057,151 A * | 11/1977 | Weaver | A01F 25/2018 414/311 |
| 4,063,654 A | 12/1977 | Shivvers | |
| 4,103,788 A | 8/1978 | Sutton | |
| 4,142,621 A | 3/1979 | Oliver | |
| 4,183,706 A | 1/1980 | Jackson | |
| 4,286,909 A * | 9/1981 | Tingskog | B65G 65/463 414/142.5 |
| 4,578,012 A * | 3/1986 | Petit | B65G 65/4836 222/236 |
| 4,583,903 A | 4/1986 | Hutchison | |
| 4,585,385 A * | 4/1986 | Buschbom | B65G 65/466 198/813 |
| 4,701,093 A * | 10/1987 | Meyer | B65G 65/466 414/326 |
| 5,099,983 A | 3/1992 | Valdez | |
| 5,167,318 A * | 12/1992 | Siemens | B65G 65/466 414/311 |
| 5,988,358 A | 11/1999 | Jonkka | |
| 6,431,810 B1 | 8/2002 | Weaver | |
| 6,499,930 B1 | 12/2002 | Dixon | |
| 8,210,342 B2 * | 7/2012 | Lepp | B65G 65/466 198/801 |
| 8,616,823 B1 | 12/2013 | Hoogestraat | |
| 8,739,479 B1 | 6/2014 | Nelson et al. | |
| 8,770,388 B1 | 7/2014 | Chaon | |
| 8,850,758 B1 | 10/2014 | Nelson et al. | |
| 8,959,846 B2 | 2/2015 | Polzin et al. | |
| 8,967,936 B2 * | 3/2015 | Sukup | B65G 65/46 414/311 |
| 8,967,937 B2 | 3/2015 | Schuelke et al. | |
| 9,055,717 B2 | 6/2015 | Stumpe et al. | |
| 9,137,950 B1 | 9/2015 | Stumpe et al. | |
| 9,156,622 B1 | 10/2015 | Chaon | |
| 9,199,807 B1 | 12/2015 | Schuelke | |
| 9,288,946 B1 * | 3/2016 | Schuld | A01F 25/2018 |
| 9,290,335 B1 | 3/2016 | Witt et al. | |
| 9,327,921 B1 | 5/2016 | Olson | |
| 9,546,055 B2 | 1/2017 | Hoogestraat | |
| 9,650,217 B1 | 5/2017 | Hoogestraat | |
| 9,809,402 B2 | 11/2017 | Nelson et al. | |
| 9,815,639 B2 | 11/2017 | Schuelke et al. | |
| 9,864,344 B2 | 1/2018 | Nelson et al. | |
| 9,975,711 B2 | 5/2018 | Nelson | |
| 10,011,442 B2 | 7/2018 | Witt | |
| 10,214,361 B2 | 2/2019 | Kaeh | |
| 10,220,420 B2 | 3/2019 | Witt | |
| 10,220,968 B2 | 3/2019 | Stumpe et al. | |
| 10,227,188 B1 * | 3/2019 | Chaon | B65G 65/4881 |
| 10,377,573 B2 | 8/2019 | Olson | |
| 10,442,641 B2 | 10/2019 | Nelson et al. | |
| 10,654,668 B2 * | 5/2020 | Olson | A01F 25/2018 |
| 10,676,294 B2 | 6/2020 | Harrenstein et al. | |
| 10,703,588 B1 | 7/2020 | Schram et al. | |
| 10,836,582 B2 | 11/2020 | Olson | |
| 11,104,528 B1 | 8/2021 | Bloemendaal et al. | |
| 11,111,080 B2 * | 9/2021 | Rauser | B65G 33/32 |
| 11,136,205 B2 * | 10/2021 | Gutwein | B65G 65/466 |
| 11,267,664 B1 | 3/2022 | Bloemendaal | |
| 11,299,358 B1 | 4/2022 | Grass et al. | |
| 11,337,374 B2 * | 5/2022 | Olson | B65G 65/42 |
| 11,454,444 B1 | 9/2022 | Bloemendaal | |
| 11,608,236 B2 * | 3/2023 | Olson | B65G 65/463 |
| 11,618,639 B1 | 4/2023 | Grass et al. | |
| 11,623,829 B2 * | 4/2023 | Bloemendaal | B65G 65/466 414/217 |
| 11,708,227 B2 * | 7/2023 | Olson | A01F 25/2018 414/310 |
| 2004/0213650 A1 | 10/2004 | Epp | |
| 2004/0228711 A1 * | 11/2004 | Hanig | B65G 65/466 414/326 |
| 2005/0263372 A1 | 12/2005 | Hollander | |
| 2012/0163947 A1 * | 6/2012 | Koch | B65G 65/466 414/307 |
| 2013/0064629 A1 * | 3/2013 | Schuelke | B65G 65/28 414/327 |
| 2015/0210485 A1 * | 7/2015 | Hoogestraat | B65G 65/4836 414/808 |
| 2016/0152422 A1 * | 6/2016 | Nelson | B65G 65/425 414/306 |
| 2017/0158443 A1 | 6/2017 | Harrenstein | |
| 2017/0275100 A1 | 9/2017 | Olson | |
| 2018/0215559 A1 | 8/2018 | Olson | |
| 2018/0237236 A1 * | 8/2018 | Klubertanz | B65G 69/08 |
| 2019/0322457 A1 | 10/2019 | Olson | |
| 2020/0290826 A1 | 9/2020 | Gutwein | |
| 2020/0361726 A1 | 11/2020 | Olson | |
| 2021/0051856 A1 | 2/2021 | Olson | |
| 2022/0250861 A1 | 8/2022 | Olson | |

OTHER PUBLICATIONS

Haven Industries, Grain Saver Augers, Brochure, All pages, Jan. 1, 2015, Dexter Minnesota.
Westeel, Easyflow 2 U-Through Unload, Brochure, All pages, Jan. 1, 2015, Winnepeg Manitoba, Canada.
Sioux Steel Company, Newest Sweep Model, Brouchure, All pages, Jan. 1, 2015, Sioux Falls South Dakota.
Hutchinson, New Sweep End Wheel, Brochure, All pages, Jan. 1, 2015, Clay Center Kansas.
Springland Mfg., Automated U-Through Unload Systems, Brochure, All pages, Jan. 1, 2015, Manitoba Canada.
Norstar Industries, Grain Handling Systems, Brochure, All pages, Jan. 1, 2015, Morris Manitoba, Canada.
Brock, Bin sweeps, Brochure, All pages, Jan. 1, 2015, Milford Indiana.
Gsi Group, Bin Unloading Systems, Brochure, All pages, Jan. 1, 2015, Assumption Illinois.
Sudenga Industries, Inc., Reduction Sweep Wheel, Brochure, All pages, Jan. 1, 2015, George Iowa.
Neco, Power Sweep Bin Unloading Systems, Brochure, All pages, Jan. 1, 2015, Omaha Nebraska.
Norwood Sales Inc., The Grain Handler, Website screenshots, All pages, Jan. 1, 2015, Horace North Dakota.
Sukup, Zero Entry Paddle Sweep, All pages, Sheffield Iowa.
Sukup, Unloading Equipment, All pages, Sheffield Iowa.
United Skid Tracks, Caterpillar 249B Track-Z-Lug, Oct. 4, 2021, Murfreesboro, TN, United States.
United Skid Tracks, Caterpillar Mini Excavators, Caterpillar Tracks, Oct. 4, 2021, Murfreesboro, TN, United States.
Brock Grain Systems, Commercial Bin Sweeps & Controllers, Sep. 30, 2021, Milford, IN, United States.

* cited by examiner

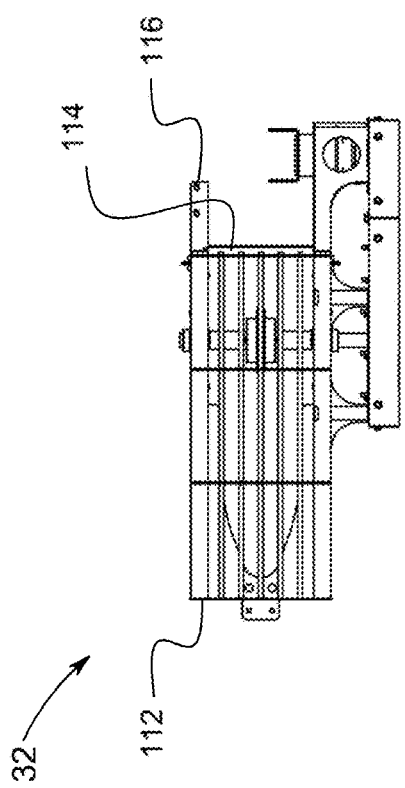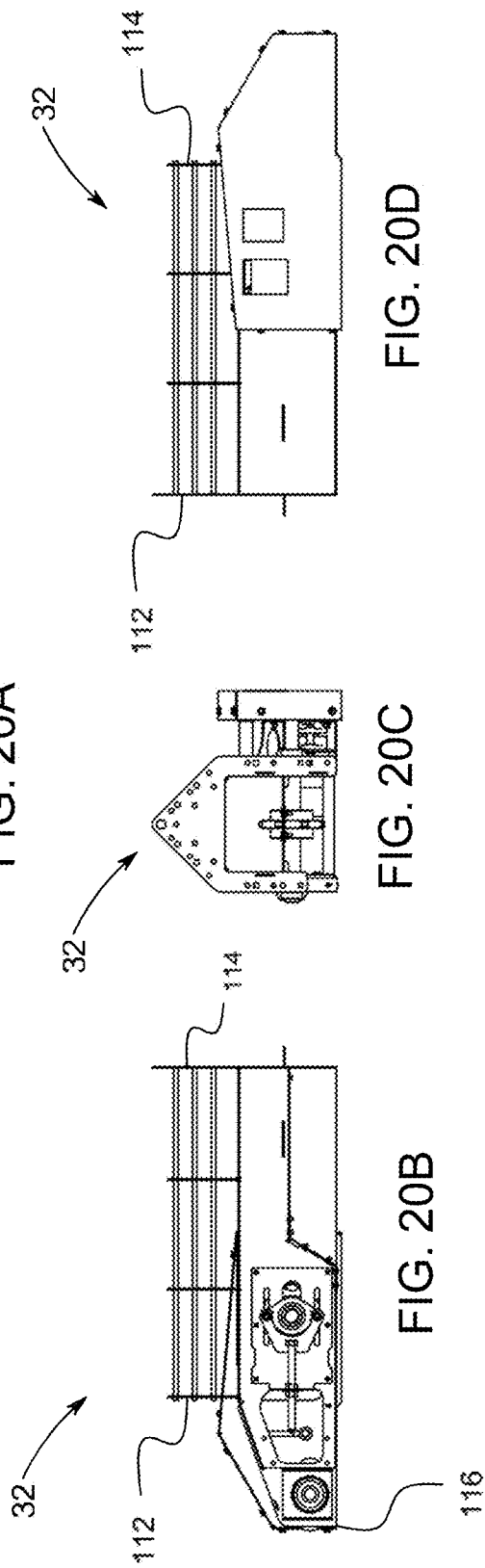

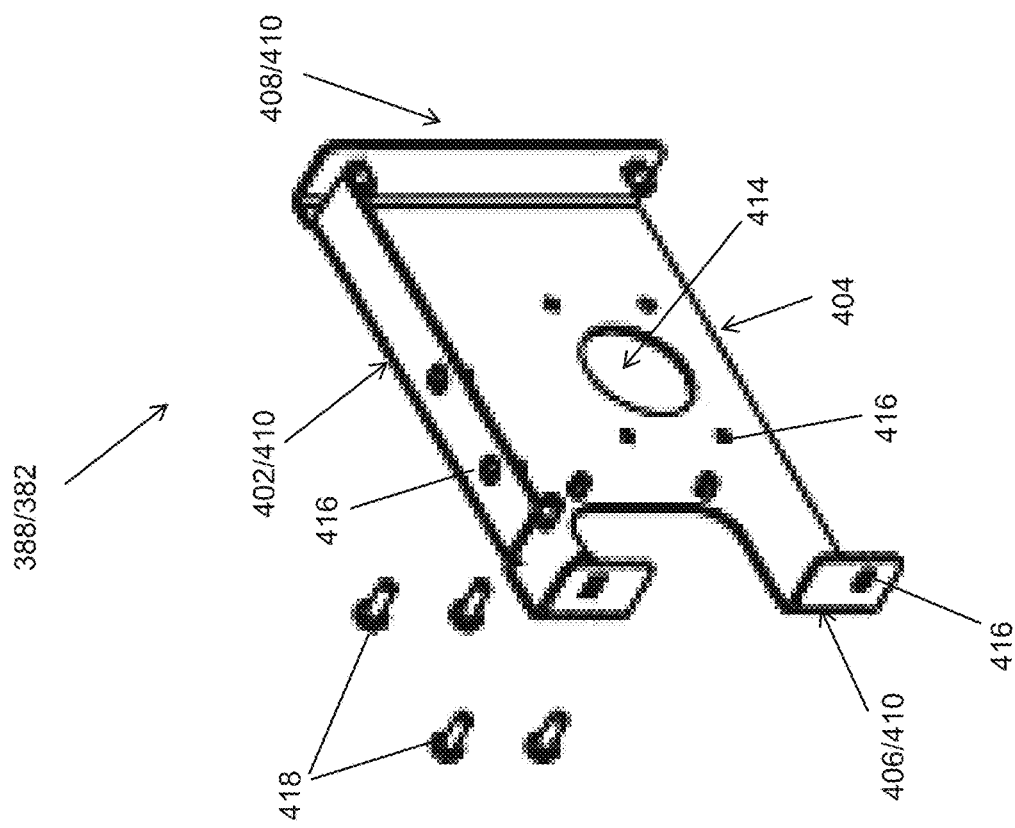
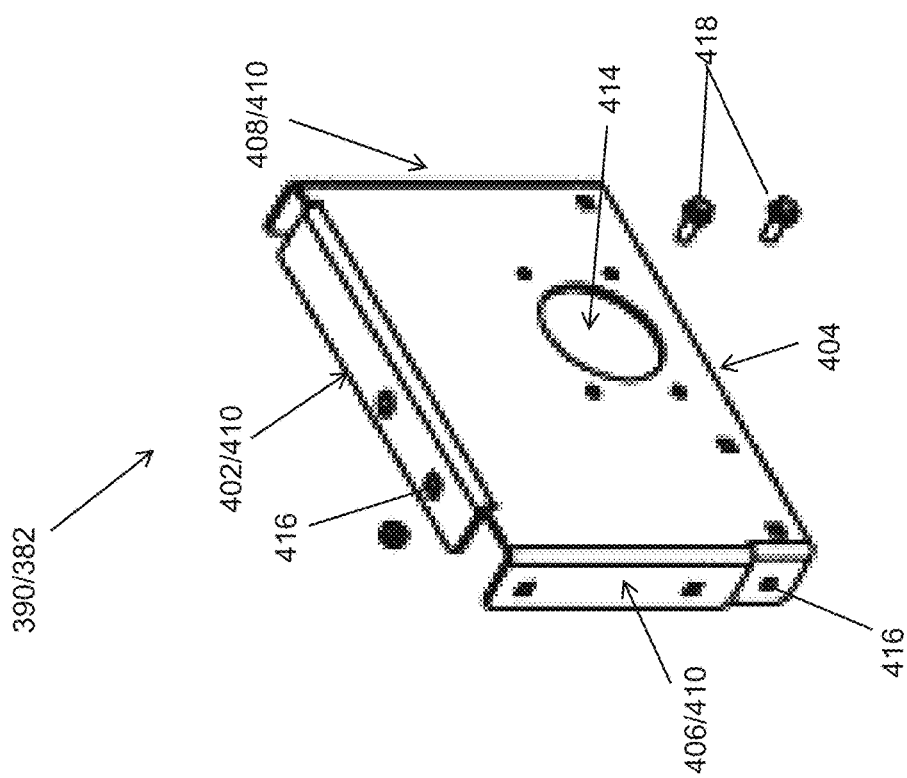
FIG. 25

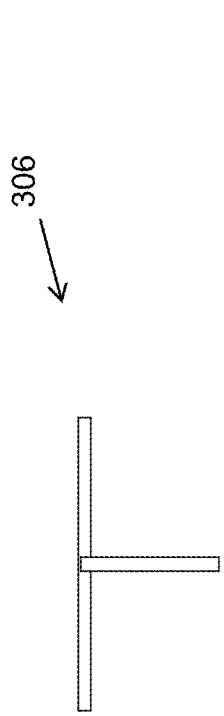
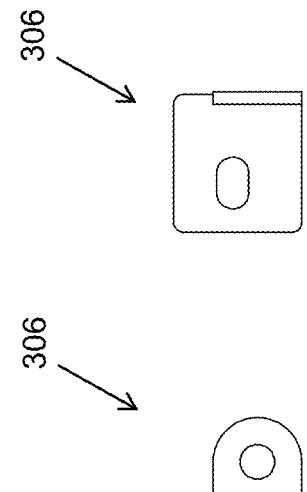
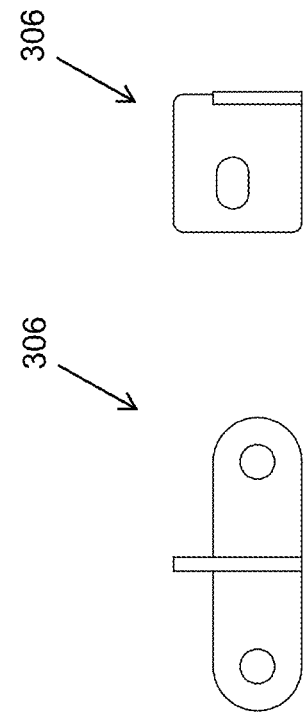
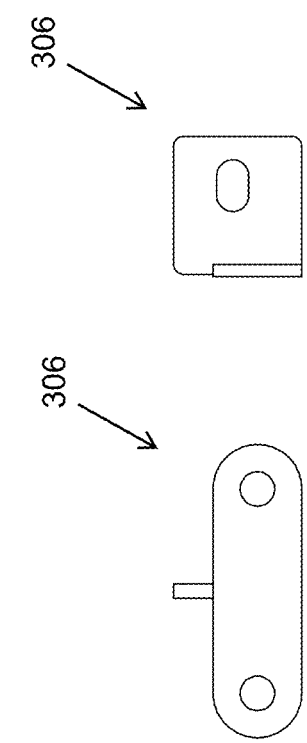
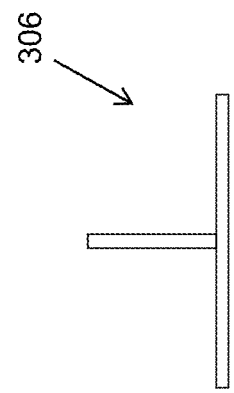
FIG. 53A  FIG. 53B  FIG. 53C  FIG. 53D  FIG. 53E  FIG. 53F

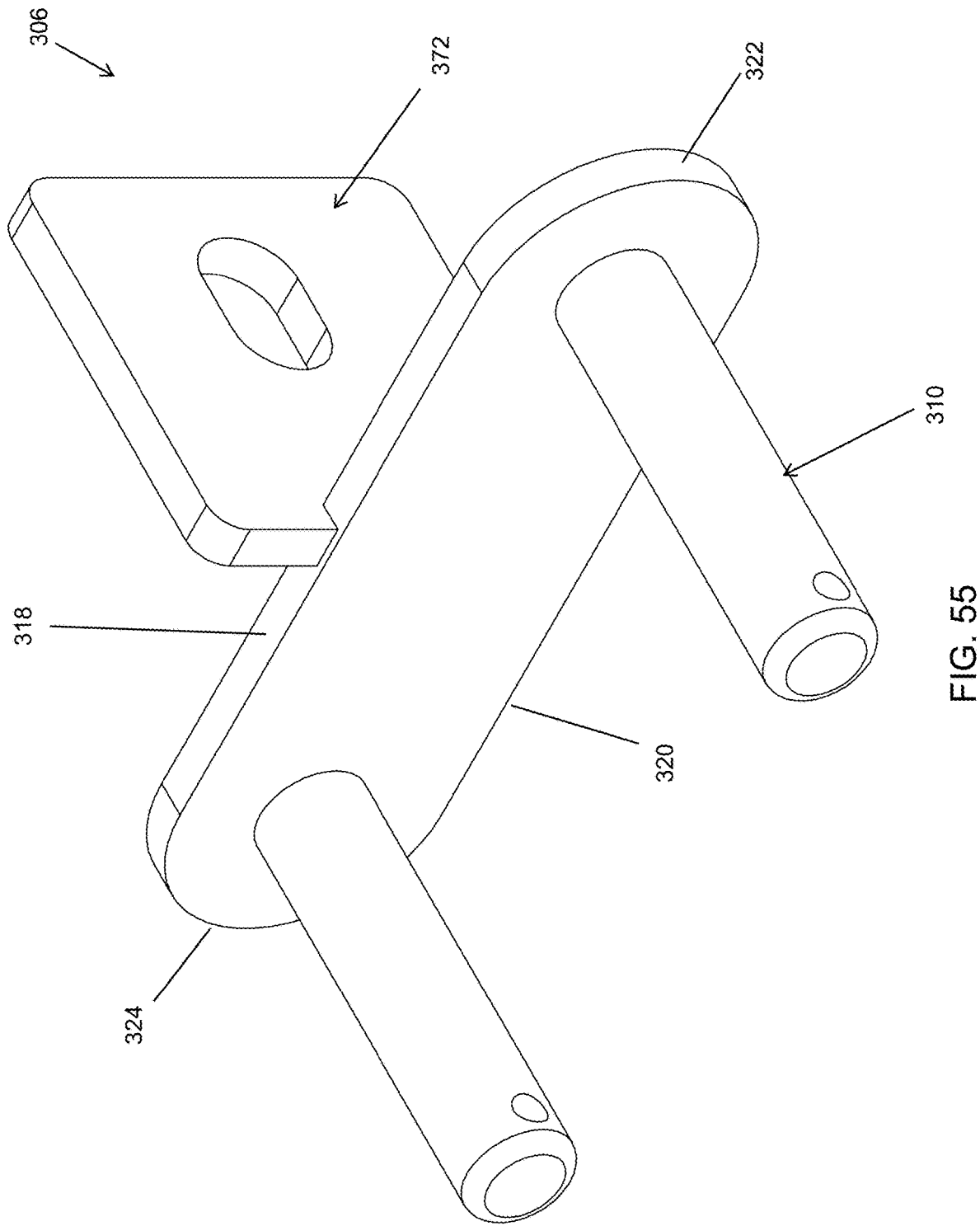

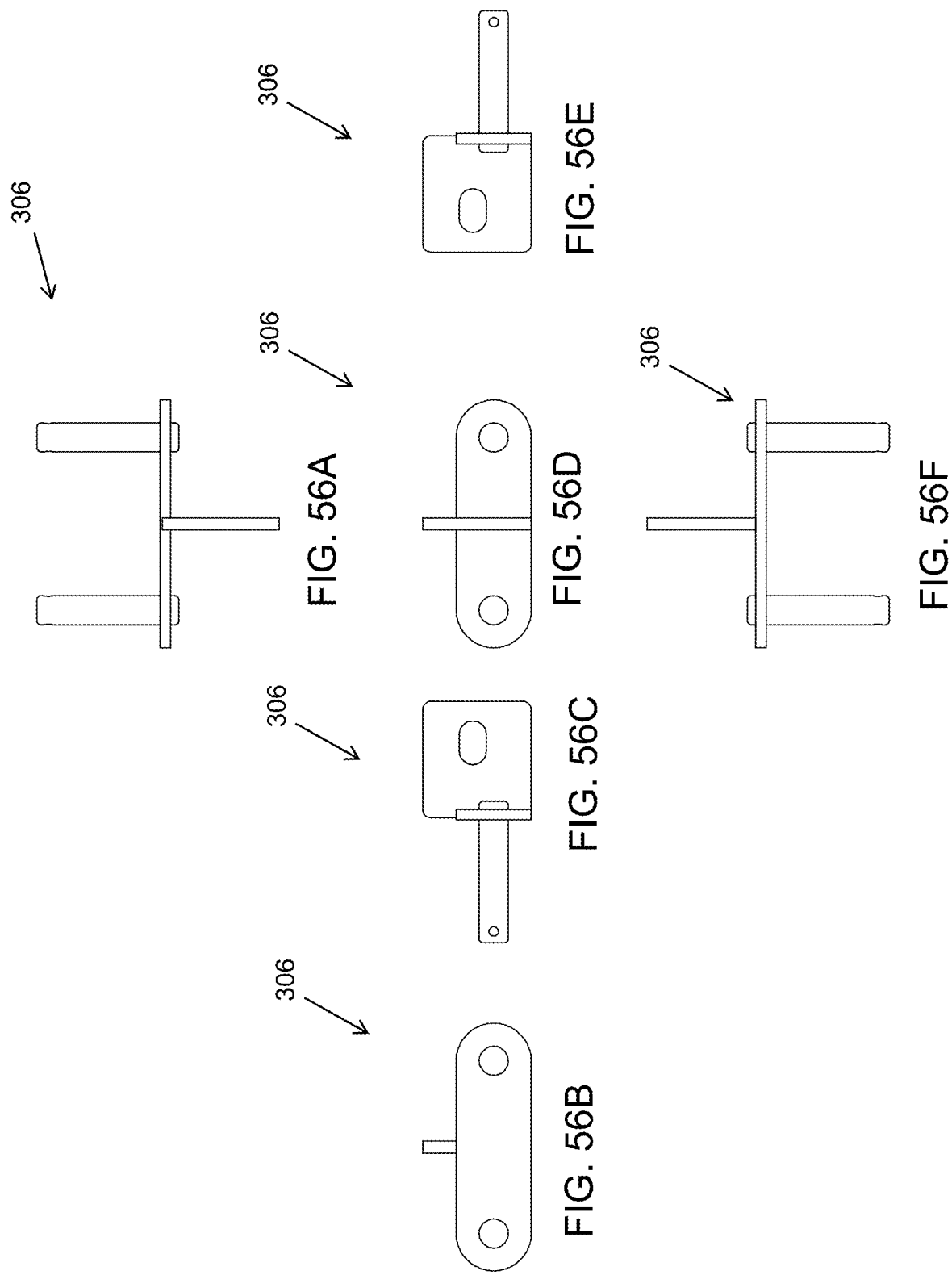

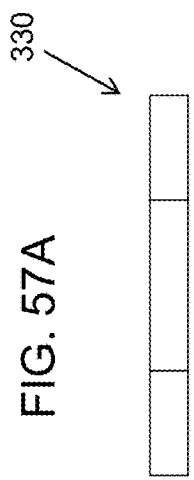
FIG. 57A
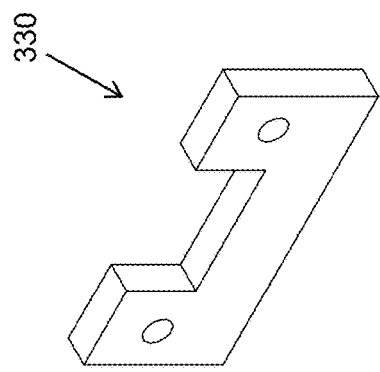
FIG. 57B
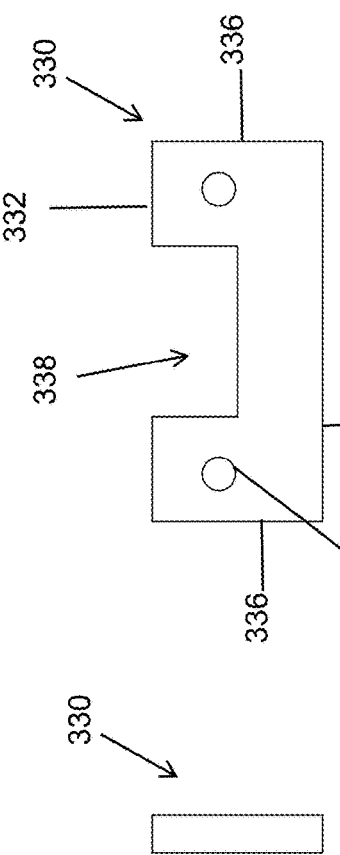
FIG. 57D
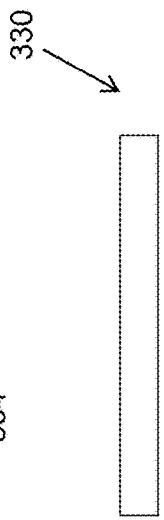
FIG. 57E
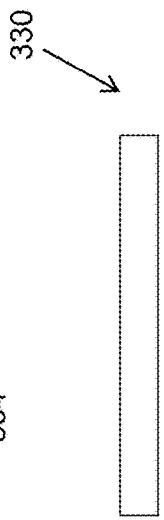
FIG. 57F
FIG. 57C

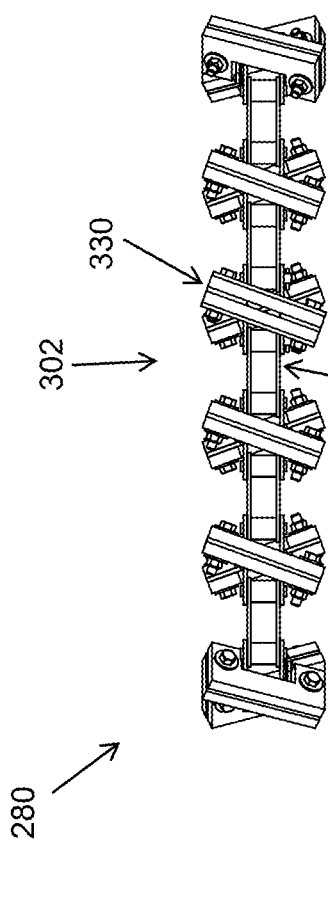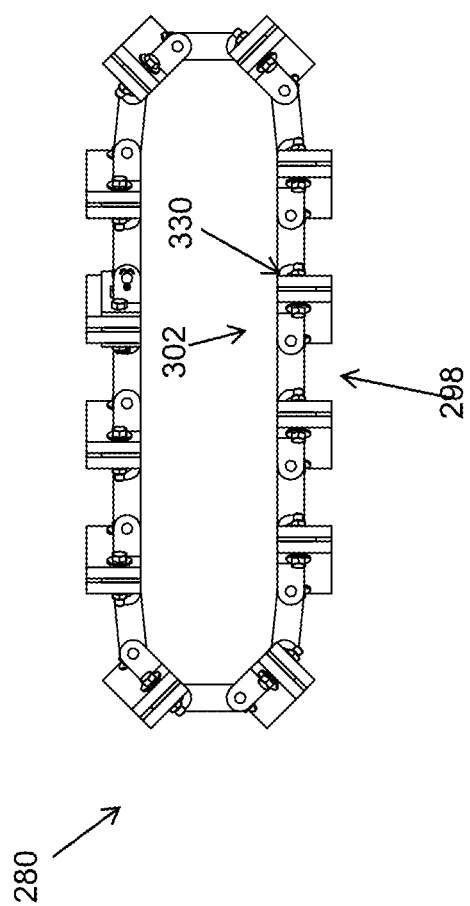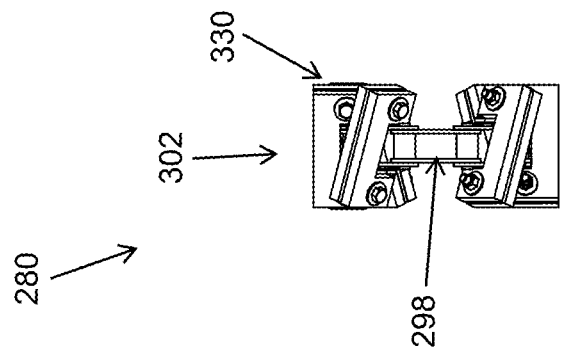

TRACK DRIVEN SWEEP SYSTEM FOR GRAIN BINS

CROSS REFERENCE TO RELATED APPLICATIONS

This application is related to U.S. Patent Application Publication 2021/0051856 published Feb. 25, 2021 and titled "SWEEP SYSTEM FOR FULL ELEVATED FLOOR GRAIN BINS", which claims priority to U.S. Provisional Application No. 62/889,370 filed Aug. 20, 2019 and titled "SWEEP SYSTEM FOR FULL ELEVATED FLOOR GRAIN BINS", the entirety of each of which is hereby fully incorporated by reference herein.

The present application claims priority to U.S. Provisional Application 63/253,161, titled TRACK DRIVEN SWEEP SYSTEM FOR GRAIN BINS, and filed on Oct. 7, 2021, the entirety of which is hereby incorporated by reference herein, including any figures, tables, drawings, or other information.

FIELD OF THE DISCLOSURE

This disclosure relates to grain storage devices used in agriculture. More specifically and without limitation, this disclosure relates to a sweep system for full elevated floor grain bins.

OVERVIEW OF THE DISCLOSURE

Grain bins are massive structures used to store bulk flowable grain products such as corn, soybeans, wheat, rice, and/or any other grain products or other material. Conventional grain bins are generally formed in a cylindrical shape with a corrugated sidewall covered by a peaked roof. Grain bins vary in height (ranging from twenty feet high to over a hundred and fifty feet high, or higher). Grain bins vary in diameter, (ranging from eighteen feet in diameter to over a hundred and fifty feet in diameter, or larger). The storage capacity of modern grain bins can range anywhere from a few thousand bushels to well over two million bushels.

Smaller grain bins tend to have an elevated floor formed of a plurality of planks that are supported by a plurality of floor supports that are positioned in spaced alignment to one another. These floor supports rest upon the foundation of the grain bin, which is typically a concrete slab, and provide support to the elevated floor. The space formed between the foundation and the elevated floor facilitates airflow below the elevated floor. Air blown into this space below the elevated floor passes through perforations in the planks of the elevated floor and through the grain stored in the grain bin. In this way, grain stored within the grain bin is conditioned using air flow through the grain. The use of the elevated floor provides many advantages.

Using an elevated floor for larger grain bins becomes problematic due to the immense weight of the grain stored within larger grain bins. As such, in many larger grain bins, the grain sits directly upon the concrete slab that forms the foundation of the grain bin. This arrangement provides the benefit of being strong and rigid. However, this arrangement lacks some of the benefits of an elevated floor, such as airflow through the floor and room beneath the floor for various components.

Grain bins may be unloaded in various ways. Many grain bins include a generally centrally positioned sump that facilitates removal of grain from the grain bin. While this configuration is effective at removing most of the grain from a grain bin, using a centrally positioned sump alone leaves a coned ring of grain that cannot be removed by a centrally positioned sump alone.

To avoid manually shoveling this coned ring of grain out of the grain bin, in many applications, sweeps are used. Sweeps travel around the grain bin and help to move grain towards the centrally positioned sump so that the grain may be removed by the sump. In many applications, temporary sweeps are used.

Temporary sweeps require the user to manually install the sweep into the grain bin when the sweep is to be used. Temporary sweeps also require the user to manually remove the sweep after use. Installing and removing a temporary sweep is an undesirable, tedious, difficult and dangerous task. To avoid manually installing and manually removing temporary sweeps, various configurations of "zero entry sweeps" have been developed.

Zero entry sweeps are configured to remain in the grain bin when it is filled thereby eliminating the need to enter the grain bin to install or remove the sweep from the grain bin. Hence the name "zero entry" as users are not required to enter the grain bin. While zero entry sweeps provide a number of advantages, there are a number of challenges associated with the use of zero entry sweeps. These challenges are exasperated when attempting to provide a zero entry sweep with a grain bin having an elevated floor. This is especially true for larger grain bins that require larger sweeps.

Therefore, for all the reasons stated above, and all the reasons stated below, there is a need in the art for an improved sweep system for full elevated floor grain bins.

Thus, it is a primary object of the disclosure to provide a sweep system for full elevated floor grain bins that improves upon the state of the art.

Another object of the disclosure is to provide a sweep system for full elevated floor grain bins that utilizes a track-driven drive system to facilitate movement of a sweep.

Yet another object of the disclosure is to provide a sweep system for full elevated floor grain bins that utilizes a track-driven drive system having a continuous track.

Another object of the disclosure is to provide a sweep system for full elevated floor grain bins that utilizes a track-driven drive system having a continuous track with paddles attached thereto.

Another object of the disclosure is to provide a sweep system for full elevated floor grain bins that reduces or eliminates the need for a user to enter the grain bin.

Yet another object of the disclosure is to provide a sweep system for full elevated floor grain bins that works effectively.

Another object of the disclosure is to provide a sweep system for full elevated floor grain bins that is robust.

Yet another object of the disclosure is to provide a sweep system for full elevated floor grain bins that is durable.

Another object of the disclosure is to provide a sweep system for full elevated floor grain bins that can be used with all kinds of grain.

Yet another object of the disclosure is to provide a sweep system for full elevated floor grain bins that has a long useful life.

Another object of the disclosure is to provide a sweep system for full elevated floor grain bins that can be used with an elevated floor without damaging the elevated floor.

Yet another object of the disclosure is to provide a sweep system for full elevated floor grain bins that can be used with paddle sweeps, auger sweeps, and/or any other sweep mechanism.

Another object of the disclosure is to provide a sweep system for full elevated floor grain bins that effectively removes the vast majority of grain from the grain bin.

Yet another object of the disclosure is to provide a sweep system for full elevated floor grain bins that is efficient to use.

Another object of the disclosure is to provide a sweep system for full elevated floor grain bins that improves safety.

Yet another object of the disclosure is to provide a sweep system for full elevated floor grain bins that is high quality.

Another object of the disclosure is to provide a sweep system for full elevated floor grain bins that helps to clear clumps in the grain.

These and other objects, features, or advantages of the disclosure will become apparent from the specification, figures and claims.

SUMMARY OF THE DISCLOSURE

A sweep system for a grain bin having a concrete slab and an elevated floor supported by a plurality of floor supports. The sweep system having an elongated body extending a length between an inward end and an outward end and having a leading side and a trailing side. The elongated body is connected to a pivot point at the center of the grain bin and is configured to rotate around the pivot point. In one or more embodiments, a tail section of the sweep system is located as the outward end of the elongated body. In one or more arrangements, a track-driven drive system is positioned in the tail section. The track-driven drive system has a continuous track formed by a continuous chain and a plurality of paddles connected thereto. The track-driven drive system is configured to move the outward end of the elongated housing around the grain bin thereby facilitating emptying of grain from the grain bin by the sweep system.

BRIEF DESCRIPTION OF THE DRAWINGS

FIG. 20A shows a top view of the skeletonized head section of a sweep, in accordance with one or more embodiments.

FIG. 20B shows a front view of the skeletonized head section of a sweep, in accordance with one or more embodiments.

FIG. 20C shows a side view of the skeletonized head section of a sweep, in accordance with one or more embodiments.

FIG. 20D shows a rear view of the skeletonized head section of a sweep, in accordance with one or more embodiments.

FIG. 25 shows an exploded view of the housing of a sweep of an exemplary sweep system, in accordance with one or more embodiments; the view showing the housing having an inner side bracket, an outer side bracket, and fasteners.

FIG. 53A shows a top elevation view of the components of the outer plate of the chain of the continuous track, in accordance with one or more embodiments.

FIG. 53B shows a back elevation view of the components of the outer plate of the chain of the continuous track, in accordance with one or more embodiments.

FIG. 53C shows a right elevation view of the components of the outer plate of the chain of the continuous track, in accordance with one or more embodiments.

FIG. 53D shows a front elevation view of the components of the outer plate of the chain of the continuous track, in accordance with one or more embodiments.

FIG. 53E shows a left elevation view of the components of the outer plate of the chain of the continuous track, in accordance with one or more embodiments.

FIG. 53F shows a bottom elevation view of the components of the outer plate of the chain of the continuous track, in accordance with one or more embodiments.

FIG. 55 shows a close up front perspective view of the outer plate of the chain of the continuous track, in accordance with one or more embodiments; the view showing the outer plate having a rear edge, a lower edge, an upper edge, a front edge, and pins.

FIG. 56A shows a top elevation view of the components of the outer plate of the chain of the continuous track, in accordance with one or more embodiments; the view showing a pin.

FIG. 56B shows a back elevation view of the components of the outer plate of the chain of the continuous track, in accordance with one or more embodiments, the view showing a pin.

FIG. 56C shows a right elevation view of the components of the outer plate of the chain of the continuous track, in accordance with one or more embodiments, the view showing a pin.

FIG. 56D shows a front elevation view of the components of the outer plate of the chain of the continuous track, in accordance with one or more embodiments, the view showing a pin.

FIG. 56E shows a left elevation view of the components of the outer plate of the chain of the continuous track, in accordance with one or more embodiments, the view showing a pin.

FIG. 56F shows a bottom elevation view of the components of the outer plate of the chain of the continuous track, in accordance with one or more embodiments, the view showing a pin.

FIG. 57A shows a top elevation view of the components of the paddle of the chain of the continuous track, in accordance with one or more embodiments.

FIG. 57B shows a front perspective view of the components of the paddle of the chain of the continuous track, in accordance with one or more embodiments.

FIG. 57C shows a right elevation view of the components of the paddle of the chain of the continuous track, in accordance with one or more embodiments.

FIG. 57D shows a front elevation view of the components of the paddle of the chain of the continuous track, in accordance with one or more embodiments, the view showing the paddle having an upper edge, a lower edge, side edges, a cutaway, and a hole.

FIG. 57E shows a left elevation view of the components of the paddle of the chain of the continuous track, in accordance with one or more embodiments.

FIG. 57F shows a bottom elevation view of the components of the paddle of the chain of the continuous track, in accordance with one or more embodiments.

FIG. 63A shows an elevation view of a chain of a continuous track, in accordance with one or more embodiments; the view showing the chain having paddles and tracks.

FIG. 63B shows an elevation view of a chain of a continuous track, in accordance with one or more embodiments; the view showing the chain having paddles and tracks.

FIG. 63C shows an elevation view of a chain of a continuous track, in accordance with one or more embodiments; the view showing the chain having paddles and tracks.

DETAILED DESCRIPTION OF THE DISCLOSURE

Figure 1:
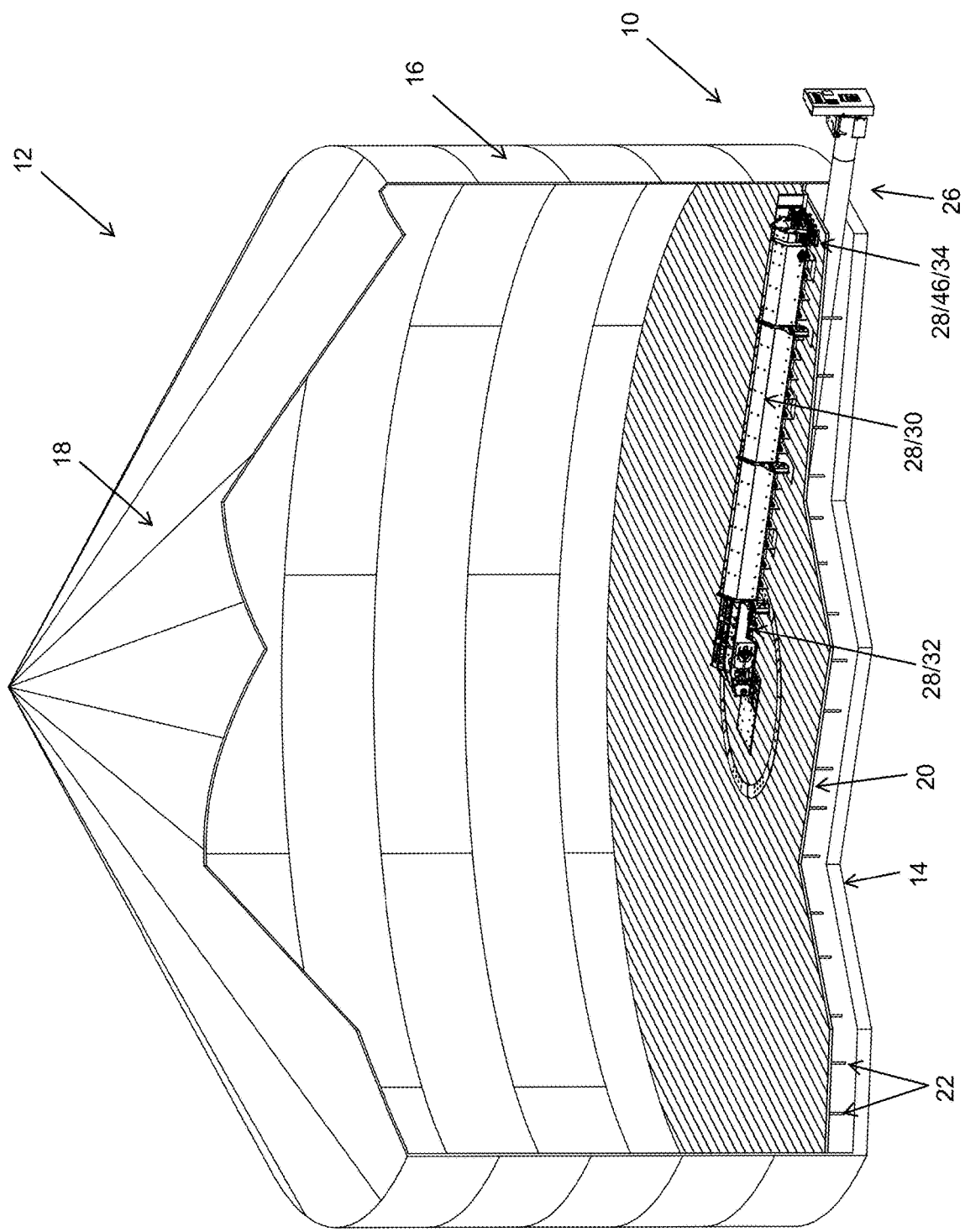
FIG. 1 shows a perspective cut-away elevation view of an exemplary grain bin having an exemplary sweep system, in accordance with one or more embodiments, the view showing a sweep system positioned on top of an elevated floor and just within the sidewall of the grain bin.
Figure 2:
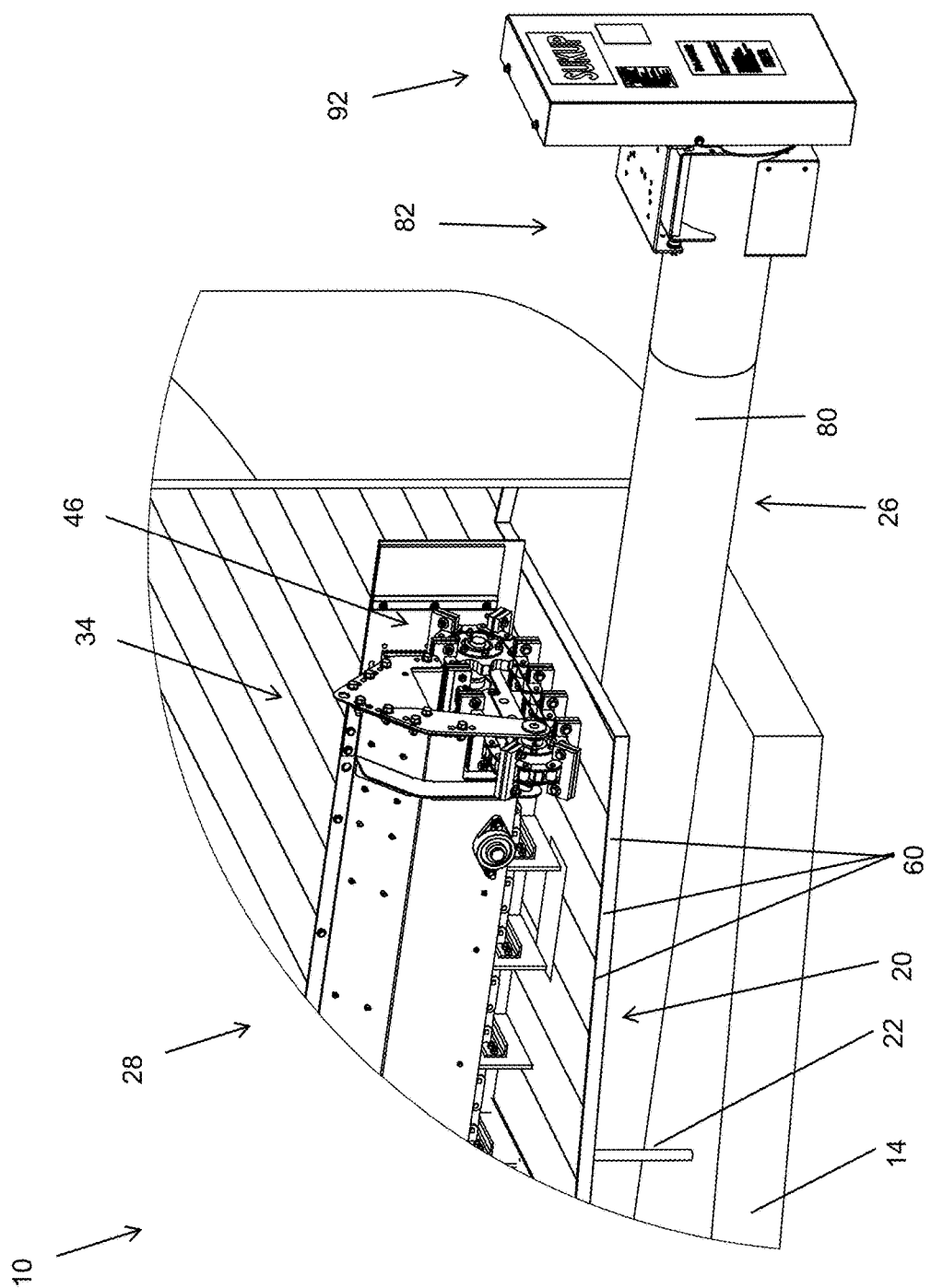
FIG. 2 shows a perspective view of an exemplary sweep system, in accordance with one or more embodiments, the view showing a tail section of the sweep; the view showing a track driven drive system.
Figure 3:
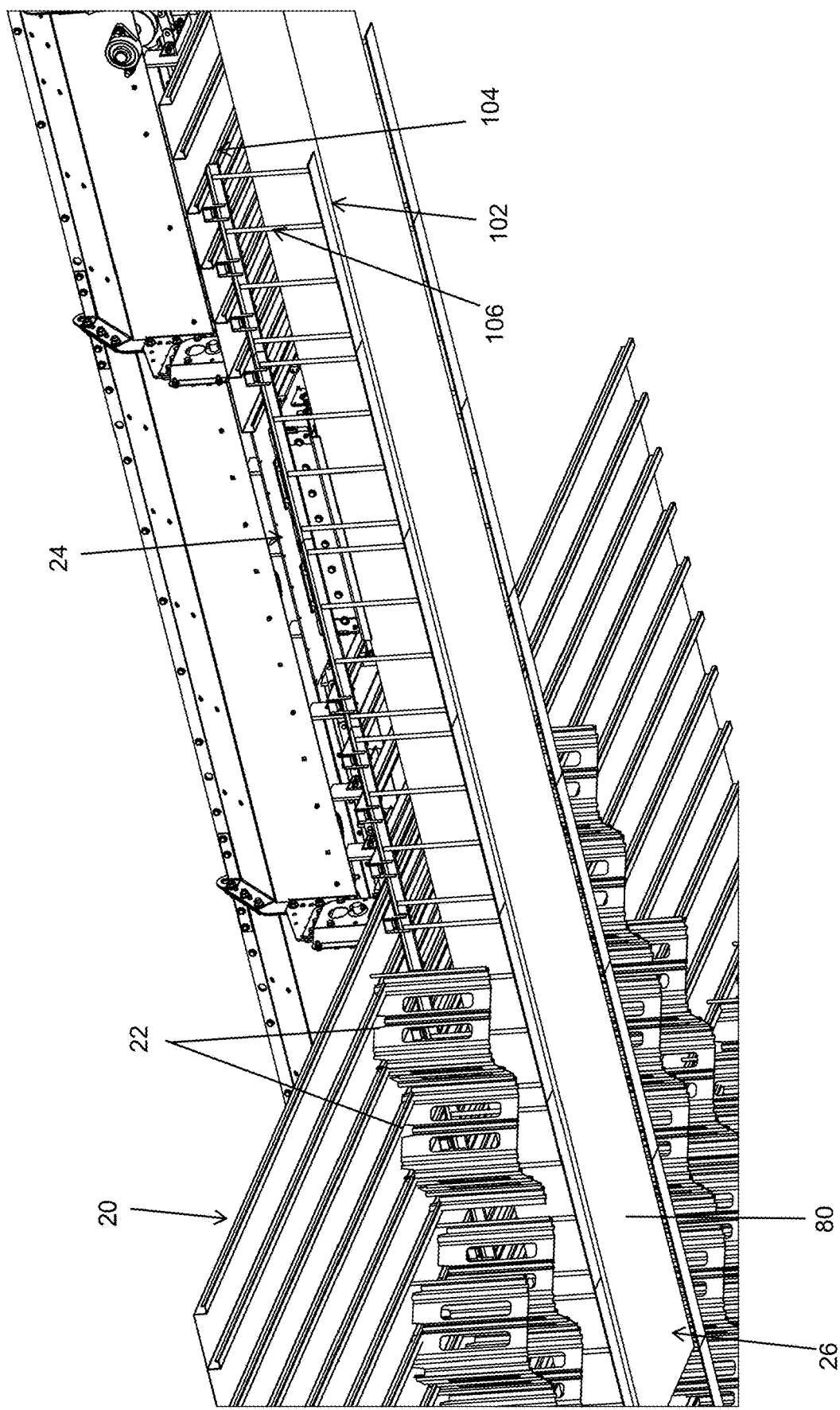
FIG. 3 shows a close up perspective view of an exemplary sweep system, in accordance with one or more embodiments, the view showing the sweep system positioned on top of an elevated floor of a grain bin.
Figure 4:
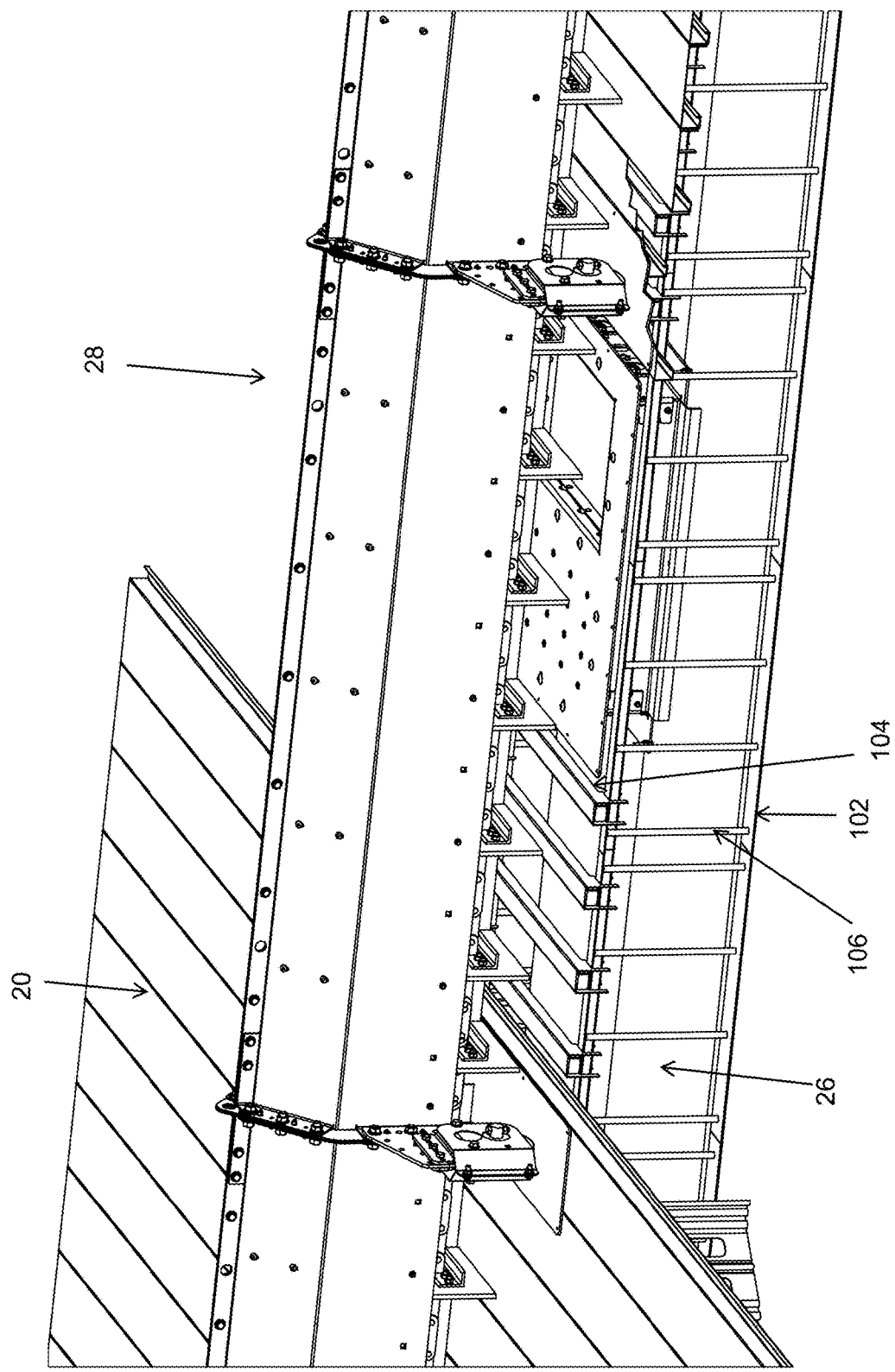
FIG. 4 shows a close up elevation view of an exemplary sweep system, in accordance with one or more embodiments, the view showing the sweep system positioned on top of an elevated floor of a grain bin.
Figure 5:
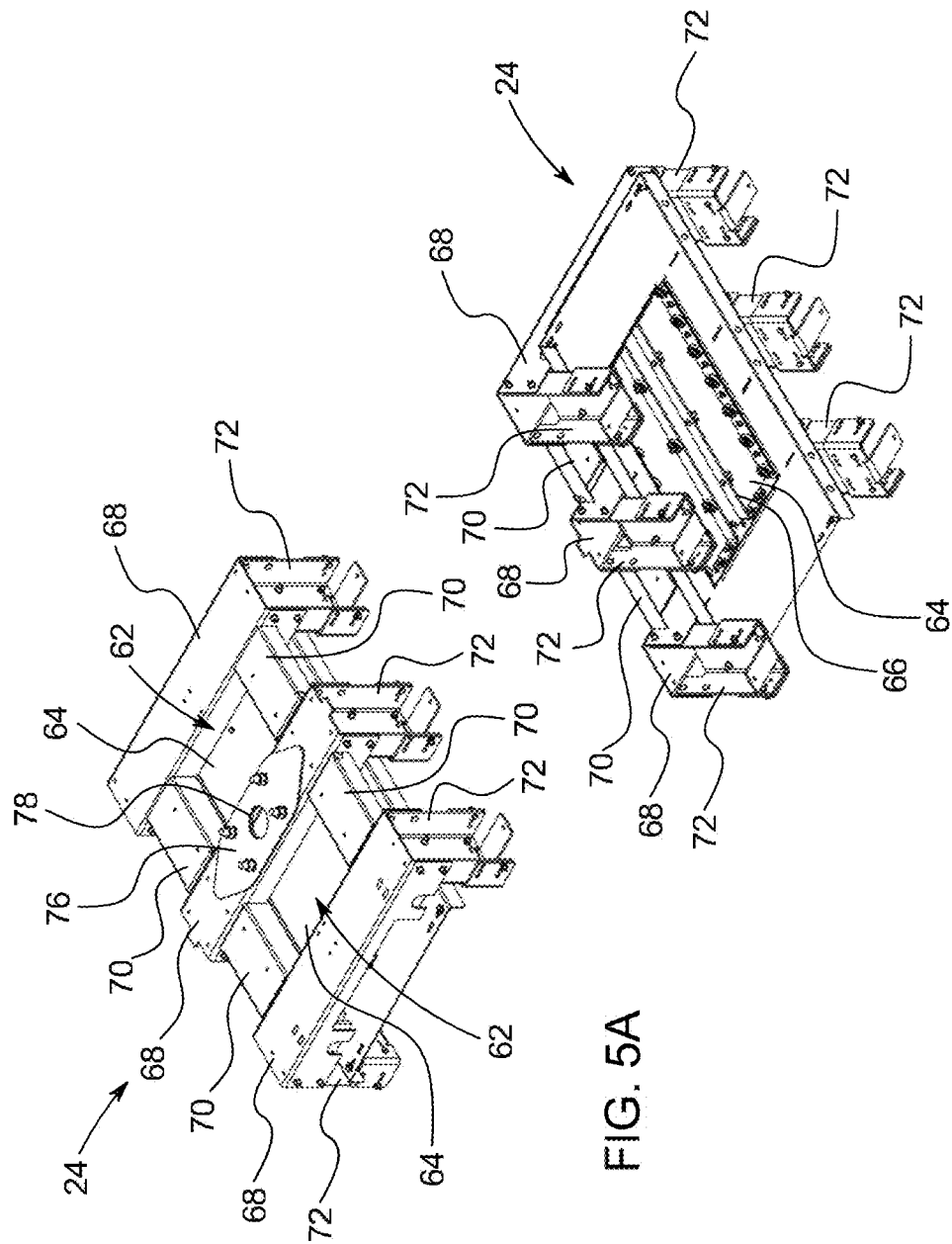
FIG. 5A shows an upper front side perspective view of a center sump of a sweep, in accordance with one or more embodiments.
FIG. 5B shows a lower front side perspective view of a center sump of a sweep, in accordance with one or more embodiments.
Figure 6:
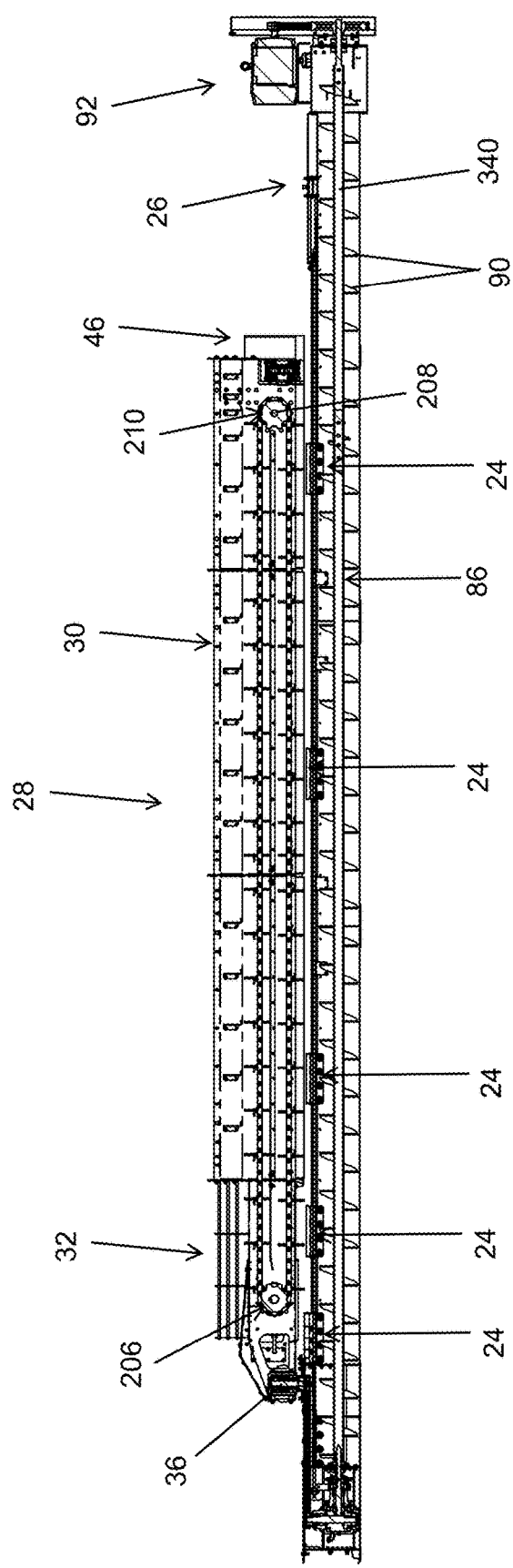
FIG. 6 shows an elevation view of an exemplary sweep system, in accordance with one or more embodiments, the view showing a sweep positioned over a grain conveyer of the system; the view showing the elevated floor of a grain bin omitted.
Figure 7:
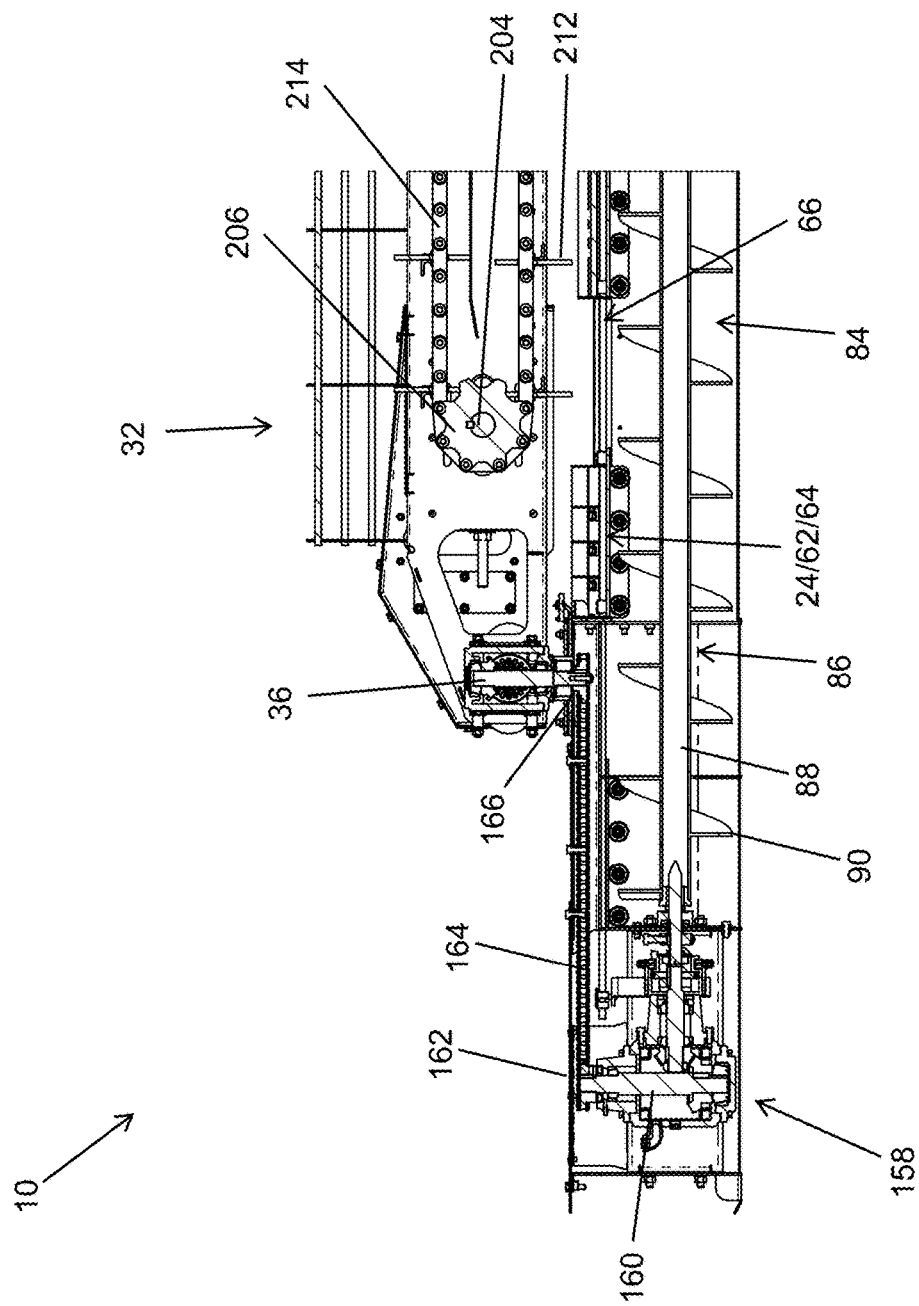
FIG. 7 shows an elevation view of a skeletonized head section of an exemplary sweep system, in accordance with one or more embodiments; the view showing a shaft and a sprocket positioned in the skeletonized head section.
Figure 8:
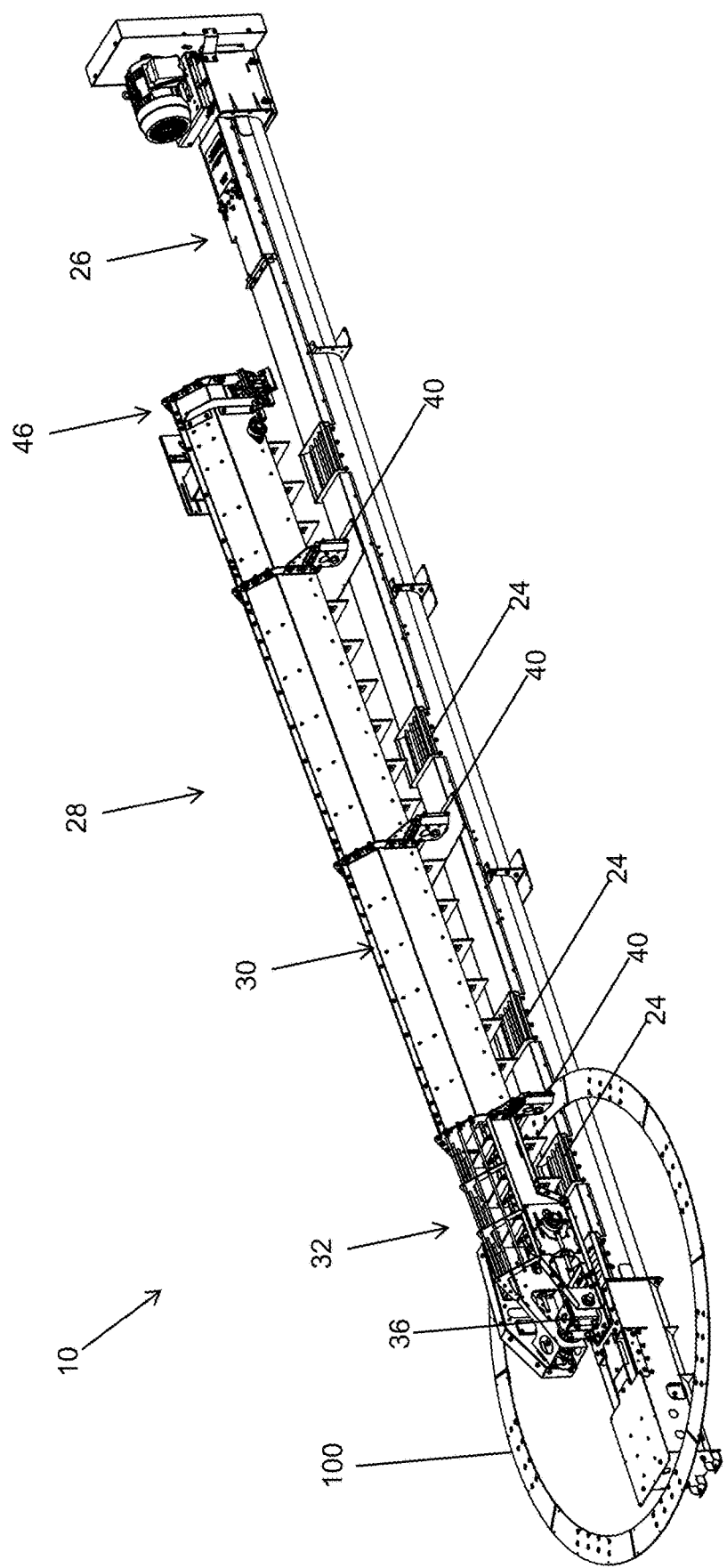
FIG. 8 shows a close up front right perspective view of a sweep of an exemplary sweep system, in accordance with one or more embodiments.
Figure 9:
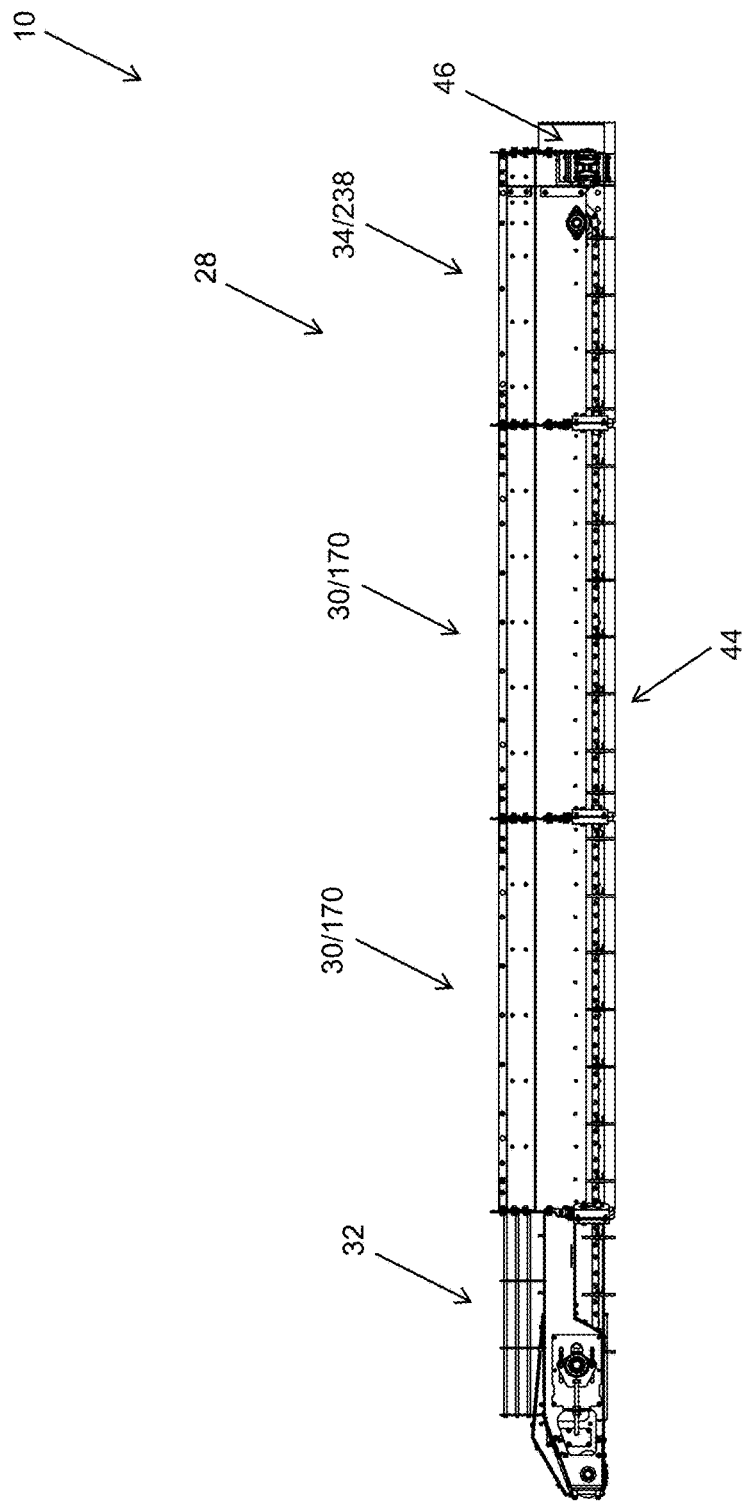
FIG. 9 shows an elevation view of a sweep of an exemplary sweep system, in accordance with one or more embodiments; the view showing the sweep having an elongated body with sections and a track driven drive system.
Figure 10:
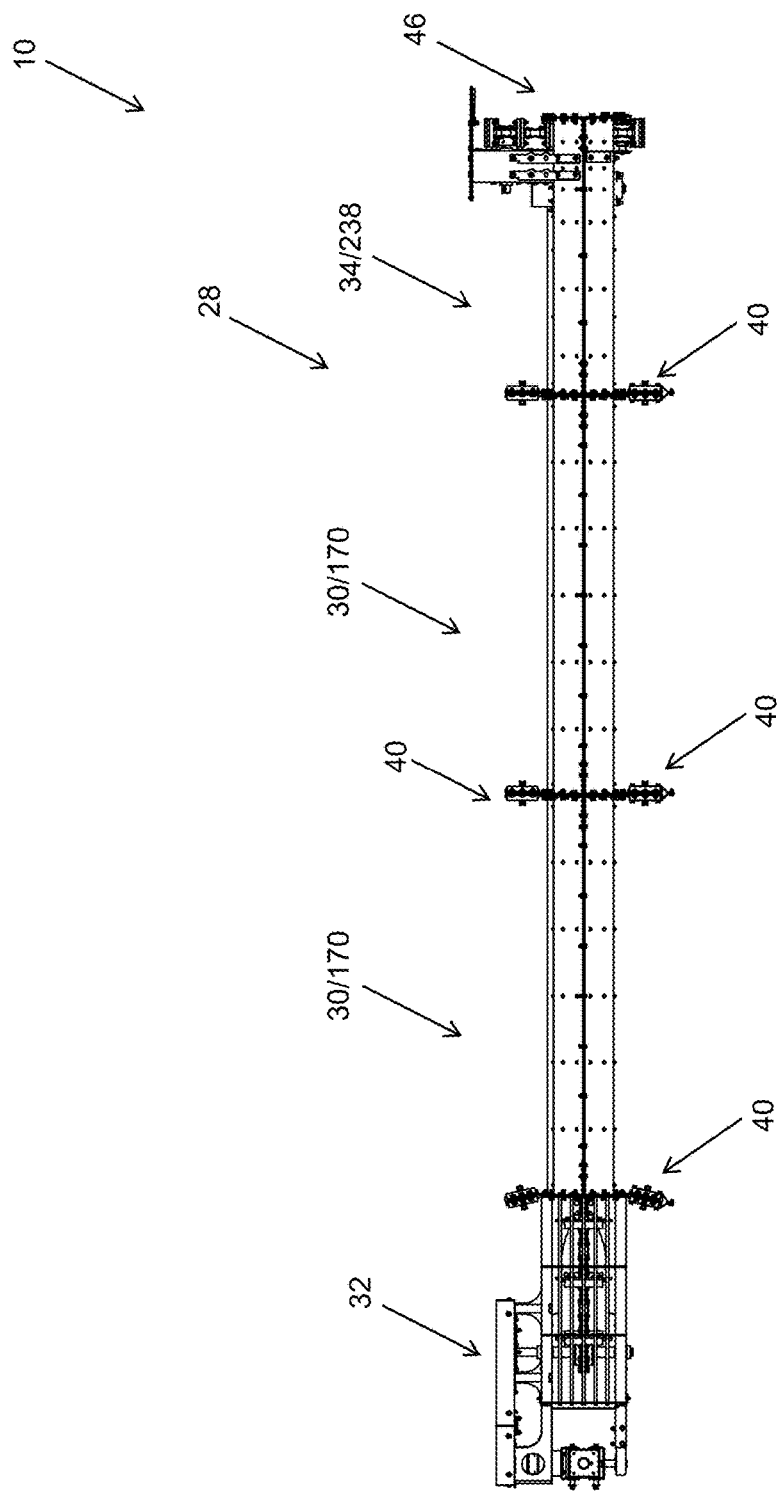
FIG. 10 shows a bottom elevation view of a sweep of an exemplary sweep system, in accordance with one or more embodiments; the view showing the sweep having an elongated body with sections, carrier wheels, and a track driven drive system.
Figure 11:
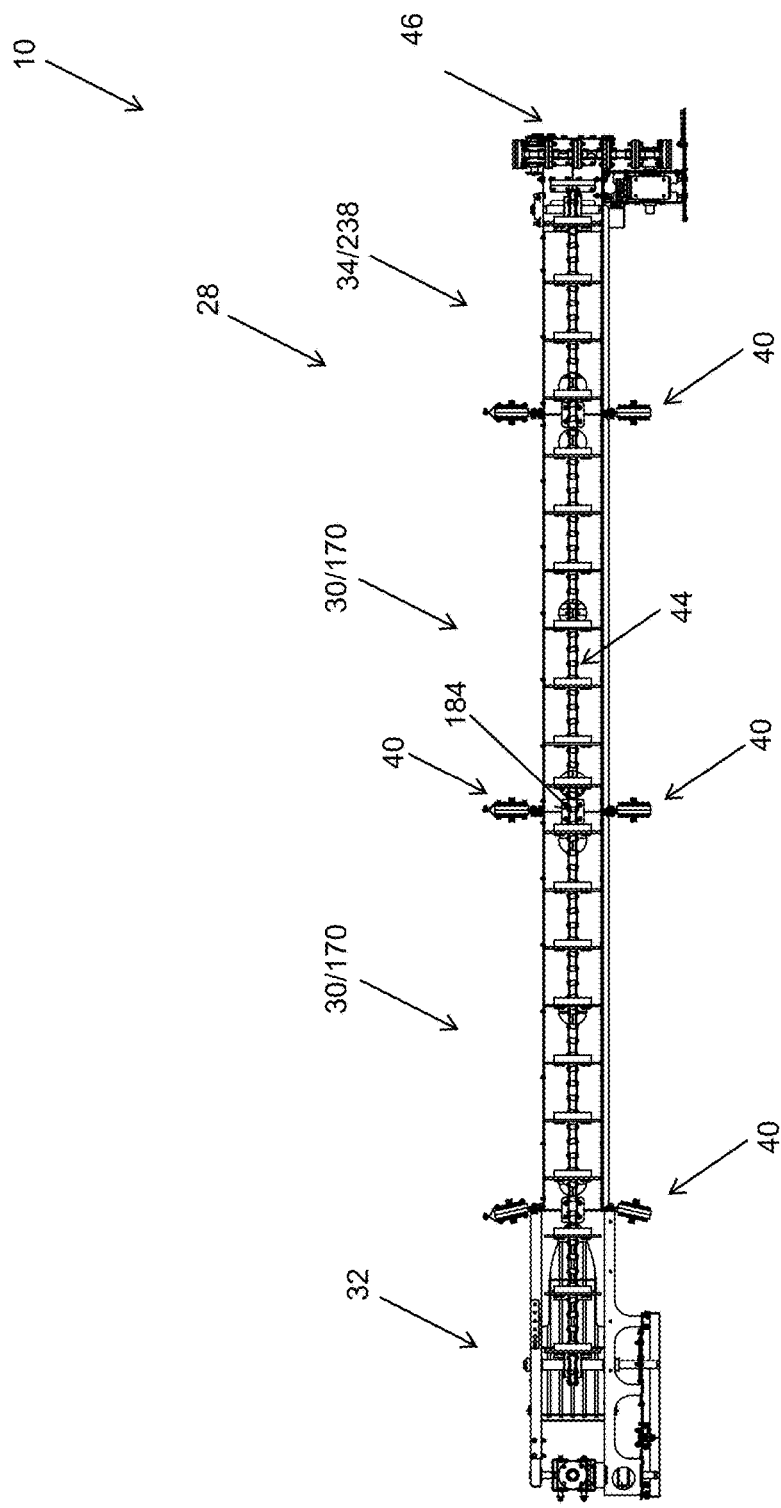
FIG. 11 shows an elevation view of a skeletonized sweep of an exemplary sweep system, in accordance with one or more embodiments; the view showing the sweep having an elongated body with sections, carrier wheels, and a track driven drive system.
Figure 12:
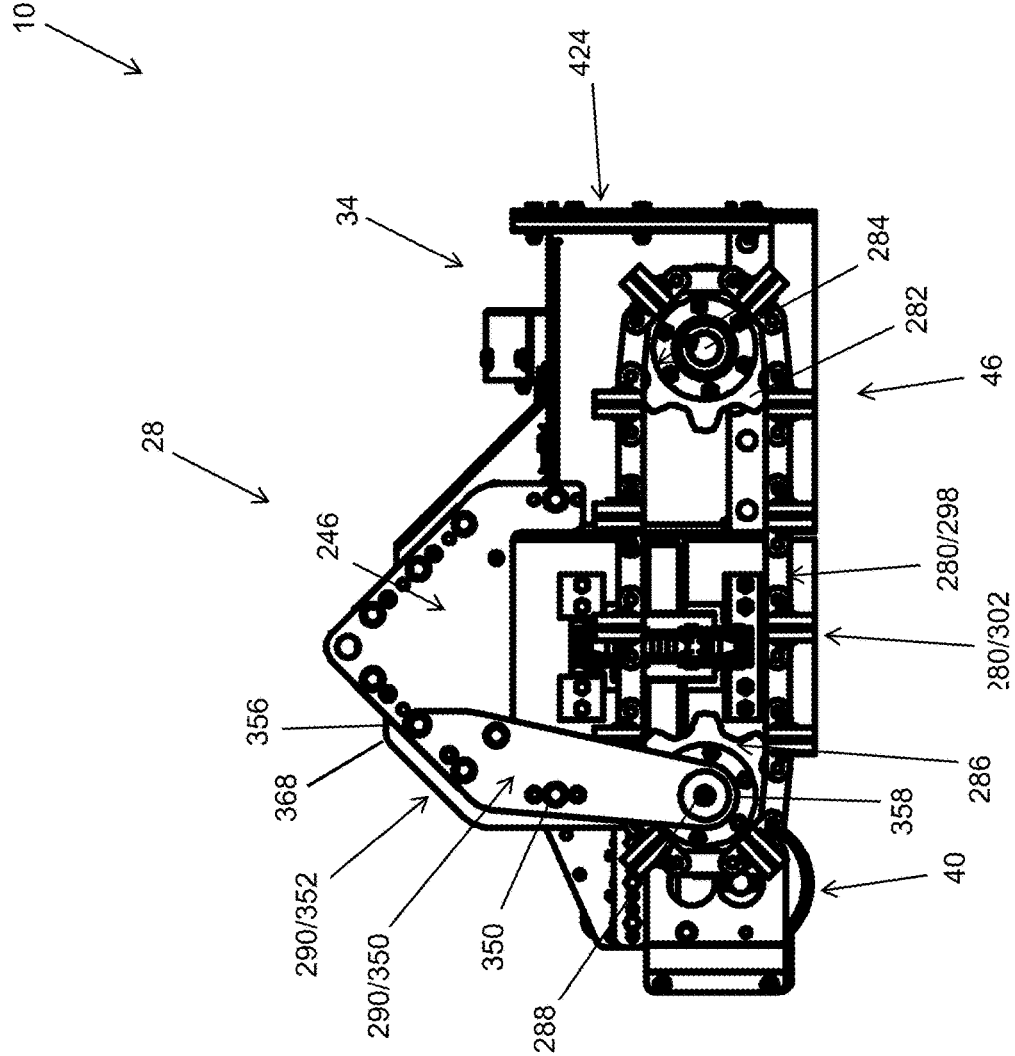
FIG. 12 shows an elevation view of a skeletonized tail section of a sweep, in accordance with one or more embodiments; the view showing the tail section having a scraper and a mounting assembly.
Figure 13:
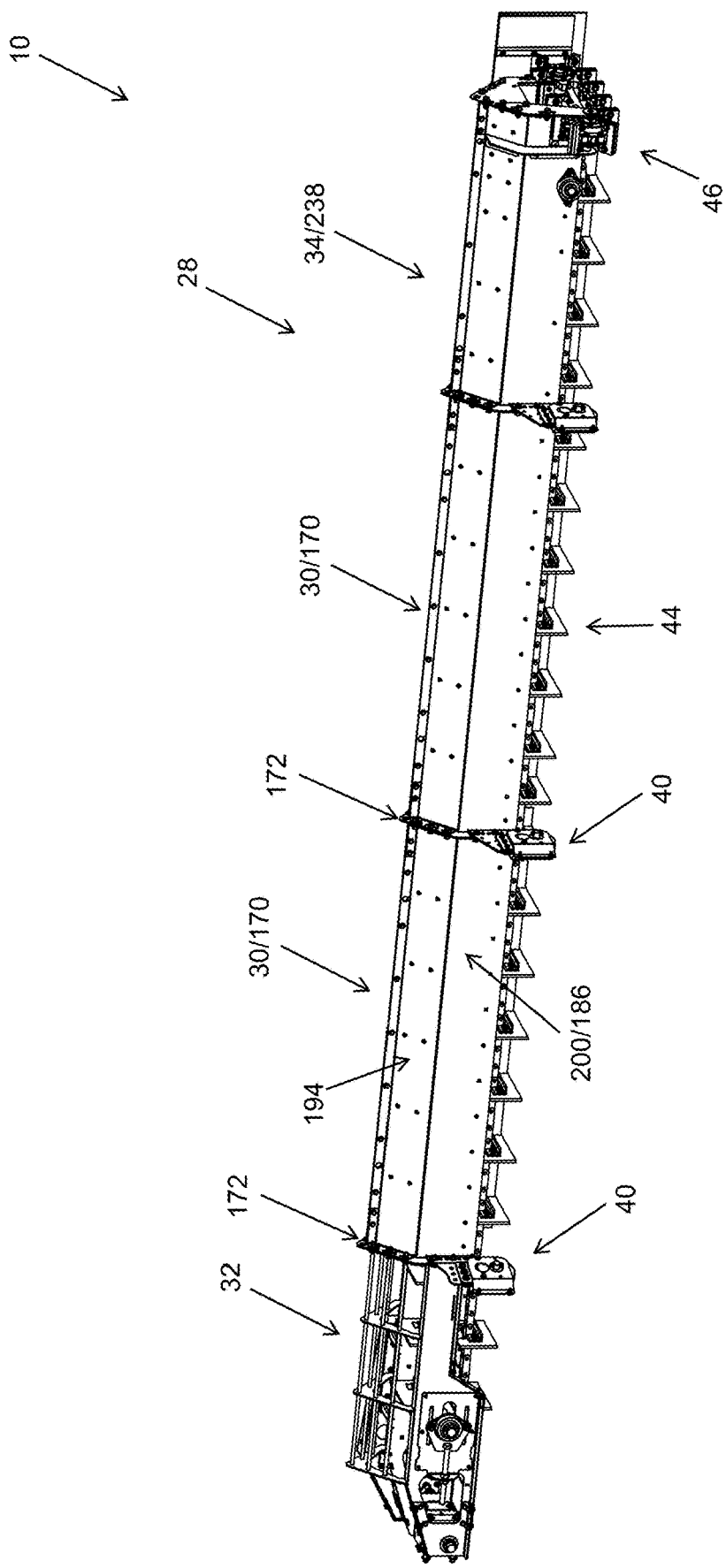
FIG. 13 shows a front perspective view of a sweep of an exemplary sweep system, in accordance with one or more embodiments; the view showing the sweep having an elongated body with sections, carrier wheels, and a track driven drive system.
Figure 14:
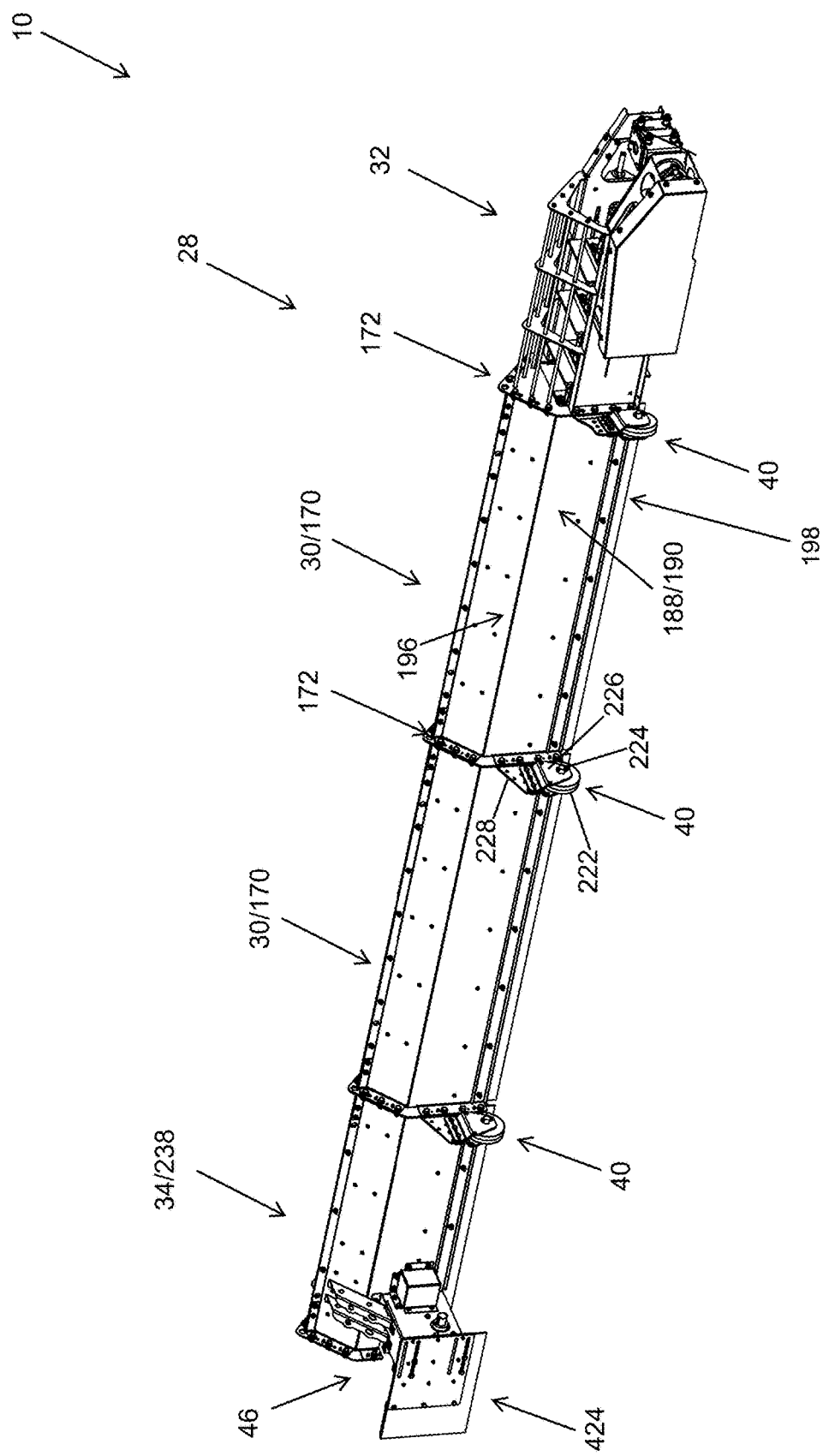
FIG. 14 shows a back perspective view of a sweep of an exemplary sweep system, in accordance with one or more embodiments; the view showing the sweep having an elongated body with sections, carrier wheels, and a track driven drive system.
Figure 15:
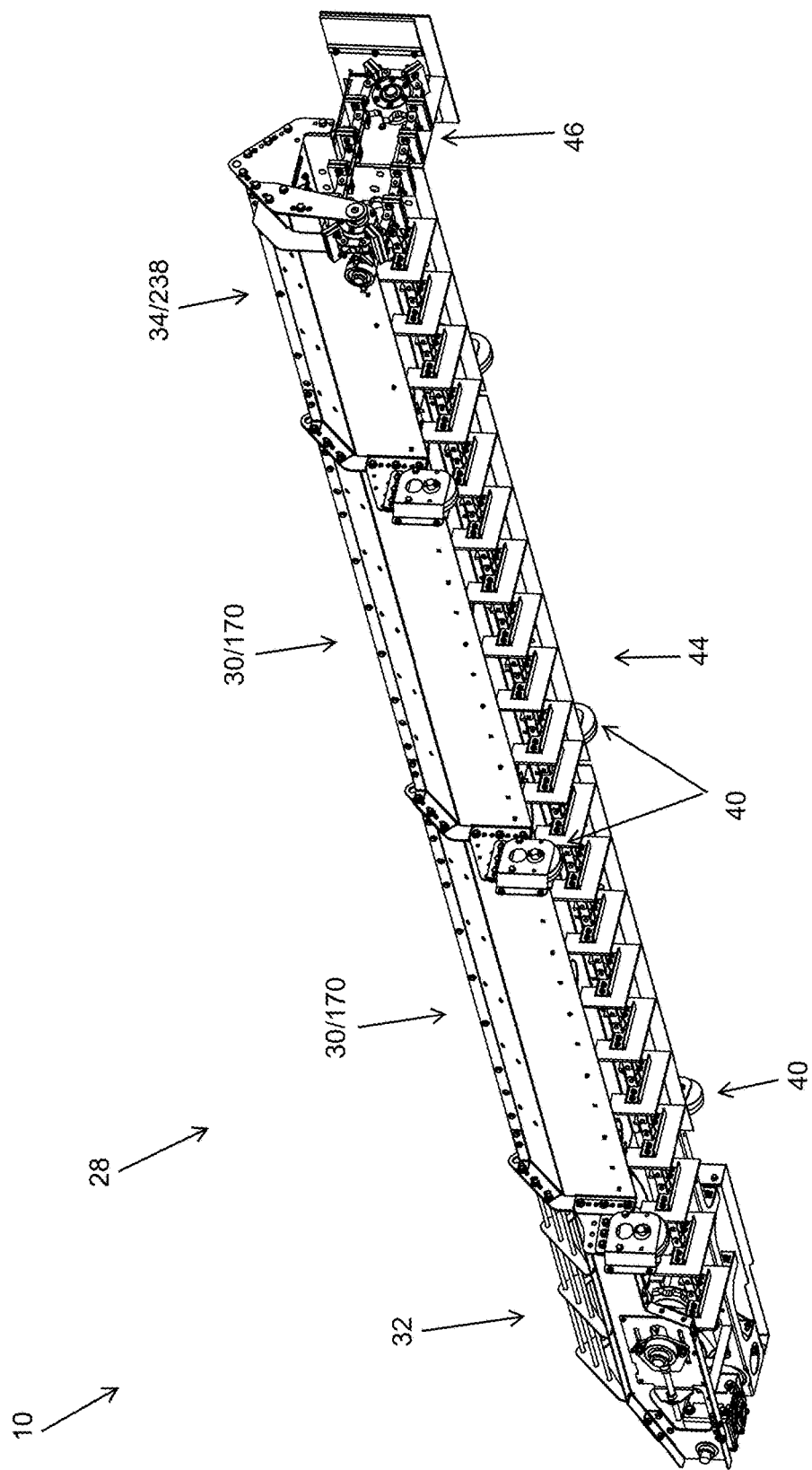
FIG. 15 shows a perspective view of a sweep of an exemplary sweep system, in accordance with one or more embodiments; the view showing the sweep having a head section, an elongated body with sections, carrier wheels, and a track driven drive system.
Figure 16:
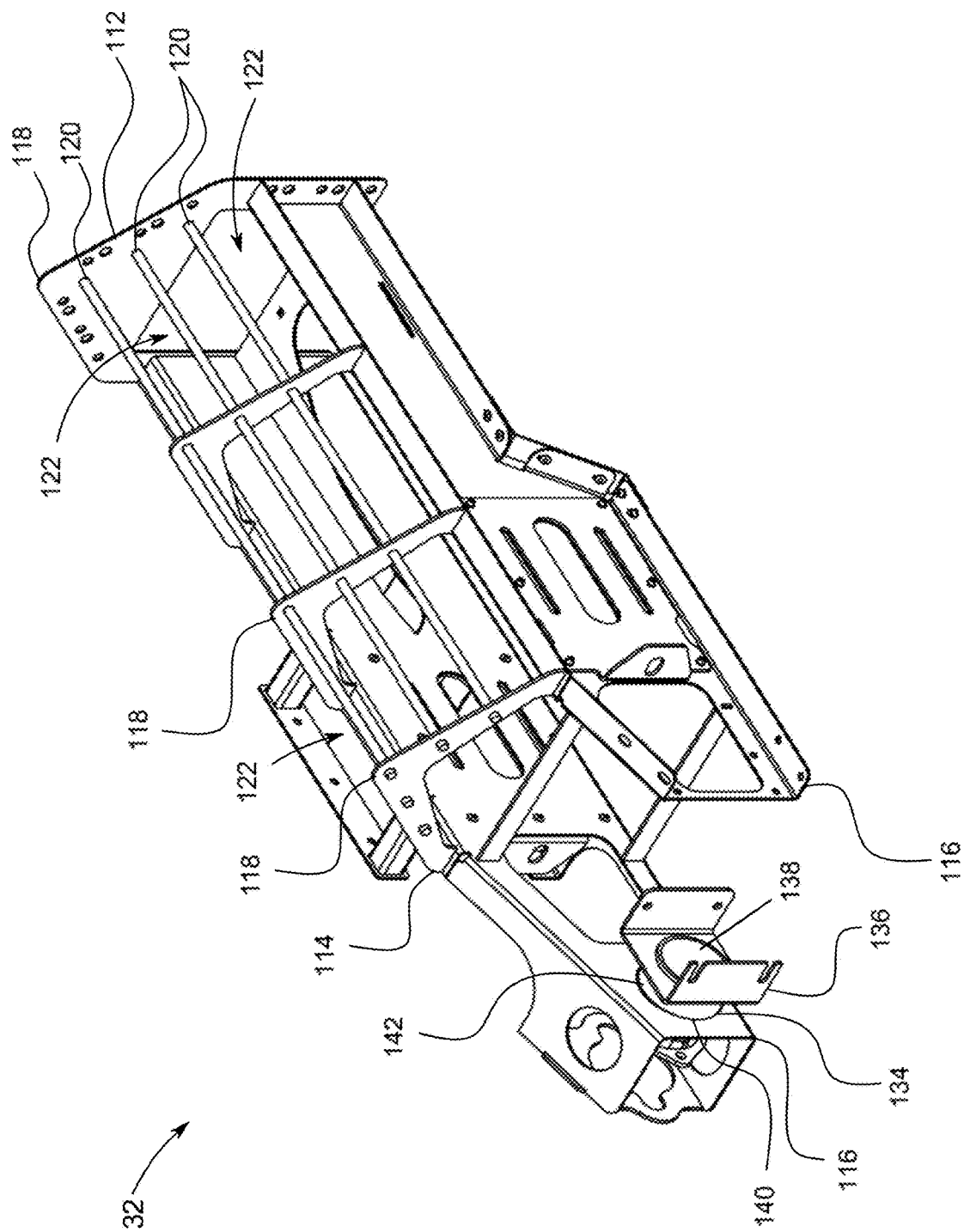
FIG. 16 shows an upper front right perspective view of a skeletonized head section of an exemplary sweep system, in accordance with one or more embodiments.
Figure 17:
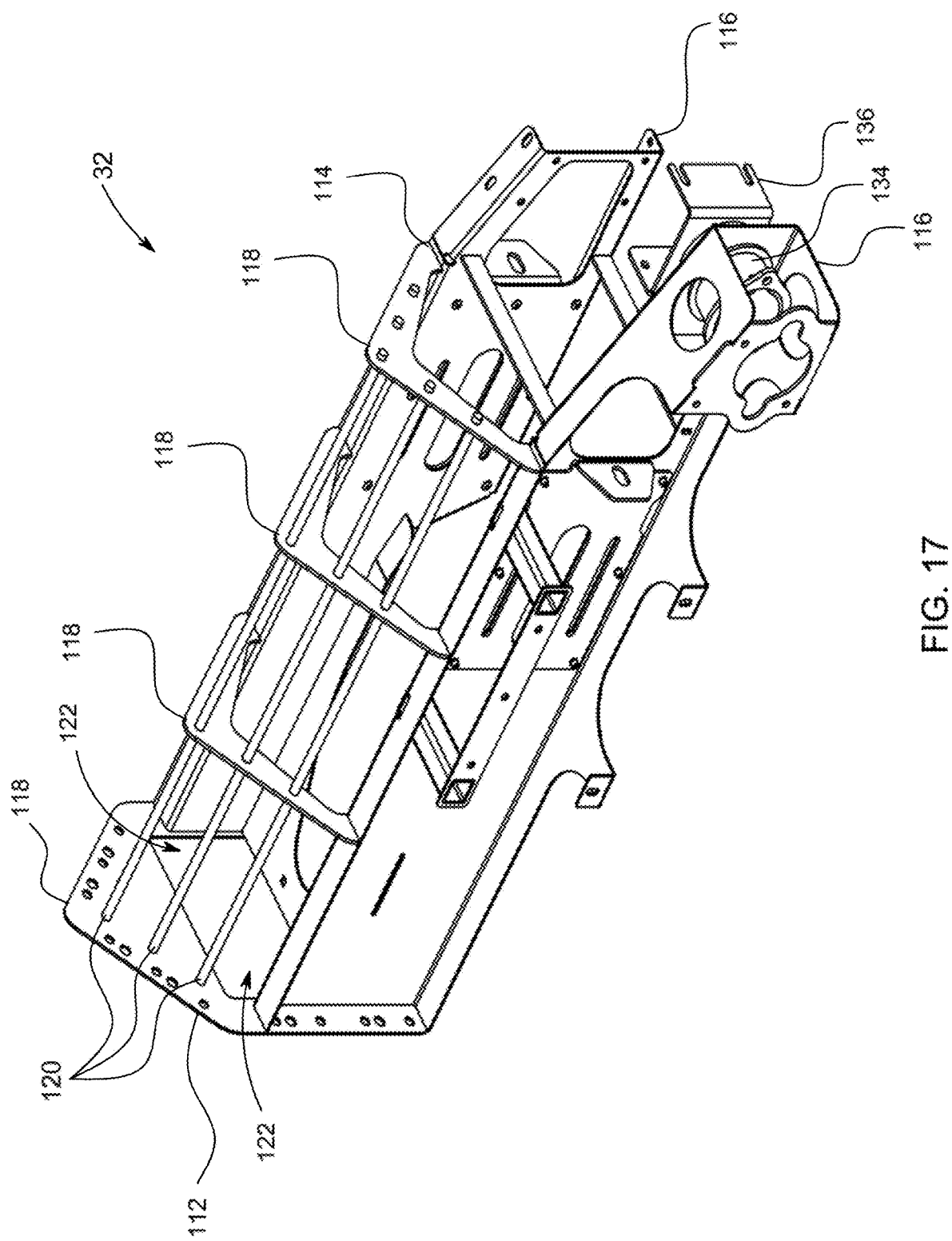
FIG. 17 shows an upper rear right perspective view of the skeletonized head section shown in FIG. 60, in accordance with one or more embodiments.
Figure 18:
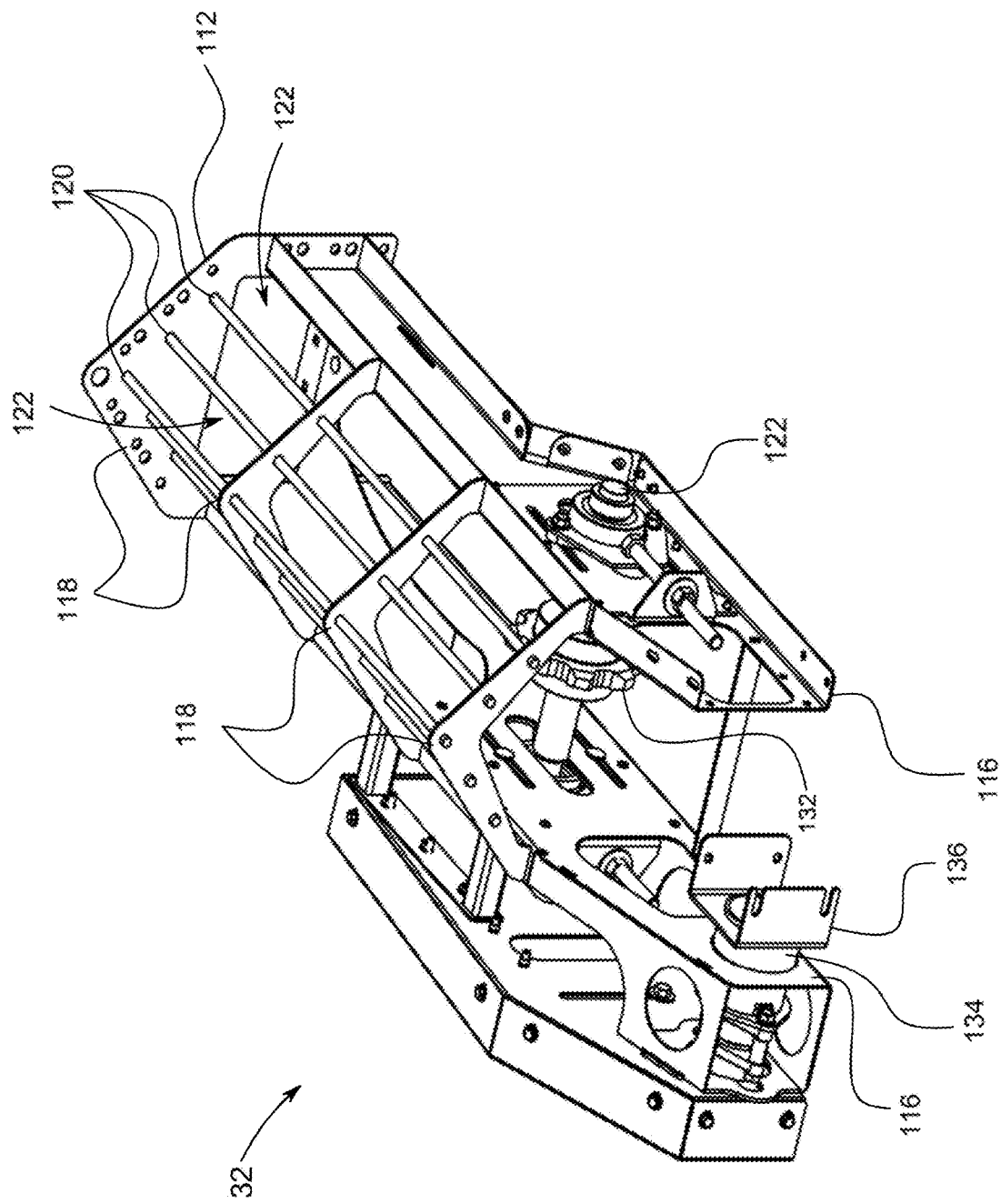
FIG. 18 shows an upper front right perspective view of a skeletonized head section of an exemplary sweep system, in accordance with one or more embodiments; the view showing a shaft and a sprocket positioned in the skeletonized head section.
Figure 19:
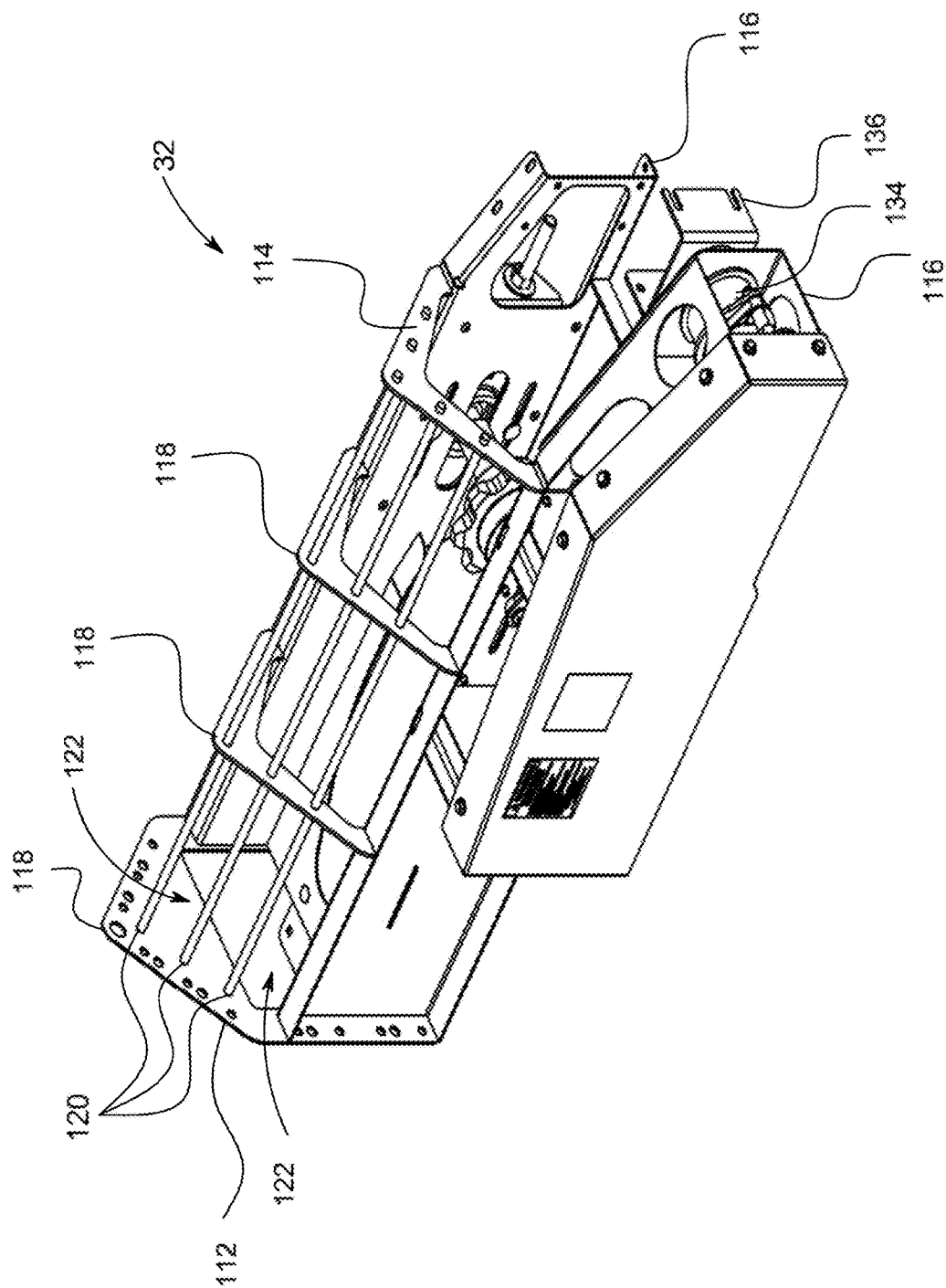
FIG. 19 shows an upper rear right perspective view of a skeletonized head section of an exemplary sweep system, in accordance with one or more embodiments; the view showing a shaft and a sprocket positioned in the skeletonized head section.
Figure 21:
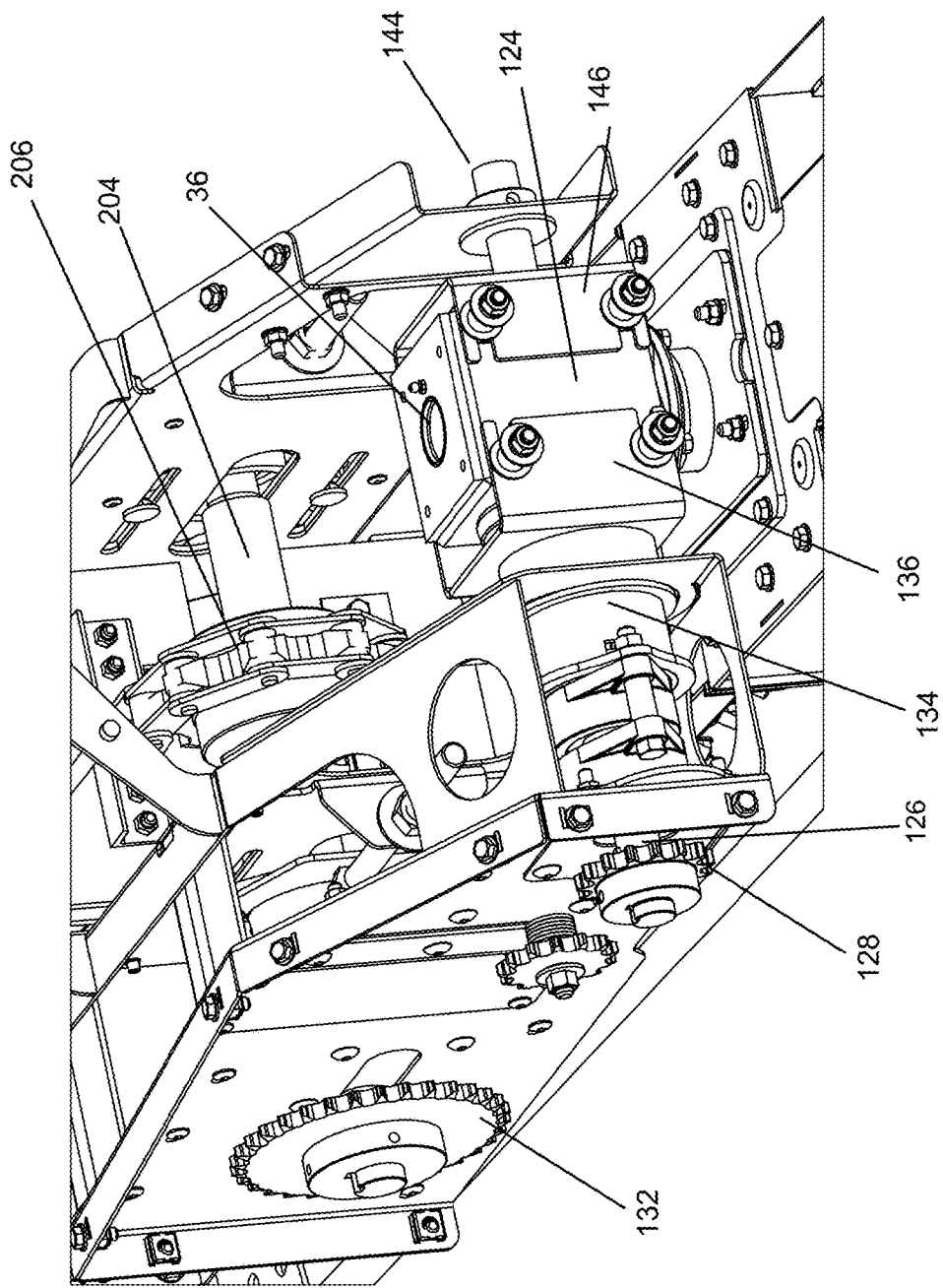
FIG. 21 shows a perspective view of a skeletonized head section of an exemplary sweep system, in accordance with one or more embodiments; the view showing a sprocket and a gearbox positioned in the skeletonized head section.
Figure 22:
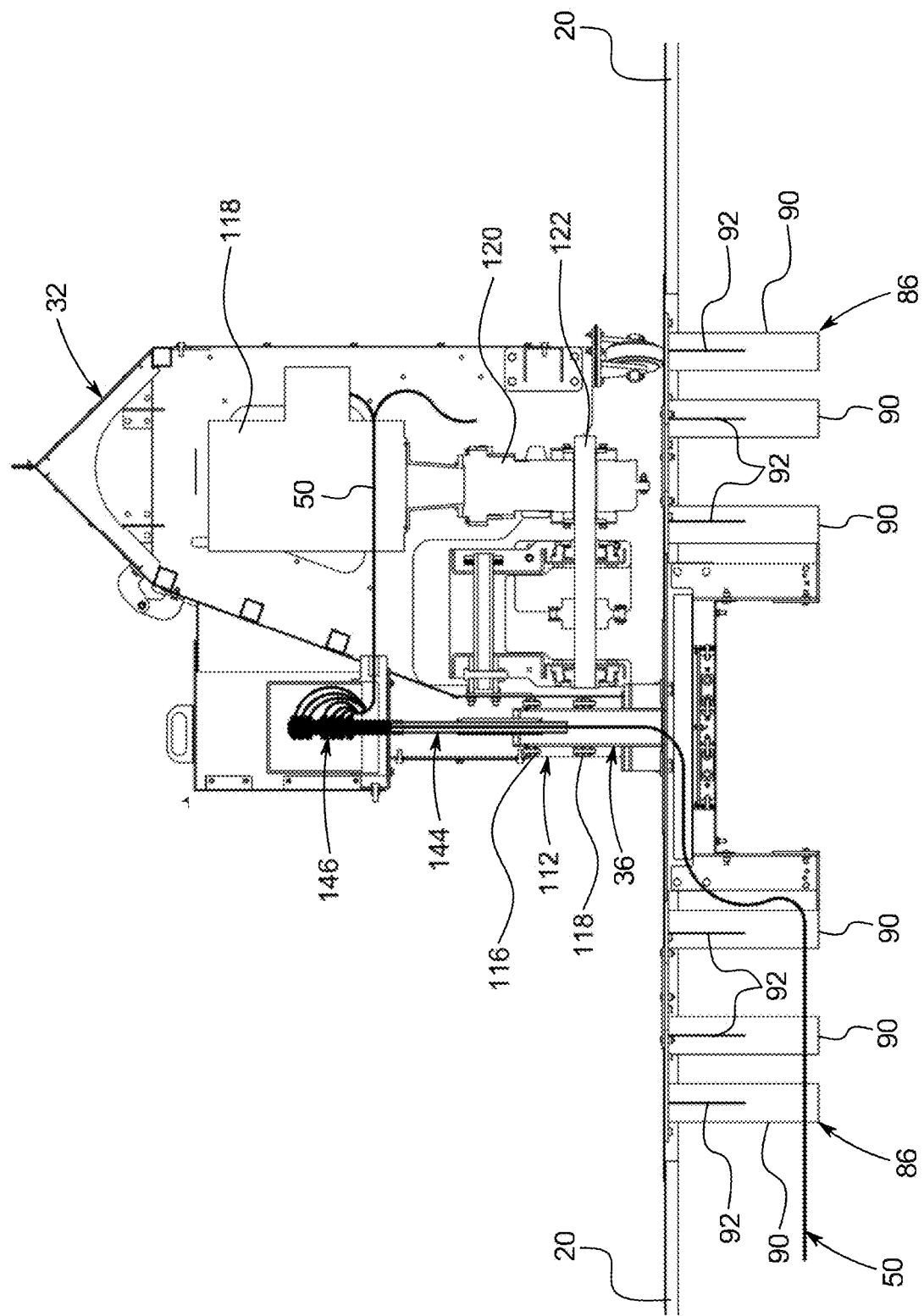
FIG. 22 shows a cross section view of a sweep and elevated floor of a grain bin, in accordance with one or more embodiments; the view showing the left side of the head section of the sweep; the view showing the sweep in a parked position over the elevated floor with carrier wheels of the sweep positioned over flighting.
Figure 23:
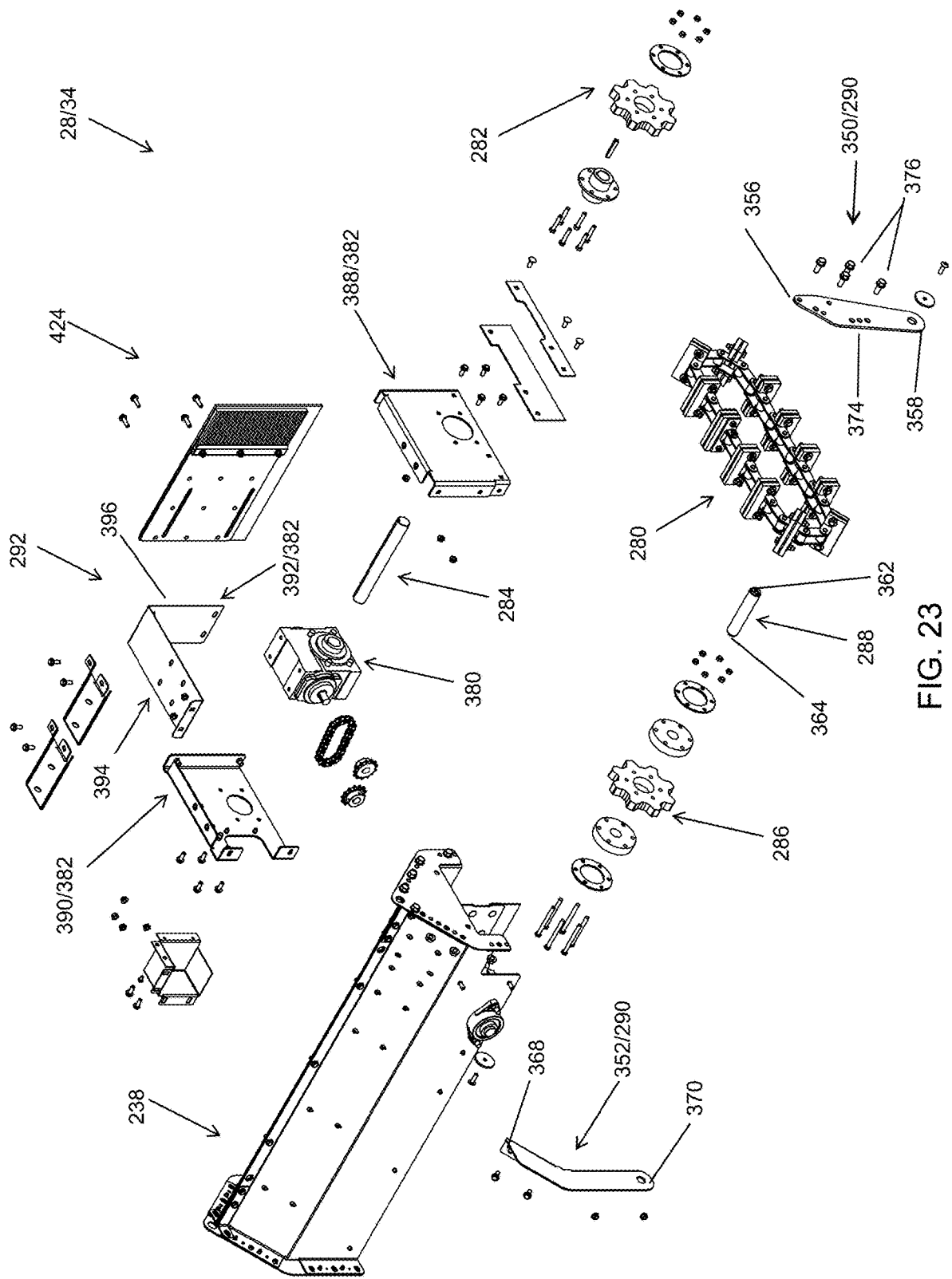
FIG. 23 is an exploded perspective view of a sweep of an exemplary sweep system, in accordance with one or more embodiments; the view showing the various components of the sweep such as a weldment, continuous track, and a scraper.
Figure 24:
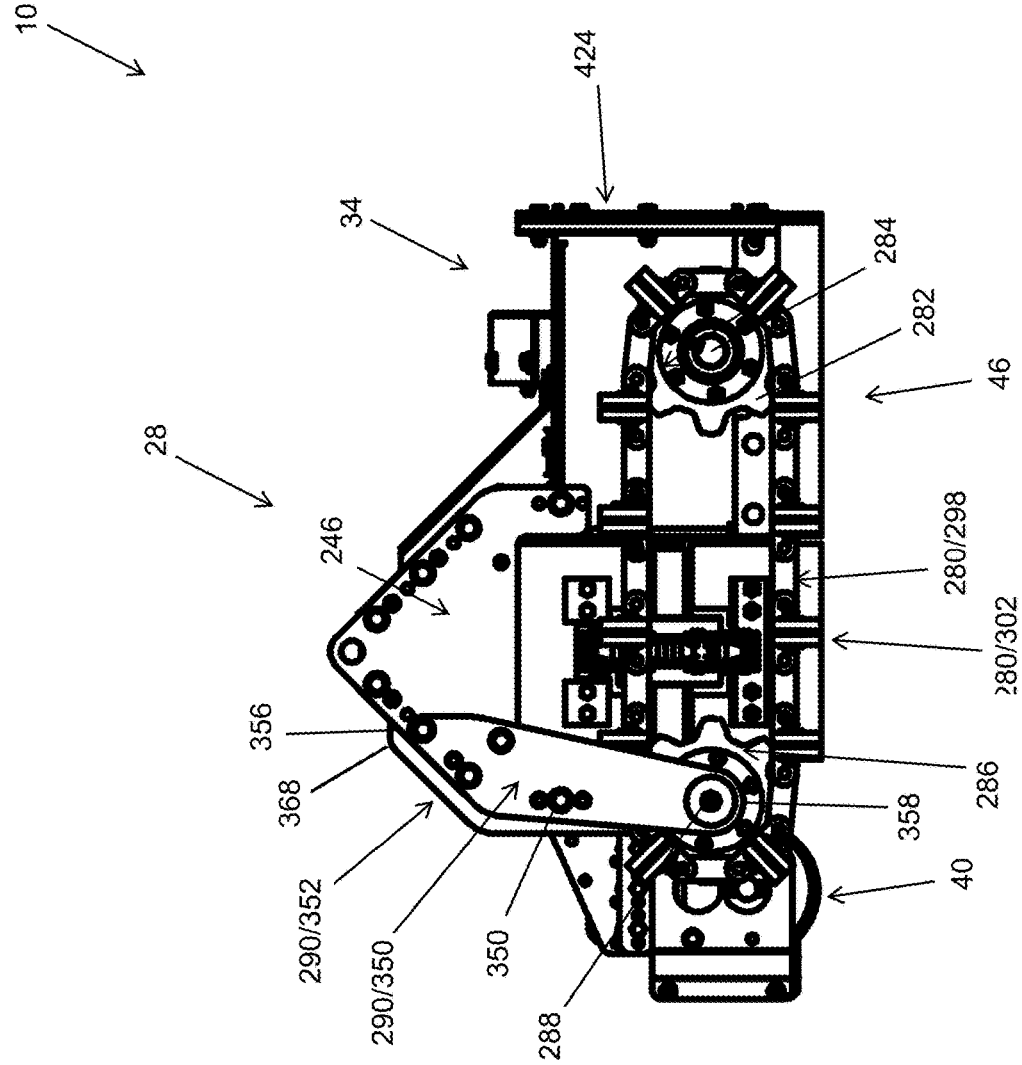
FIG. 24 shows an elevation view of a skeletonized tail section of a sweep, in accordance with one or more embodiments; the view showing the tail section having a scraper and a mounting assembly.
Figure 26:
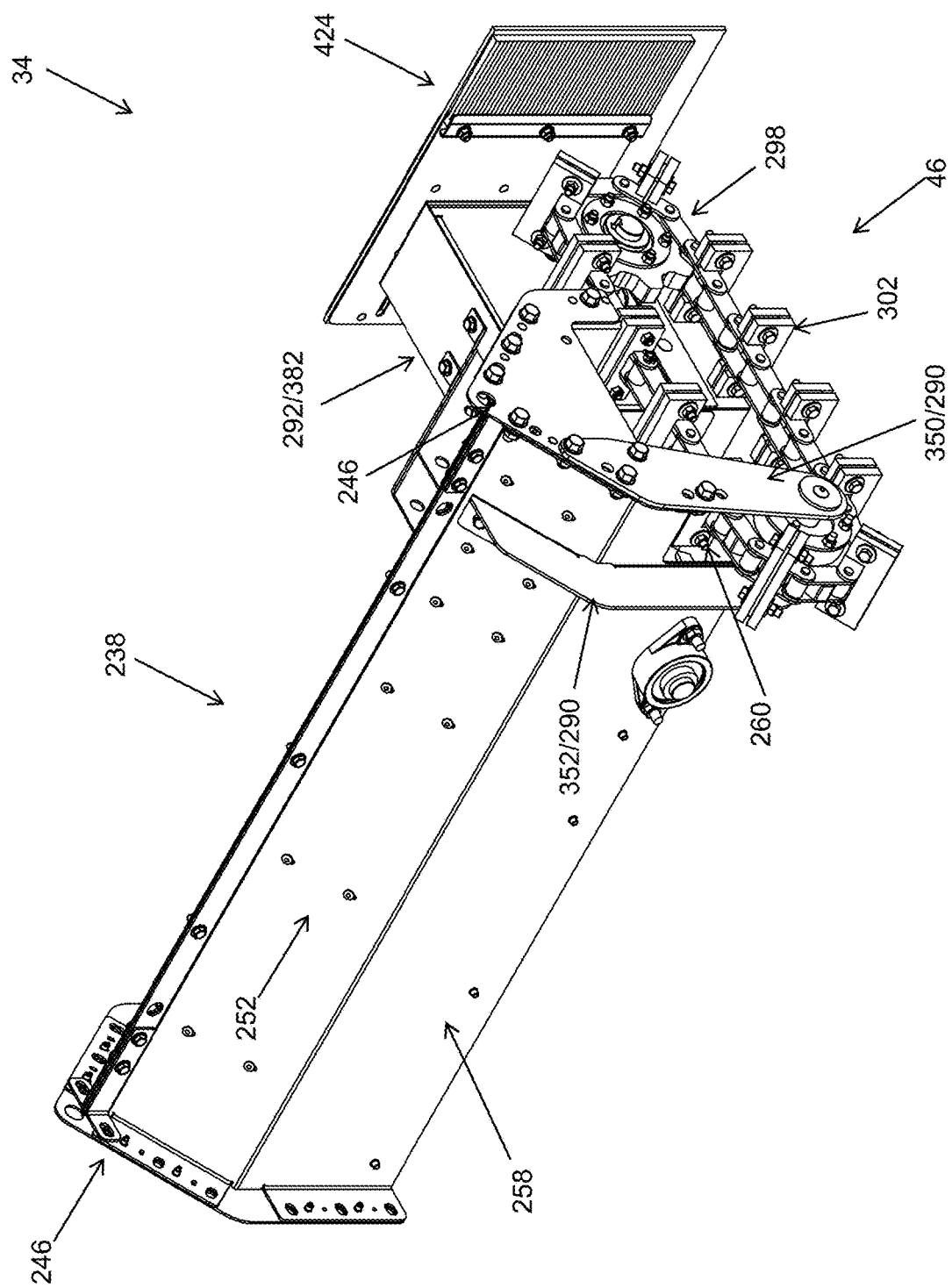
FIG. 26 shows a front perspective view of a weldment of a sweep of an exemplary sweep system, in accordance with one ore more embodiments; the view showing the weldment having a front cover plate and a front plate; the view also showing a track driven drive system.
Figure 27:
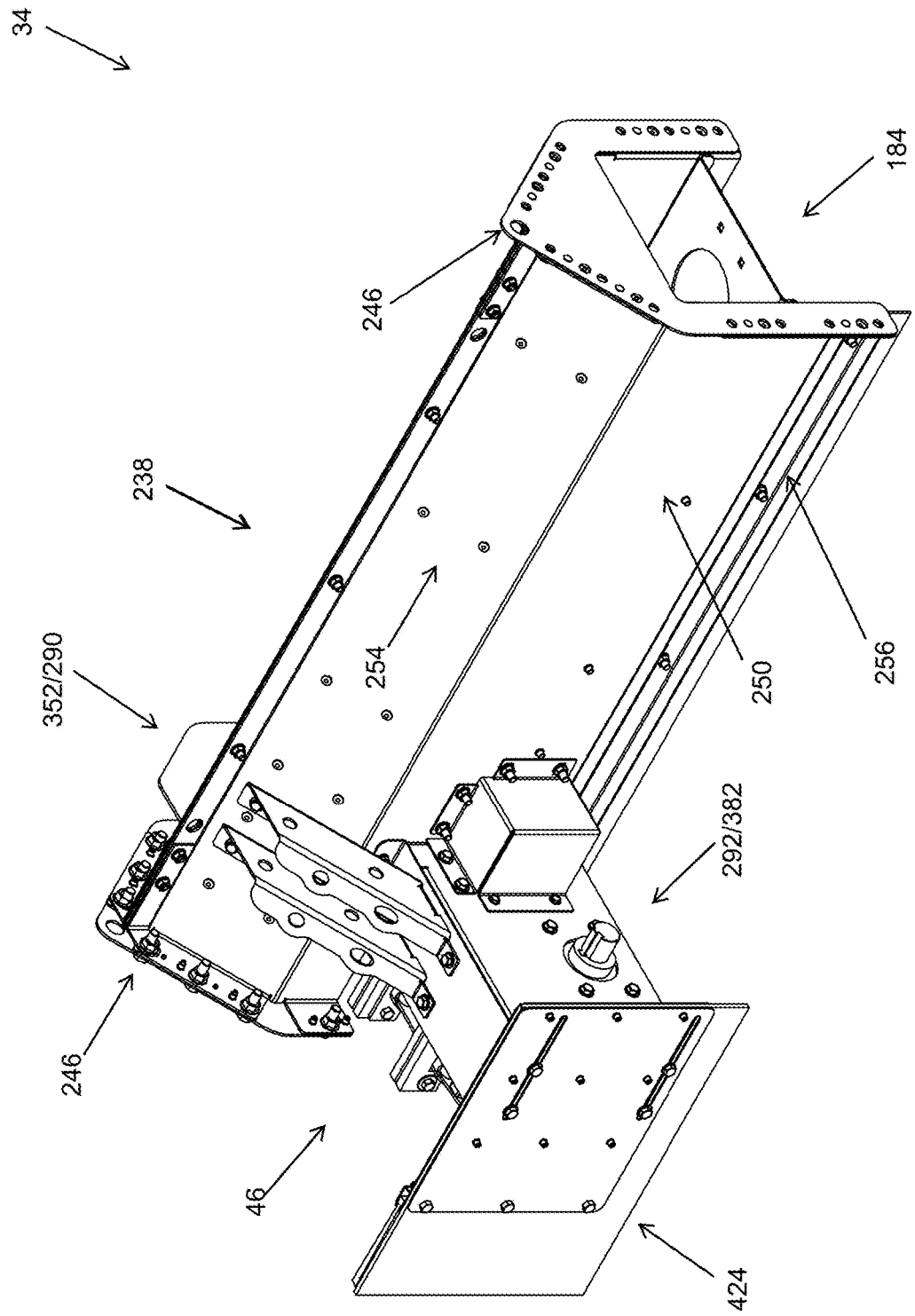
FIG. 27 shows a rear perspective view of a tail section of a sweep of an exemplary sweep system, in accordance with one or more embodiments; the view showing the tail section having a scraper, a weldment, and a track driven drive system.
Figure 28:
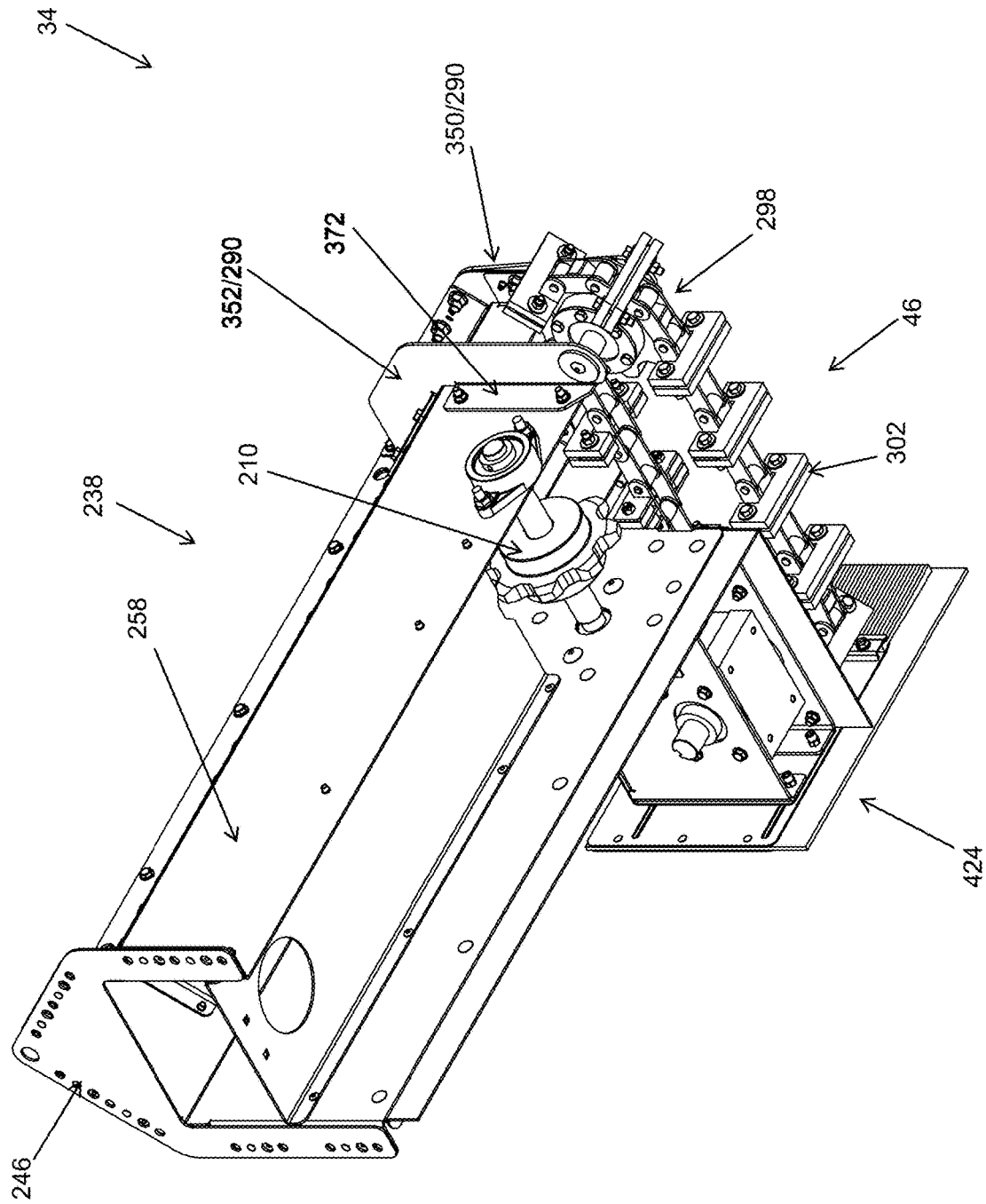
FIG. 28 shows a bottom perspective view of a tail section of a sweep of an exemplary sweep system, in accordance with one or more embodiments; the view showing the tail section having a track driven drive system with a scraper, tracks, a chain, and a mounting assembly.
Figure 29:
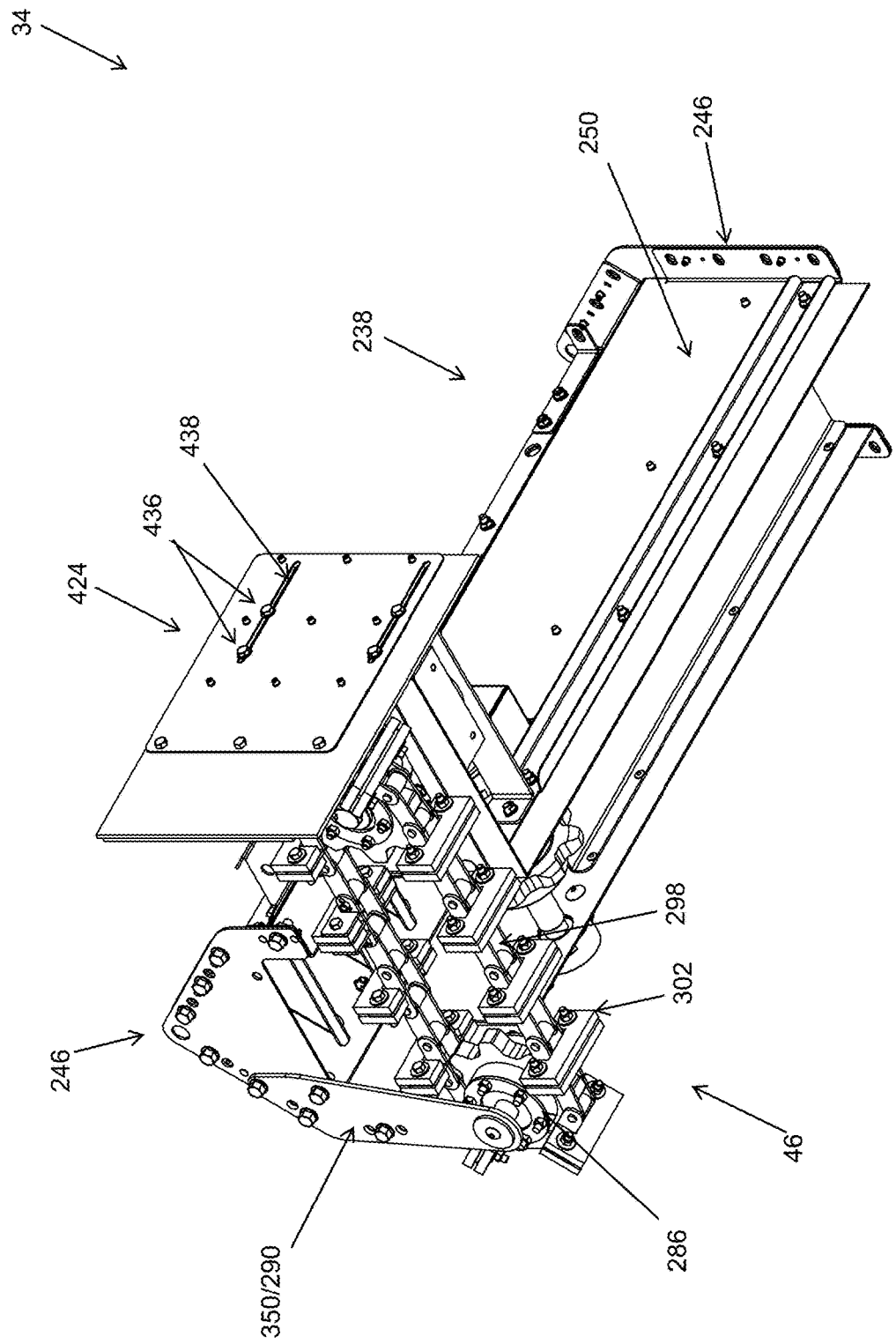
FIG. 29 shows a bottom perspective view of a tail section of a sweep of an exemplary sweep system, in accordance with one or more embodiments; the view showing the tail section having a track driven drive system with a scraper, tracks, a chain, and a mounting assembly.
Figure 30:
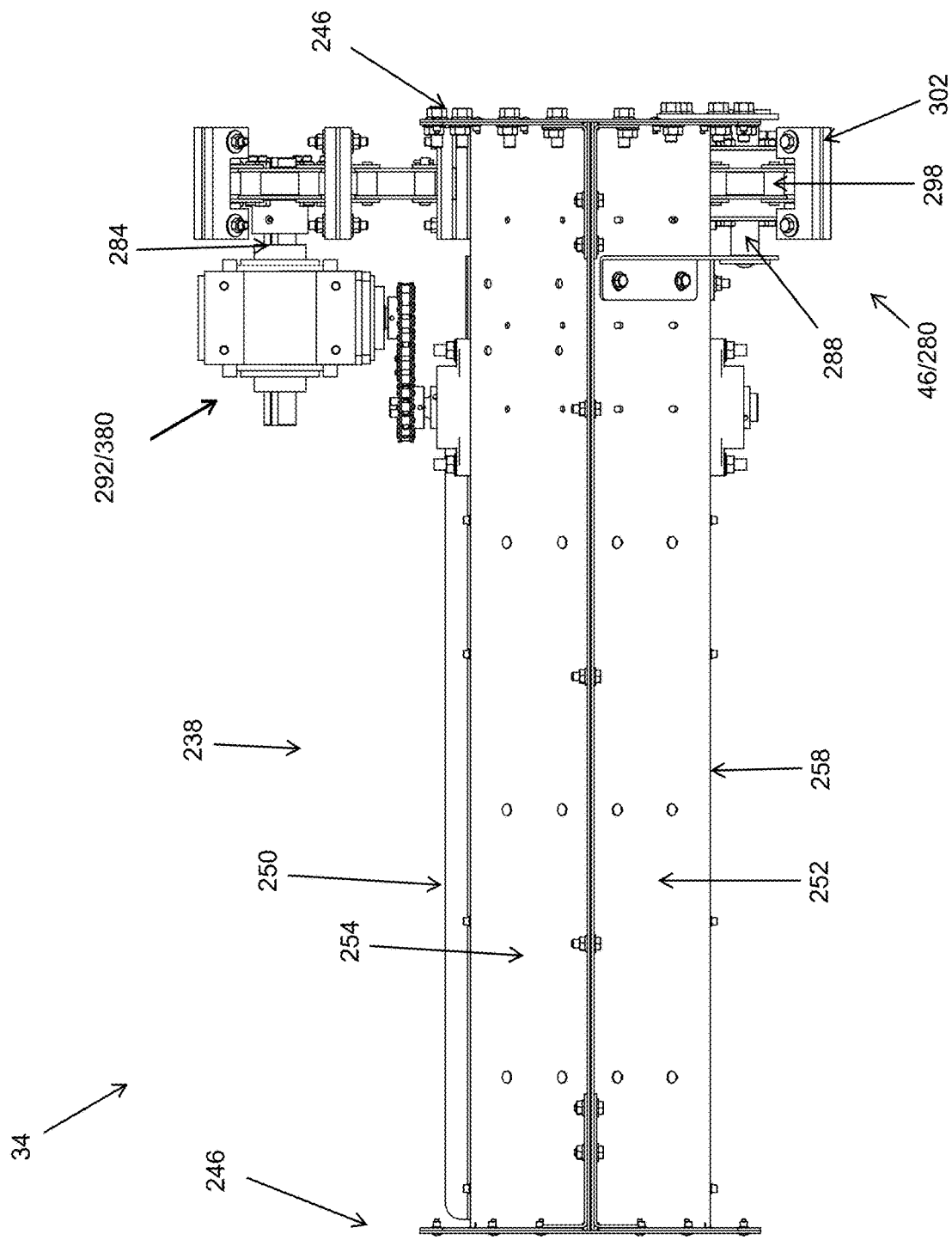
FIG. 30 shows an elevation view of a tail section of a sweep of an exemplary sweep system, in accordance with one or more embodiments; the view showing the tail section having a track driven drive system, a weldment with a front cover plate and rear cover plate, and a drivetrain.
Figure 31:
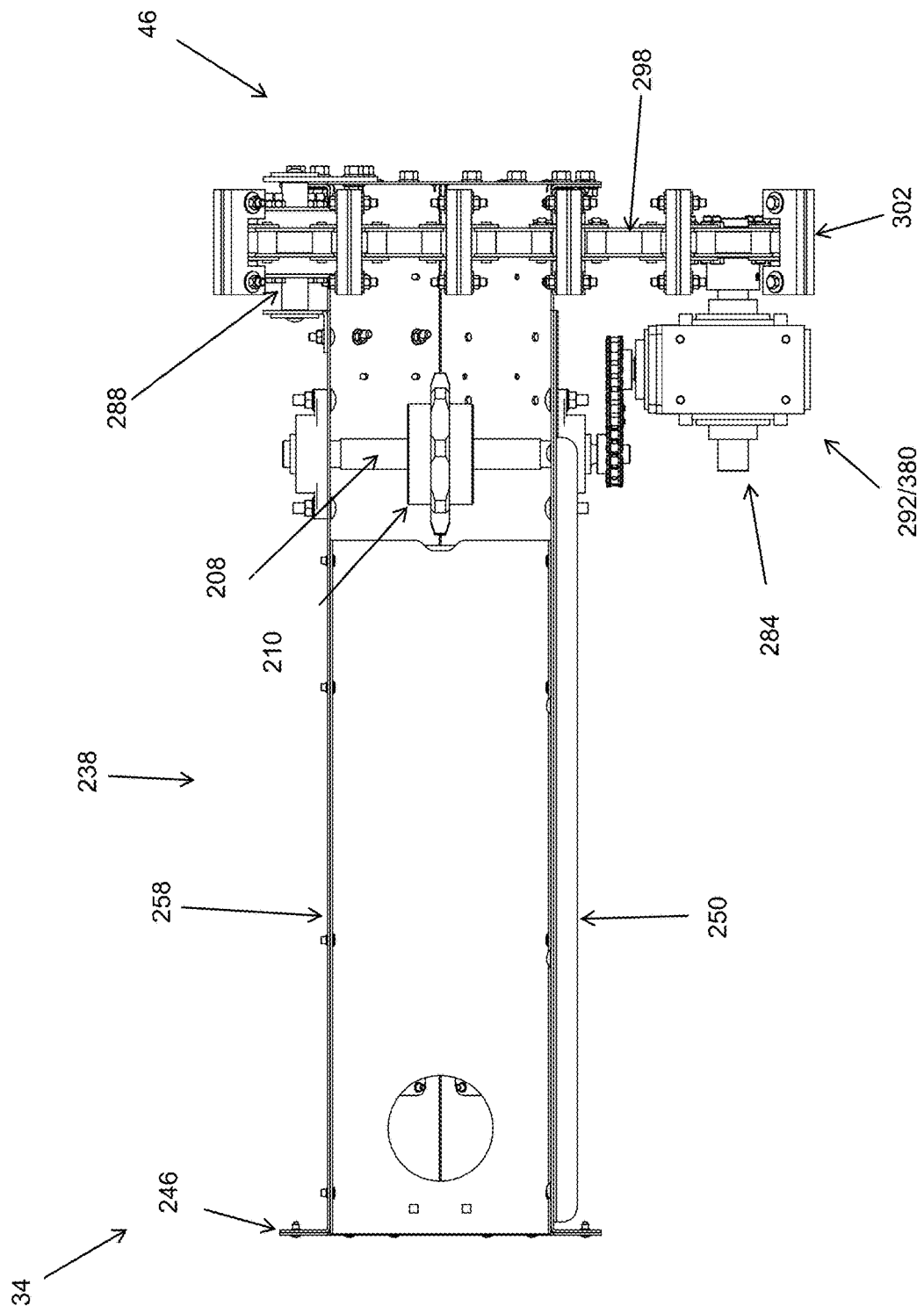
FIG. 31 shows an elevation view of a tail section of a sweep of an exemplary sweep system, in accordance with one or more embodiments; the view showing the tail section having a track driven drive system, a weldment, and a drivetrain.
Figure 32:
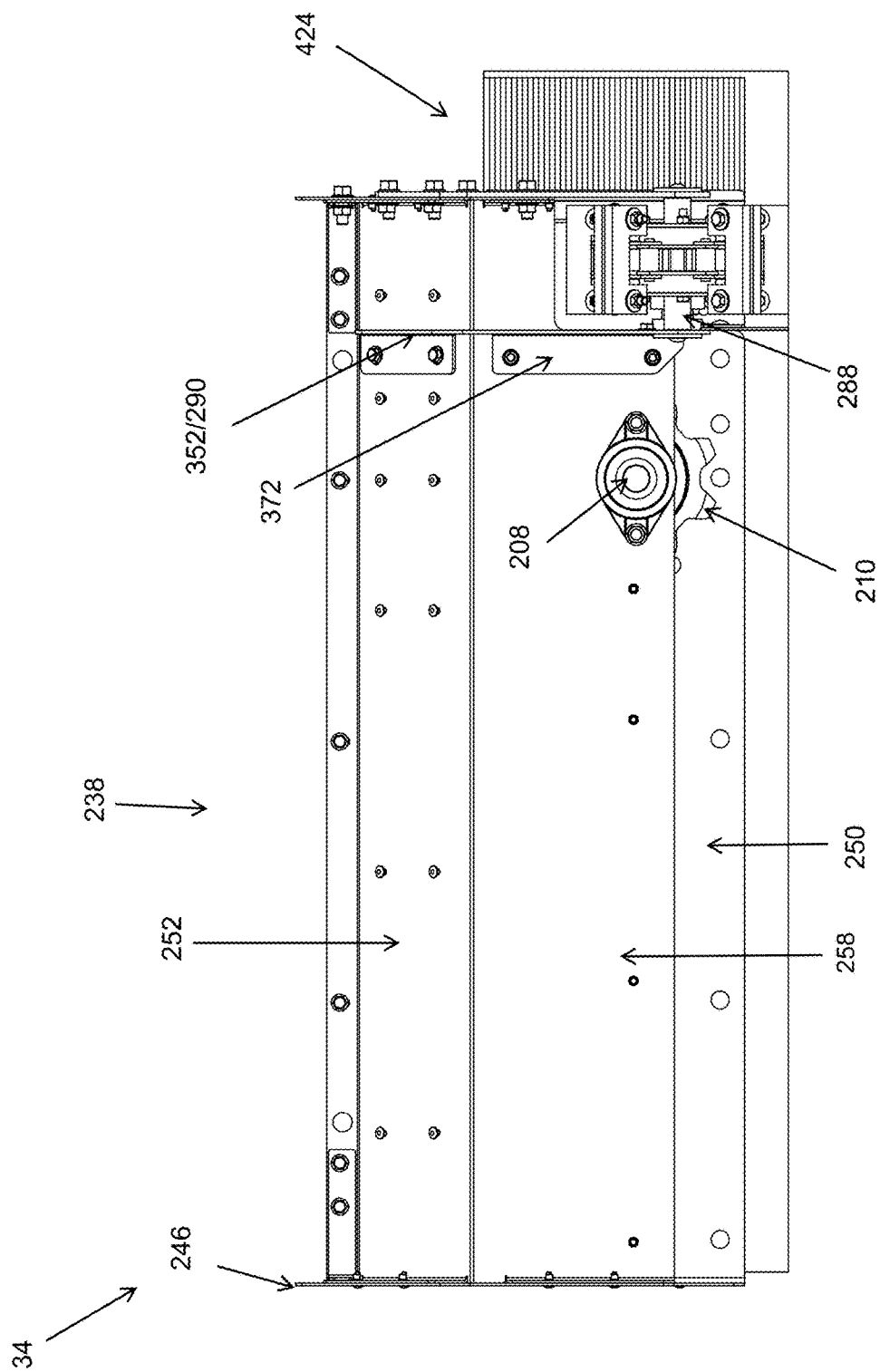
FIG. 32 shows an elevation view of a weldment of a sweep of an exemplary sweep system, in accordance with one or more embodiments; the view showing the weldment having a mounting assembly, a back plate, and a front cover plate.
Figure 33:
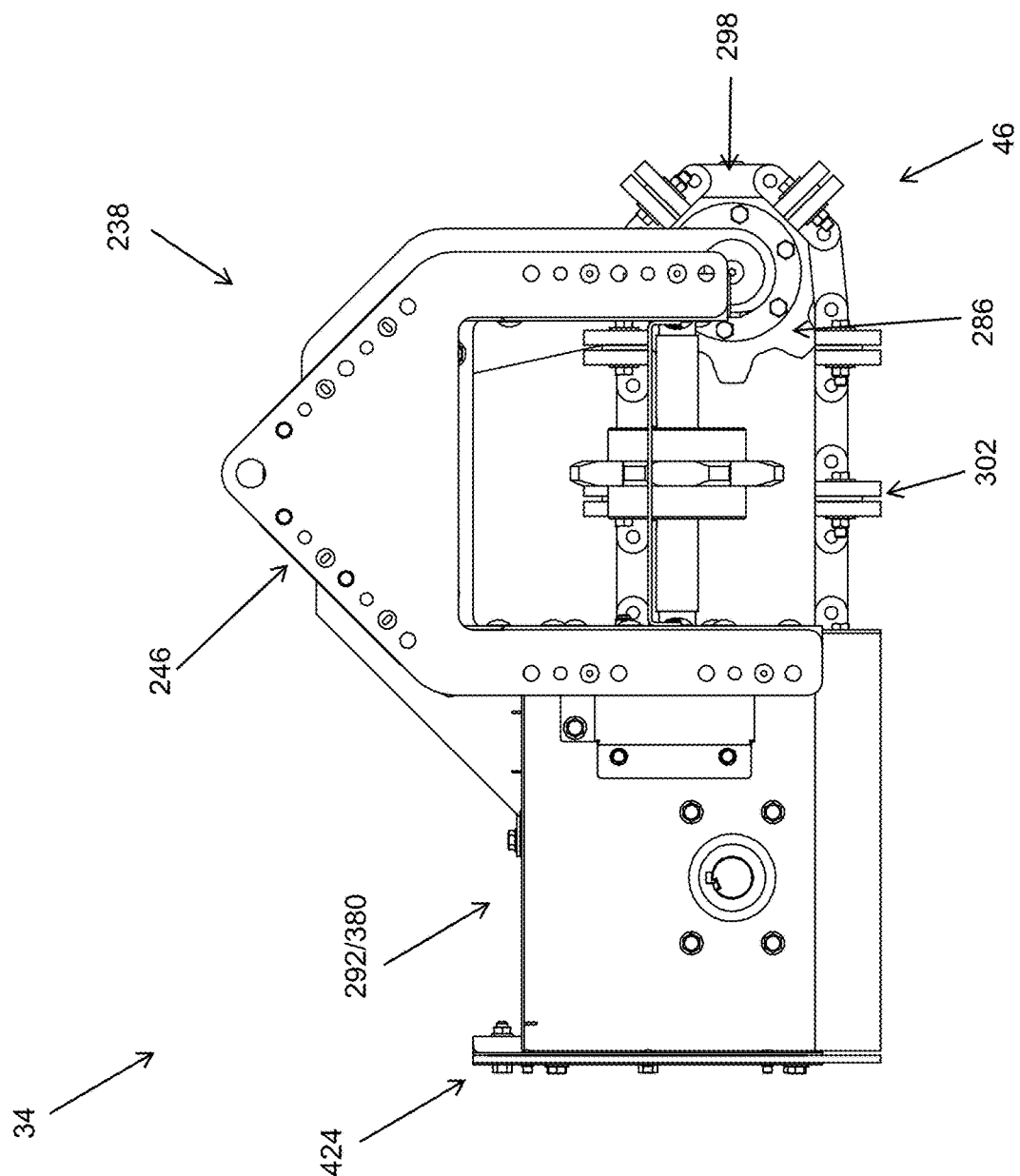
FIG. 33 shows a cross section view of a tail section of a sweep of an exemplary sweep, in accordance with one or more embodiments; the view showing the tail section having a weldment, a scraper, a gearbox, and a track driven drive system.
Figure 34:
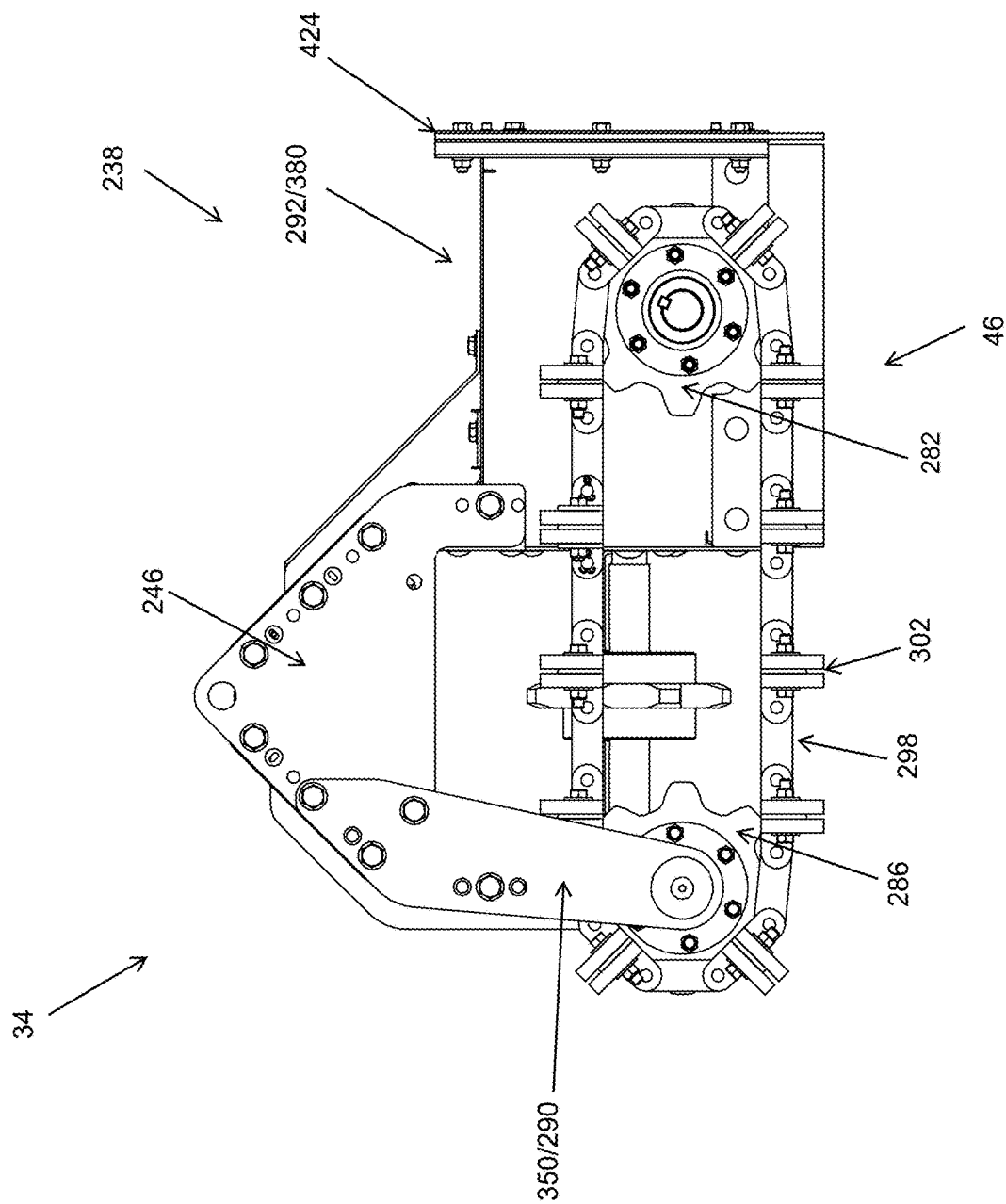
FIG. 34 shows a cross section view of a tail section of a sweep of an exemplary sweep, in accordance with one or more embodiments; the view showing the tail section having a weldment, a scraper, a gearbox, and a track driven drive system.
Figure 35:
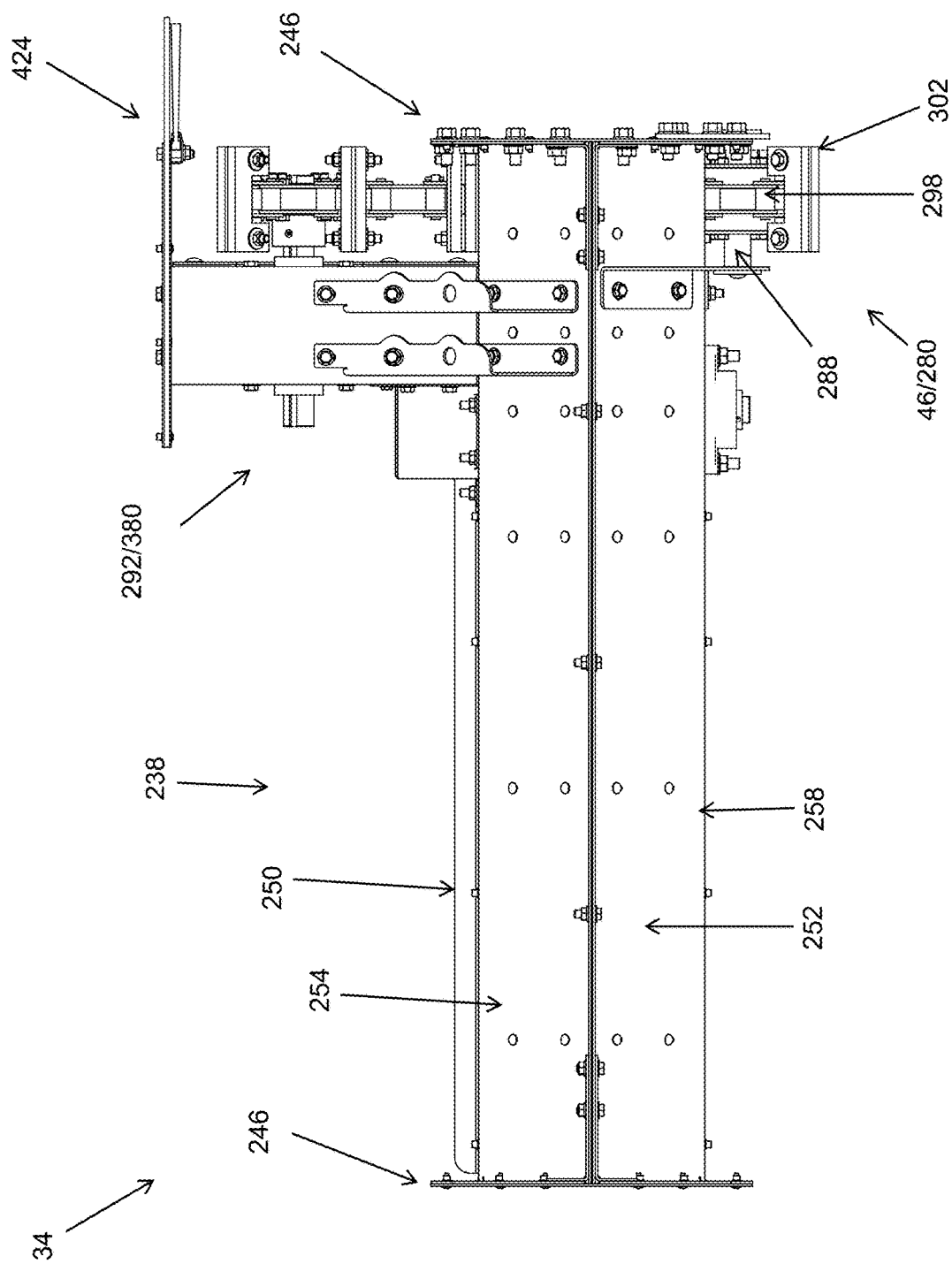
FIG. 35 shows an elevation view of a tail section of a sweep of an exemplary sweep system, in accordance with one or more embodiments; the view showing the tail section having a track driven drive system, a weldment, and a drivetrain.
Figure 36:
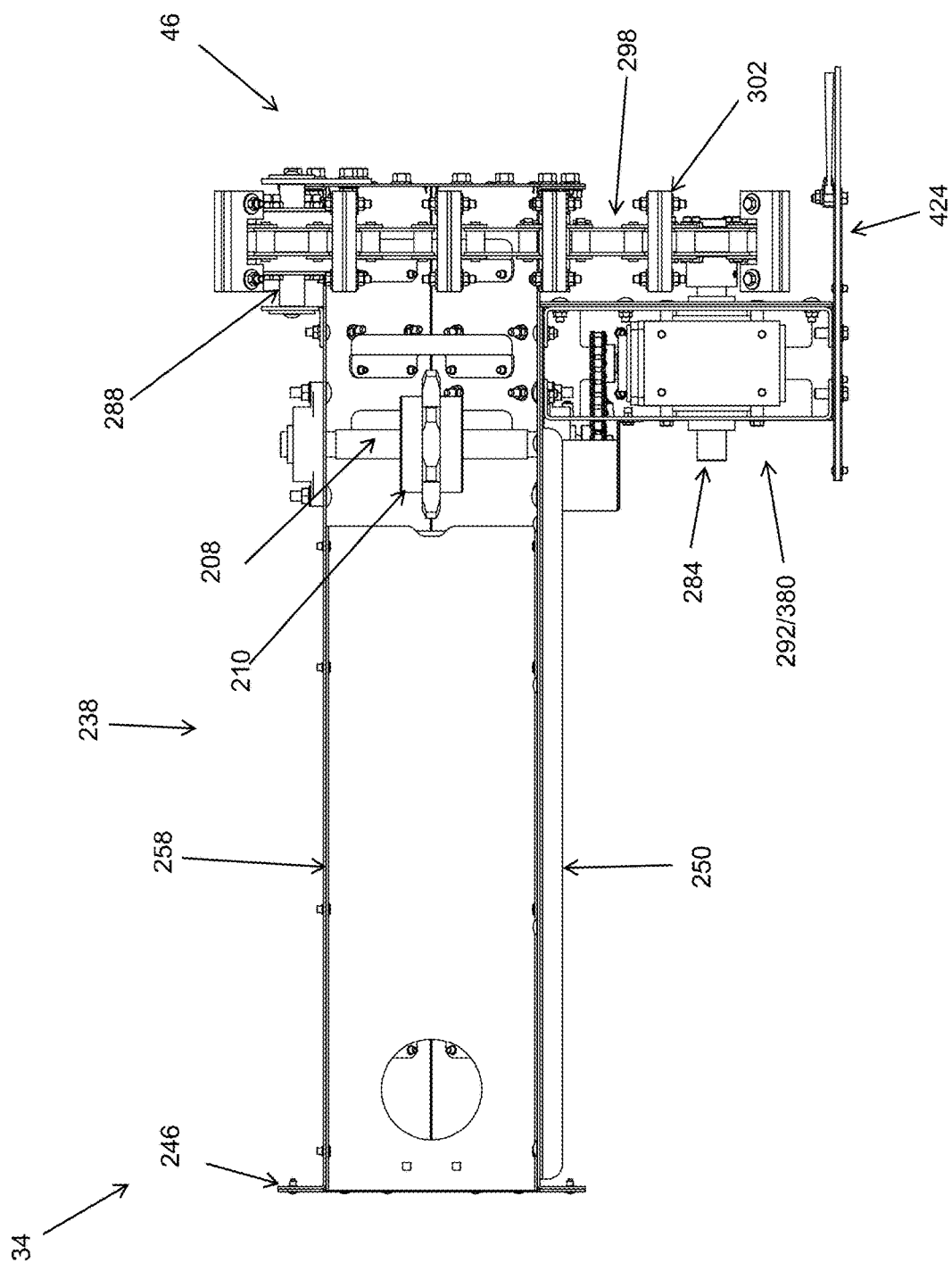
FIG. 36 shows an elevation view of a tail section of a sweep of an exemplary sweep system, in accordance with one or more embodiments; the view showing the tail section having a track driven drive system, a weldment with a back plate and front plate, and a drivetrain.
Figure 37:
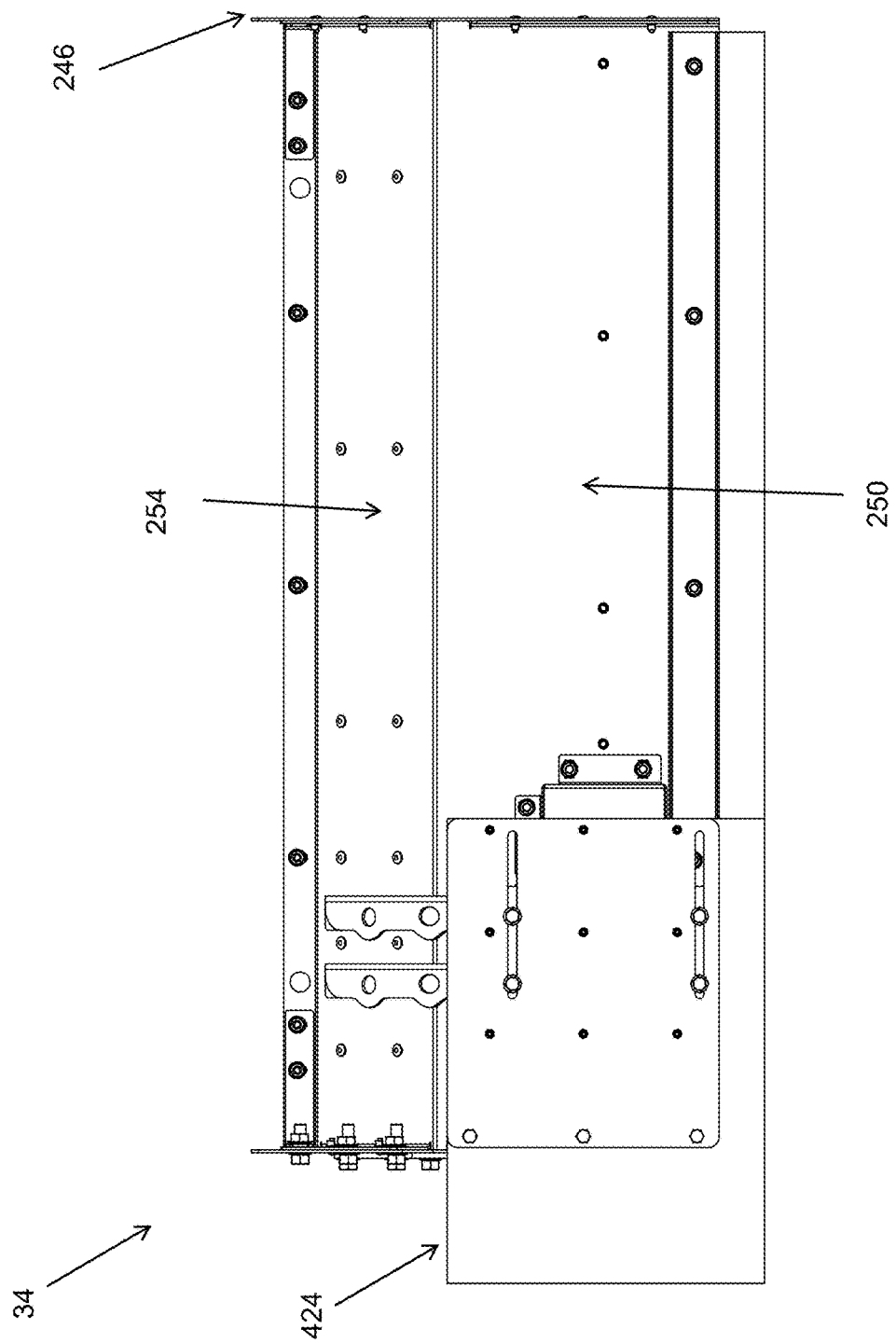
FIG. 37 shows a rear elevation view of a tail section of a sweep of an exemplary sweep system, in accordance with one or more embodiments; the view showing the tail section having a scraper and a weldment with a back plate and rear cover plate.
Figure 38:
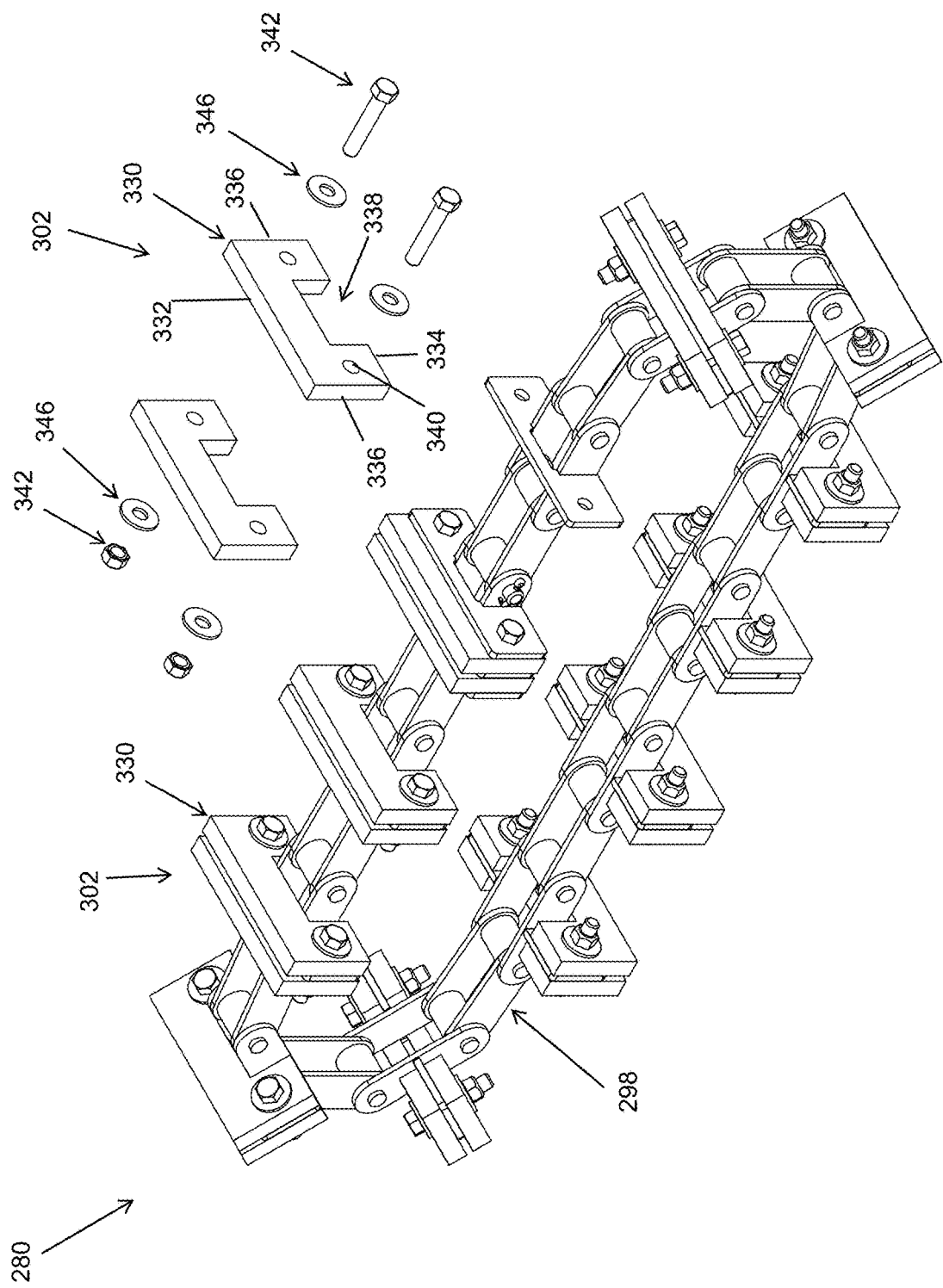
FIG. 38 shows an exploded perspective view of a continuous track, in accordance with one or more embodiments; the view showing the continuous track having a chain, tracks, paddles with an upper edge, lower edge, side edges, and a cutaway.
Figure 39:
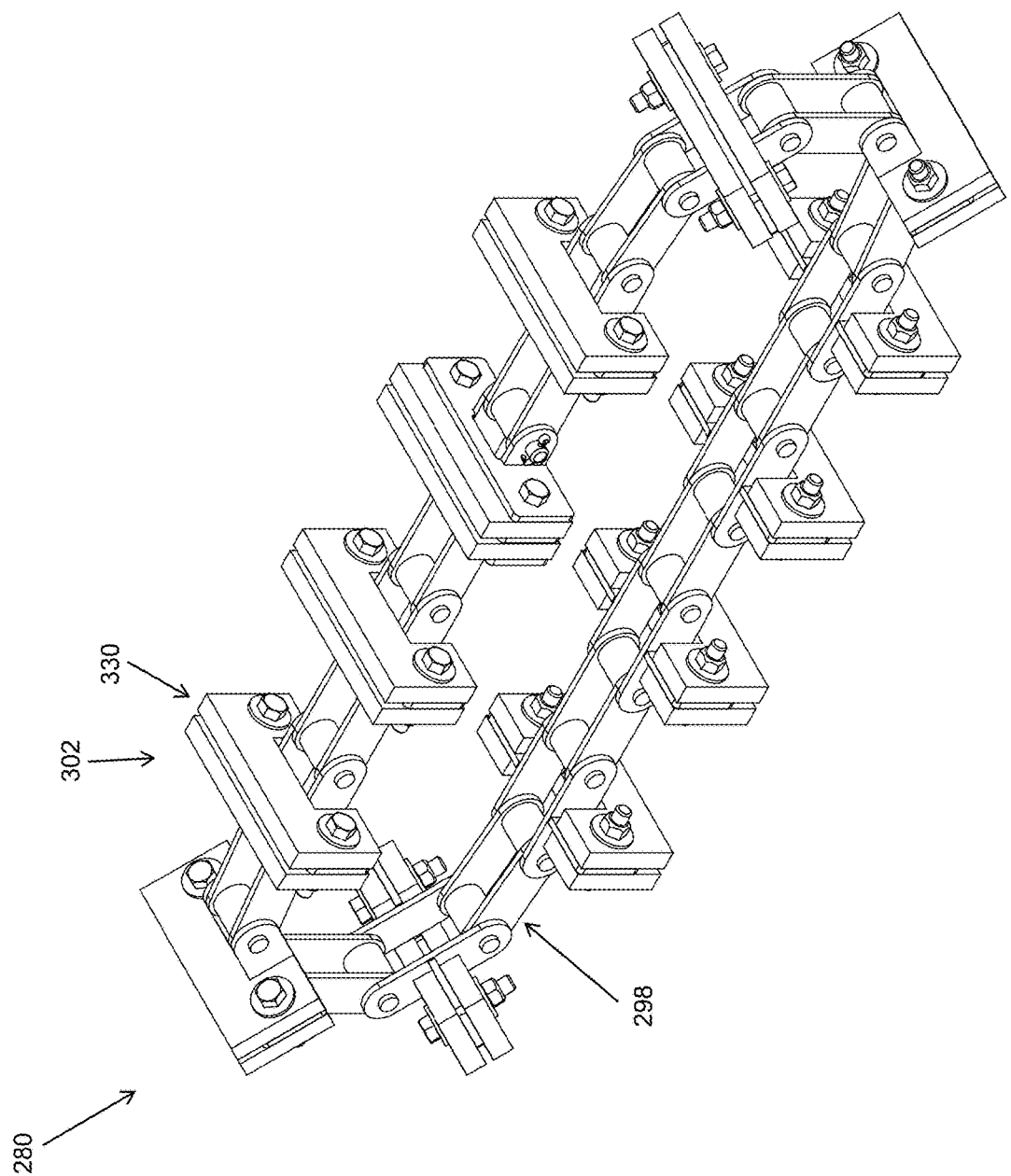
FIG. 39 shows a perspective view of a continuous track, in accordance with one or more embodiments; the view showing the continuous track having a chain, tracks, and paddles.
Figure 40:
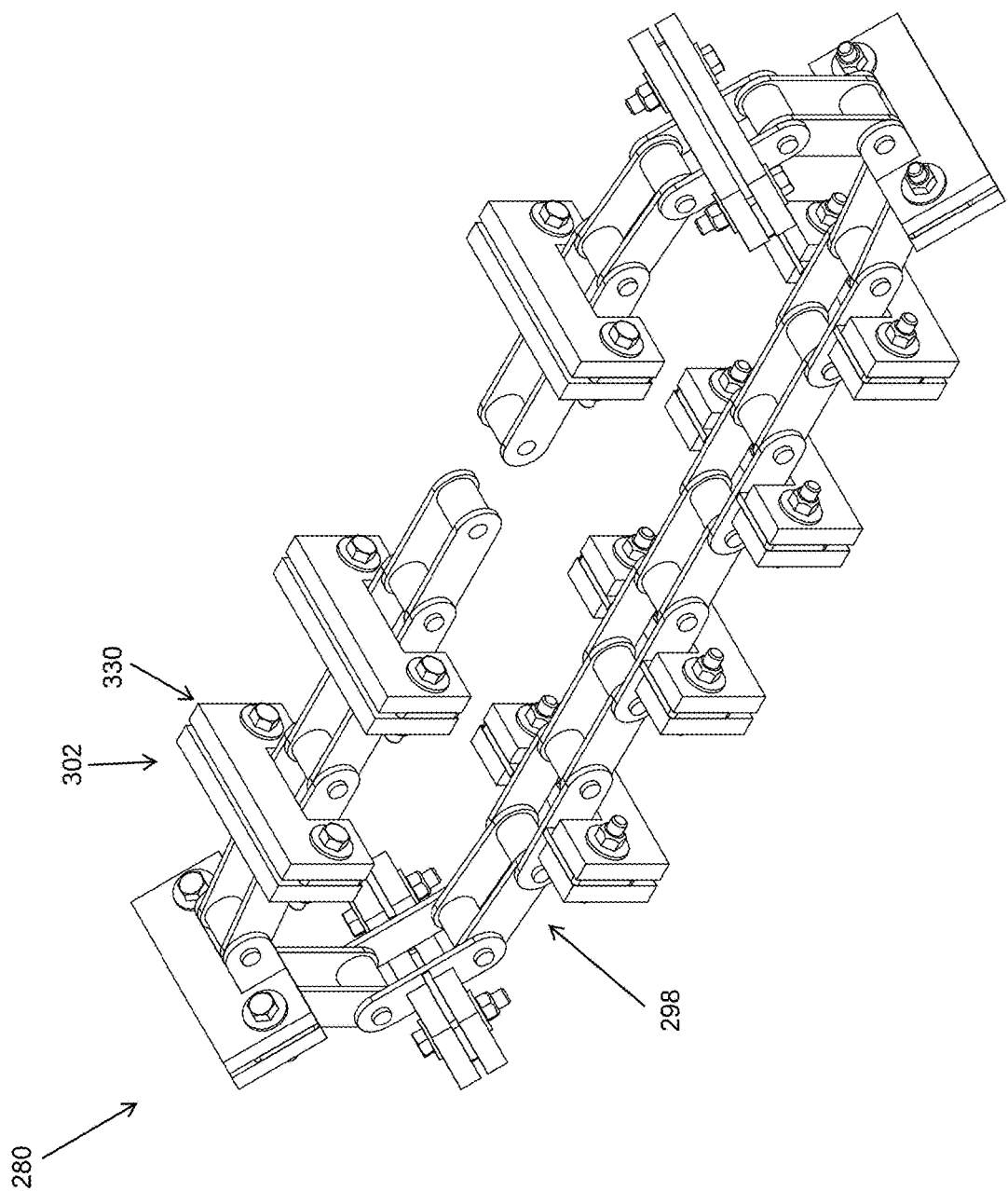
FIG. 40 shows a perspective view of a continuous track, in accordance with one or more embodiments; the view showing the continuous track having a chain, tracks, and paddles.
Figure 41:
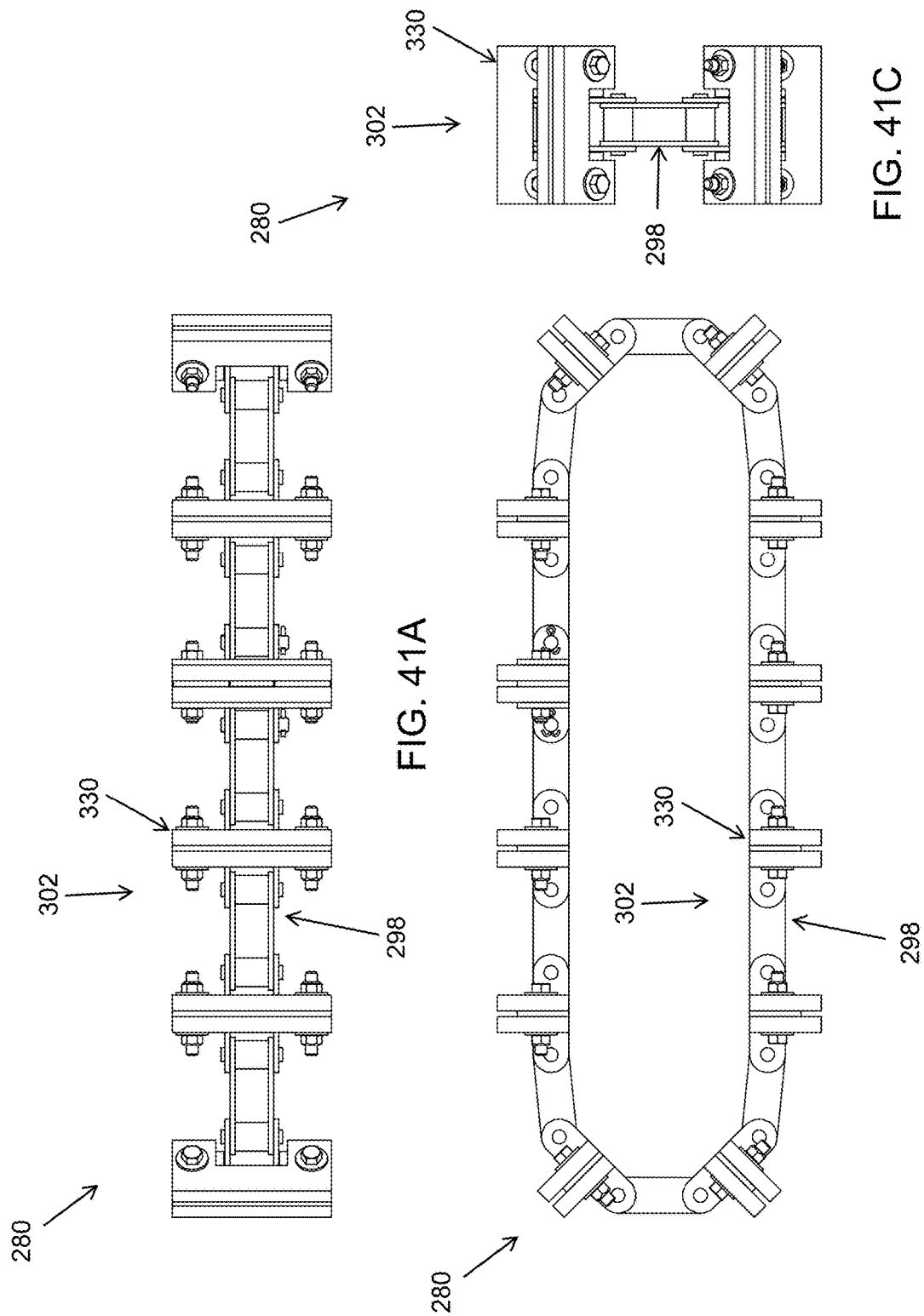
FIG. 41A shows an elevation view of a chain of a continuous track, in accordance with one or more embodiments; the view showing the chain having paddles and tracks.
FIG. 41B shows an elevation view of a chain of a continuous track, in accordance with one or more embodiments; the view showing the chain having paddles and tracks.
FIG. 41C shows an elevation view of a chain of a continuous track, in accordance with one or more embodiments; the view showing the chain having paddles and tracks.
Figure 42:
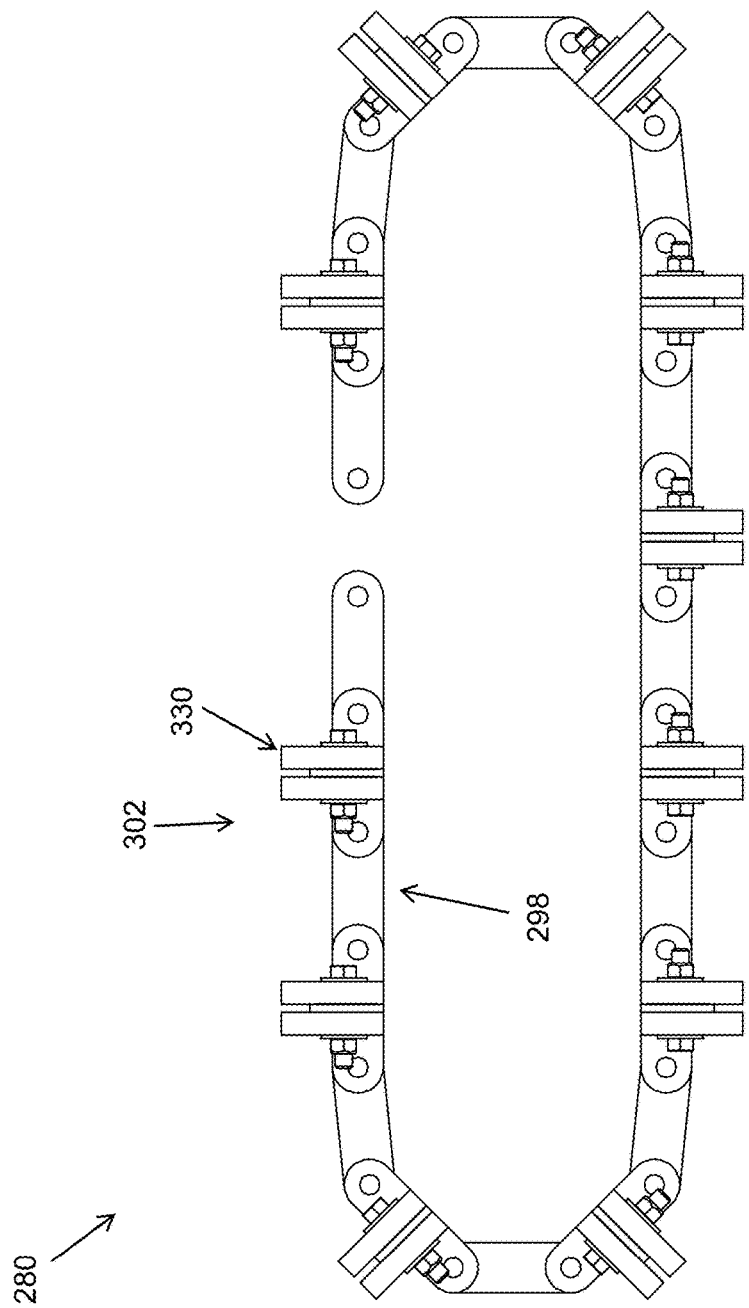
FIG. 42 shows an elevation view of a chain of a continuous track, in accordance with one or more embodiments; the view showing the chain having paddles and tracks.
Figure 43:
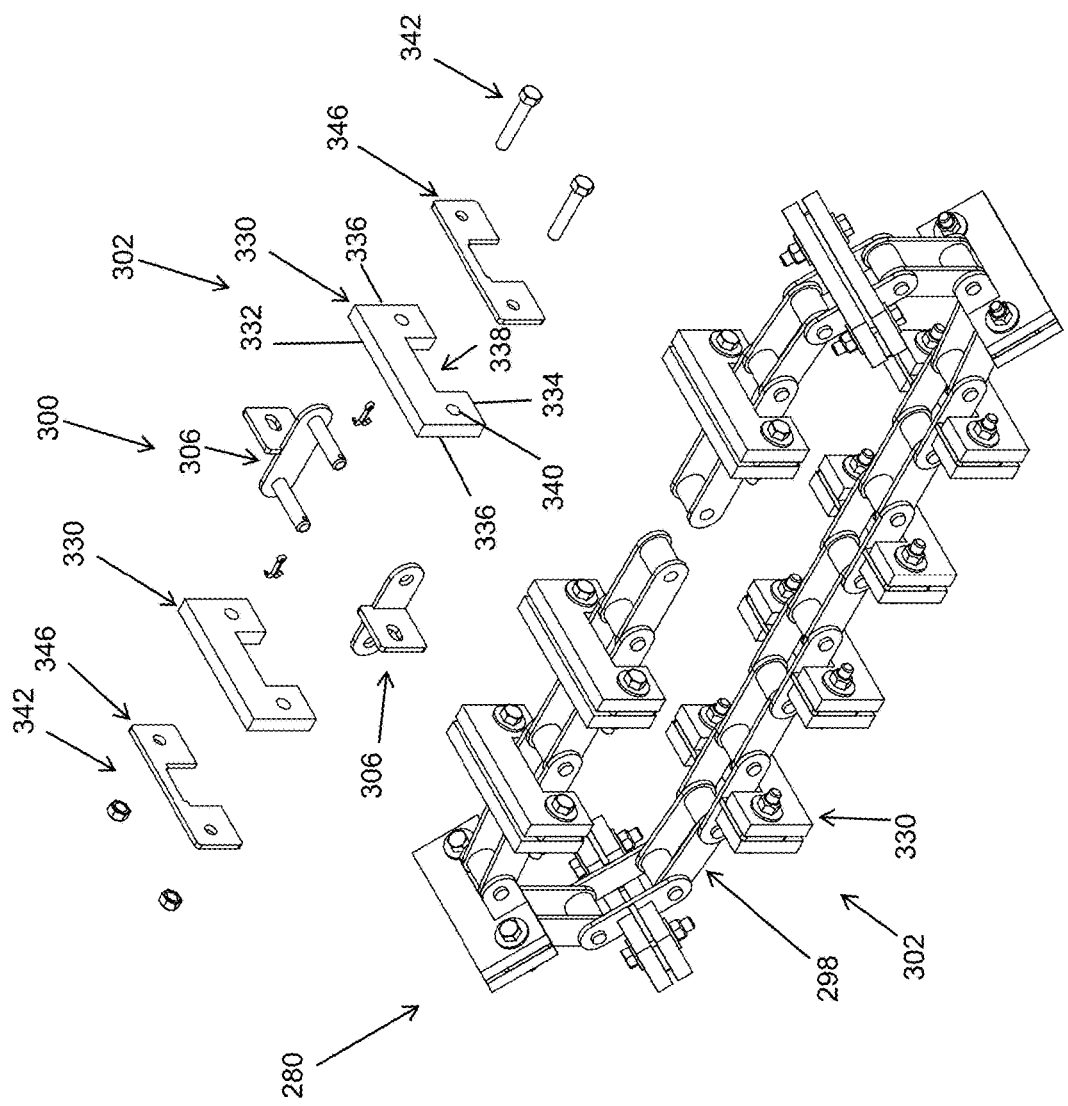
FIG. 43 shows an elevation view of a chain of a continuous track, in accordance with one or more embodiments; the view showing the chain having paddles and tracks; the view showing the components of the paddles.
Figure 44:
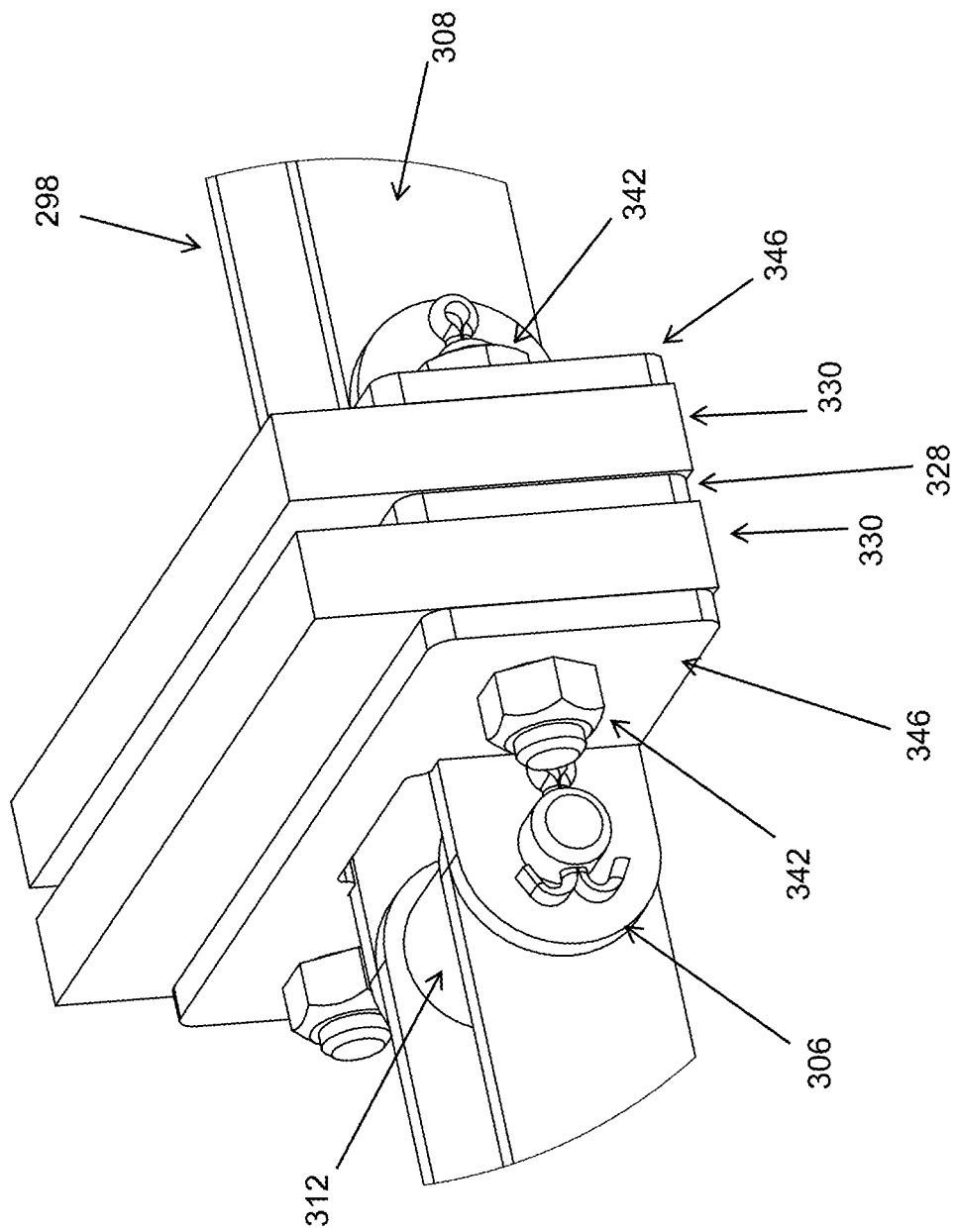
FIG. 44 shows a close up elevation view of the chain of a continuous track, in accordance with one or more embodiments, the view showing a paddle, an inner plate, and an outer plate.
Figure 45:
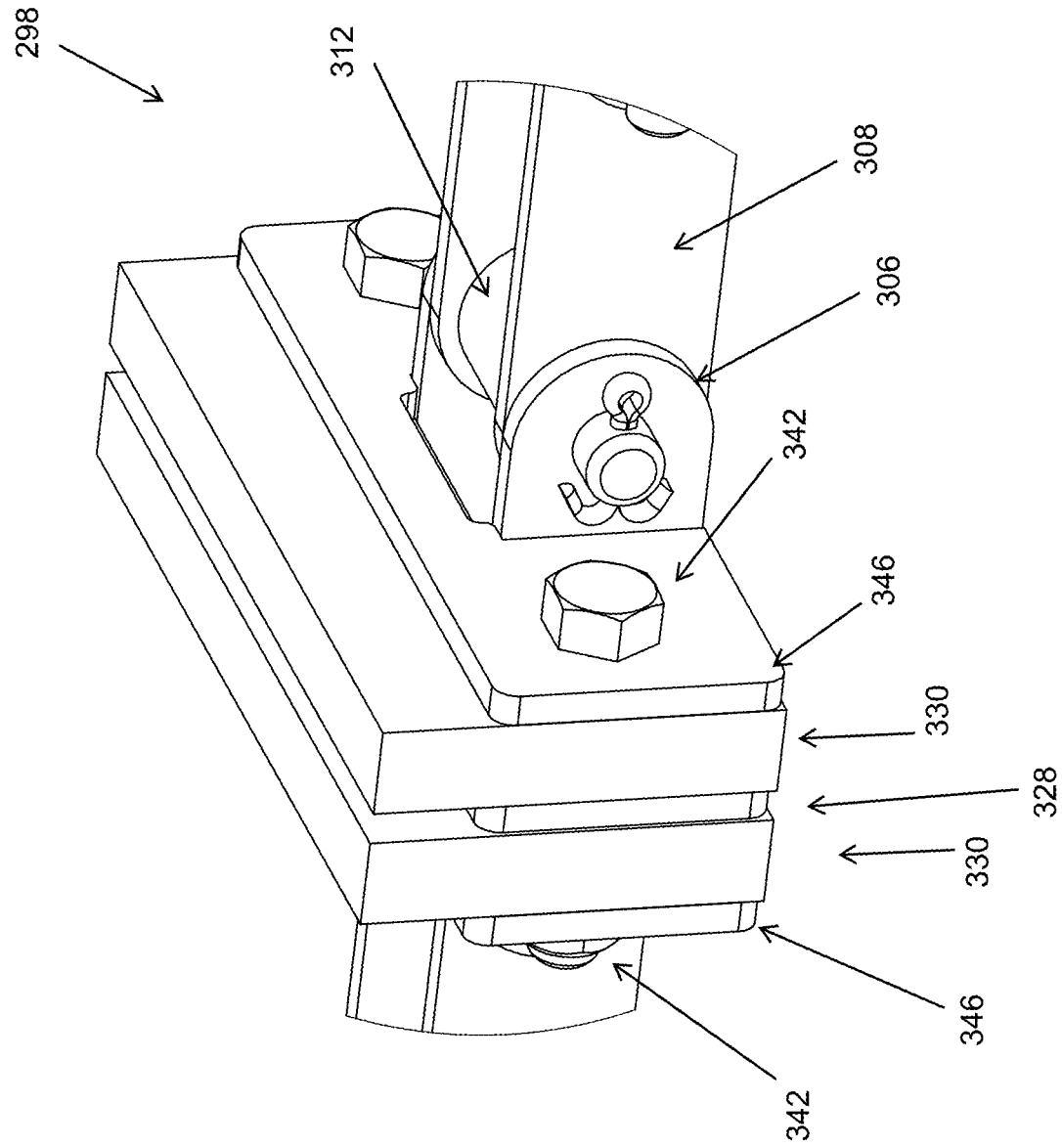
FIG. 45 shows a close up elevation view of the chain of a continuous track, in accordance with one or more embodiments, the view showing a paddle, an inner plate, and an outer plate.
Figure 46:
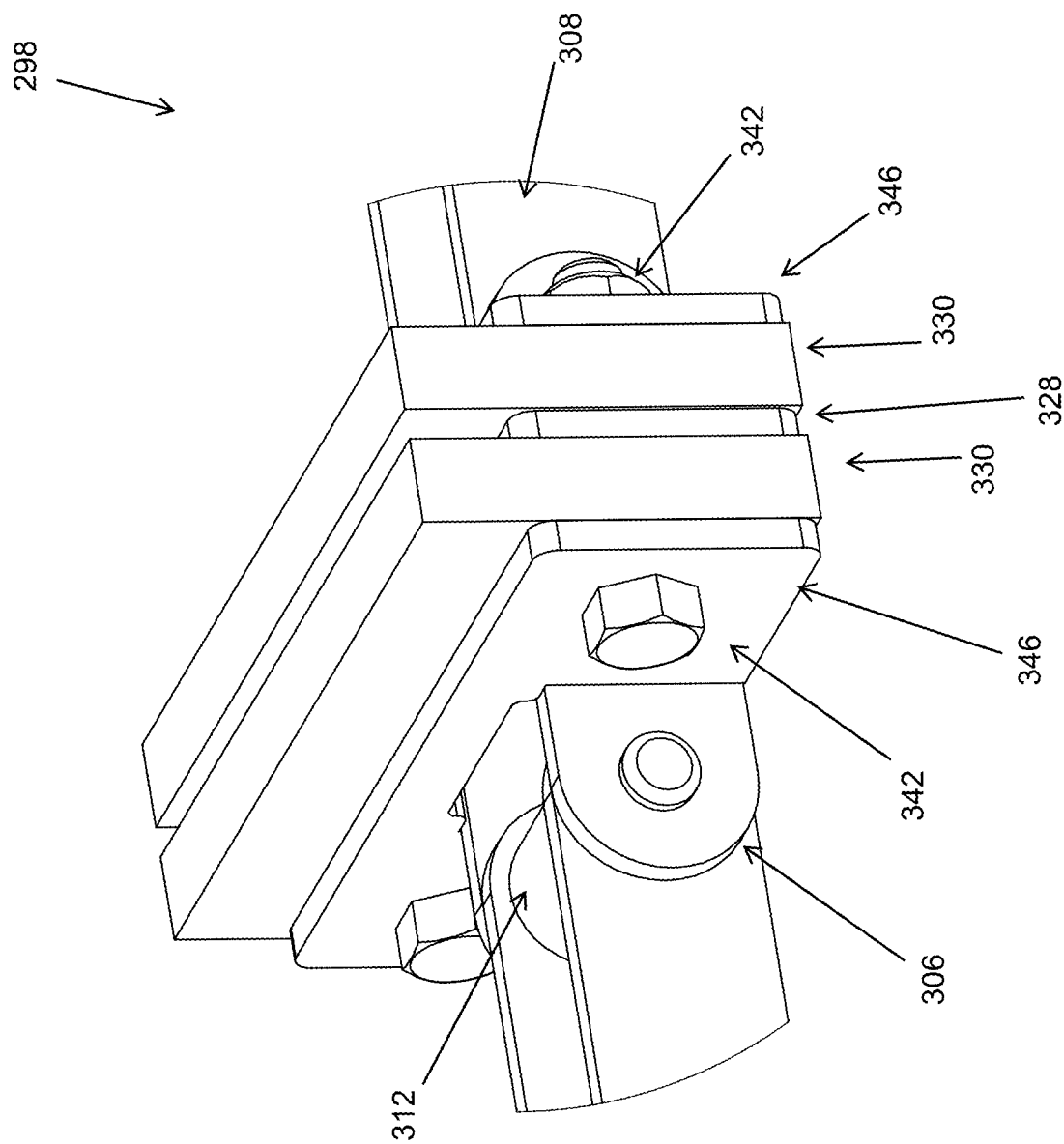
FIG. 46 shows a close up elevation view of the chain of a continuous track, in accordance with one or more embodiments, the view showing a paddle, an inner plate, and an outer plate.
Figure 47:
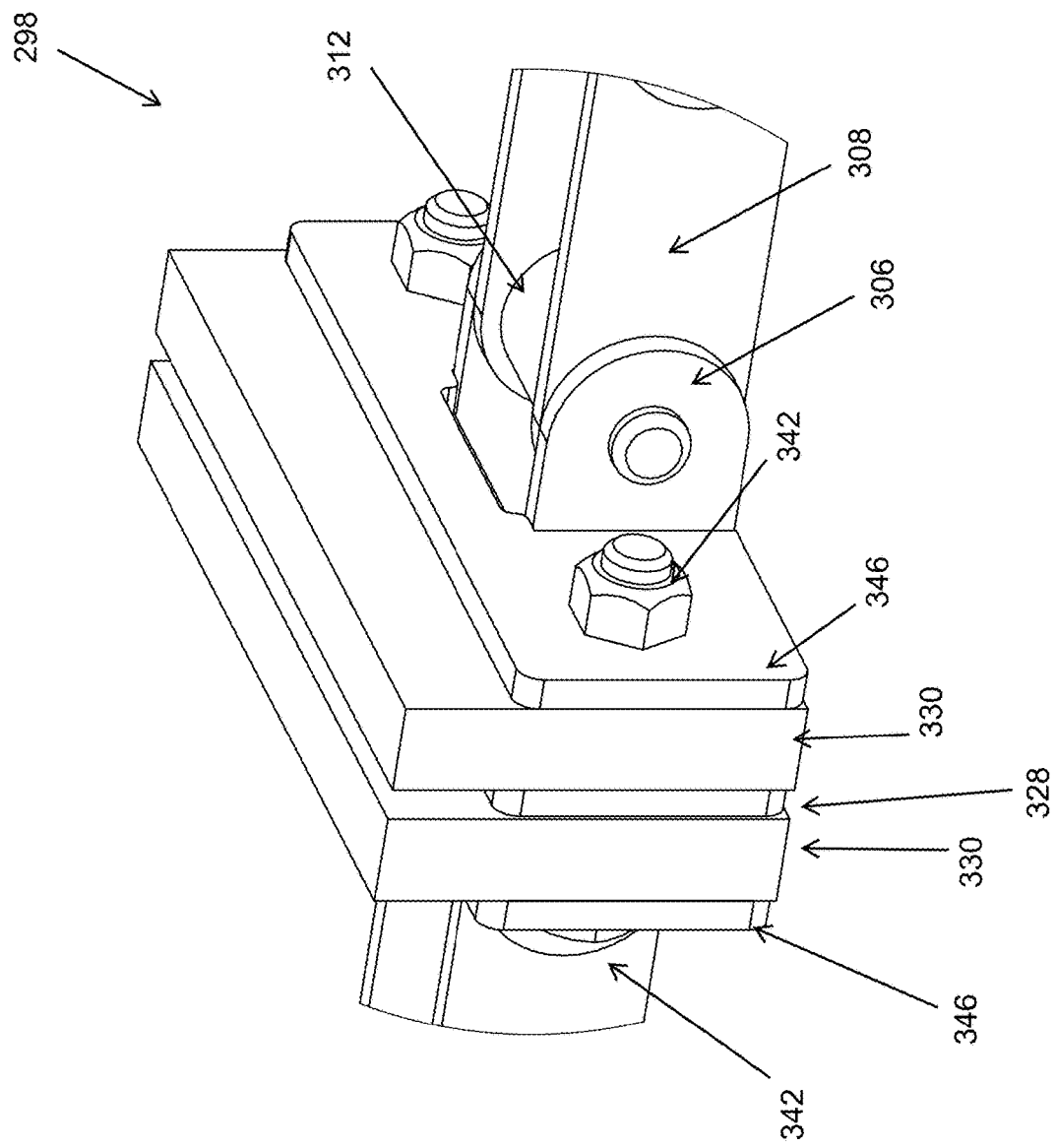
FIG. 47 shows a close up elevation view of the chain of a continuous track, in accordance with one or more embodiments, the view showing a paddle, an inner plate, and an outer plate.
Figure 48:
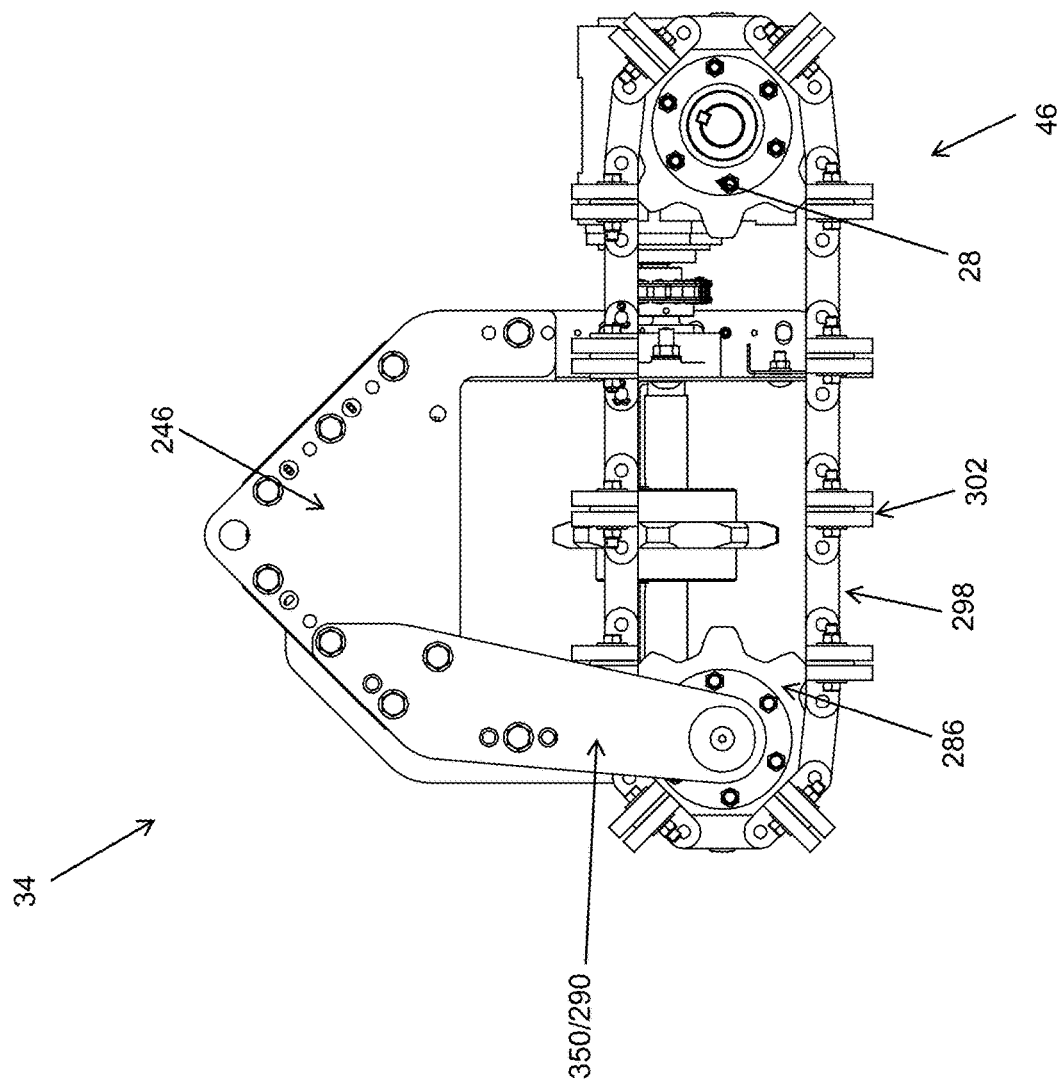
FIG. 48 shows a cross section view of a tail section of a sweep of an exemplary sweep, in accordance with one or more embodiments; the view showing the tail section having a weldment, a scraper, a mounting assembly, and a track driven drive system.
Figure 49:
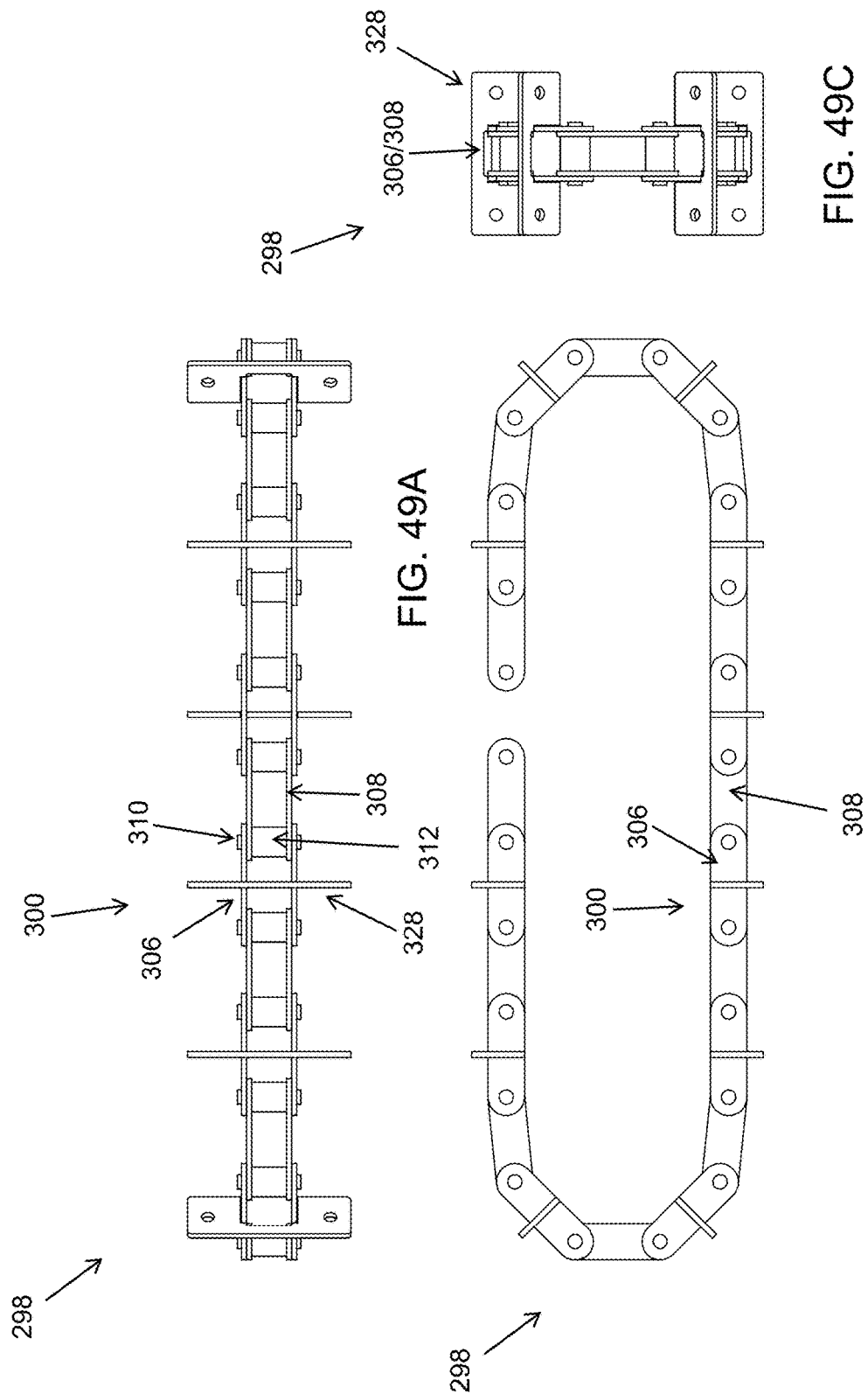
FIG. 49A shows an elevation view of the chain of a continuous track, in accordance with one or more embodiments, the view showing the chain having flanges, inner plates, and outer plates.
FIG. 49B shows an elevation view of the chain of a continuous track, in accordance with one or more embodiments, the view showing the chain having inner plates and outer plates.
FIG. 49C shows an elevation view of the chain of a continuous track, in accordance with one or more embodiments, the view showing the chain having flanges, inner plates, and outer plates.
Figure 50:
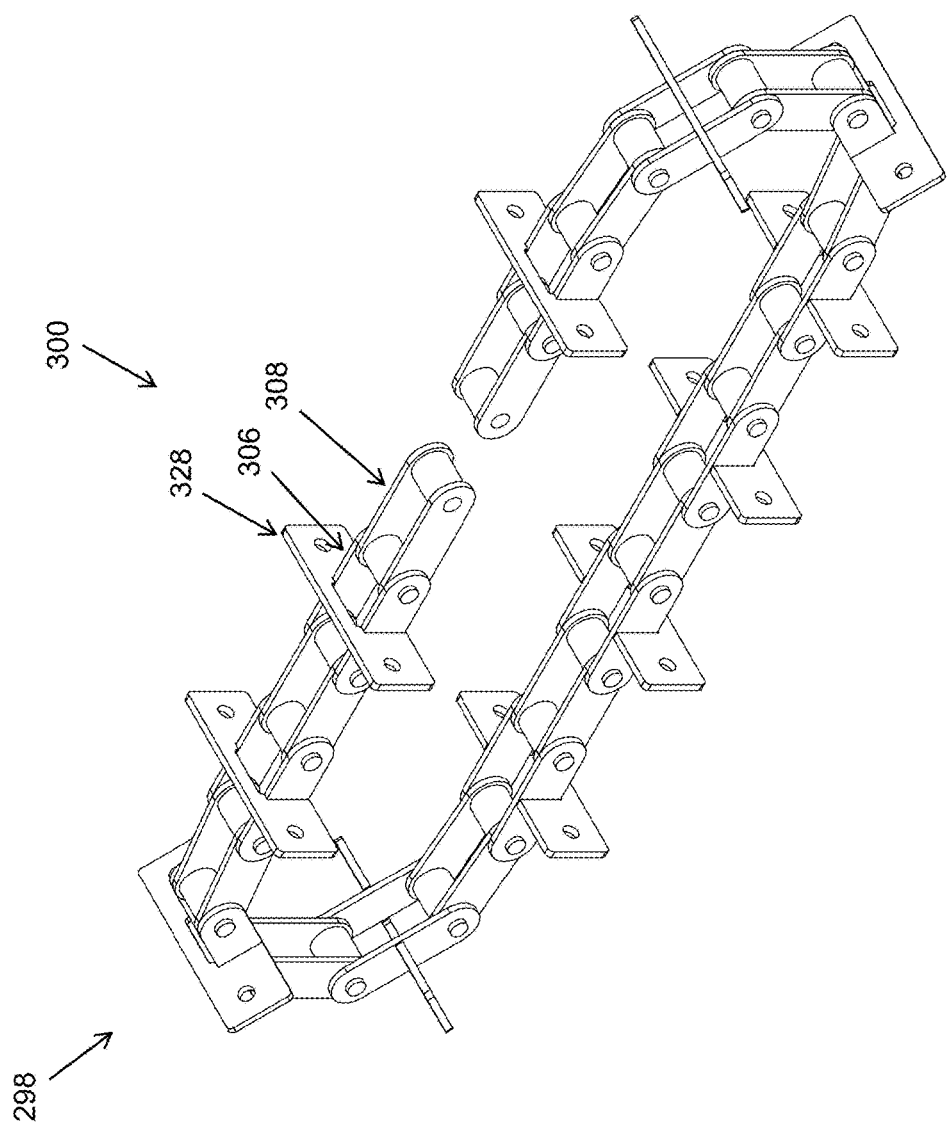
FIG. 50 shows a perspective view of the chain of a continuous track, in accordance with one or more embodiments, the view showing the chain having flanges, inner plates, and outer plates.
Figure 51:
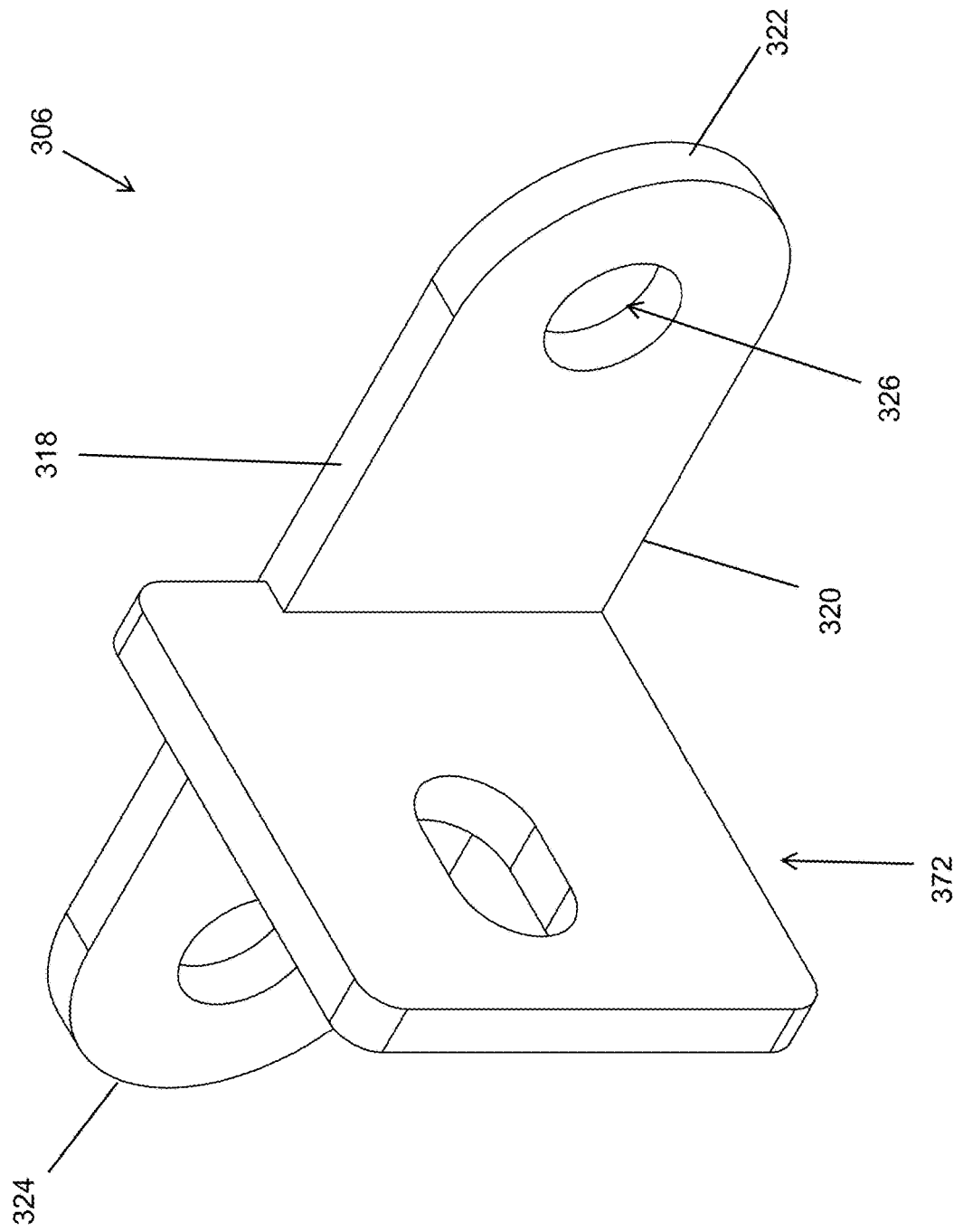
FIG. 51 shows a close up front perspective view of the outer plate of the chain of the continuous track, in accordance with one or more embodiments; the view showing the outer plate having a rear edge, a lower edge, a hole, an upper edge, and a front edge.
Figure 52:
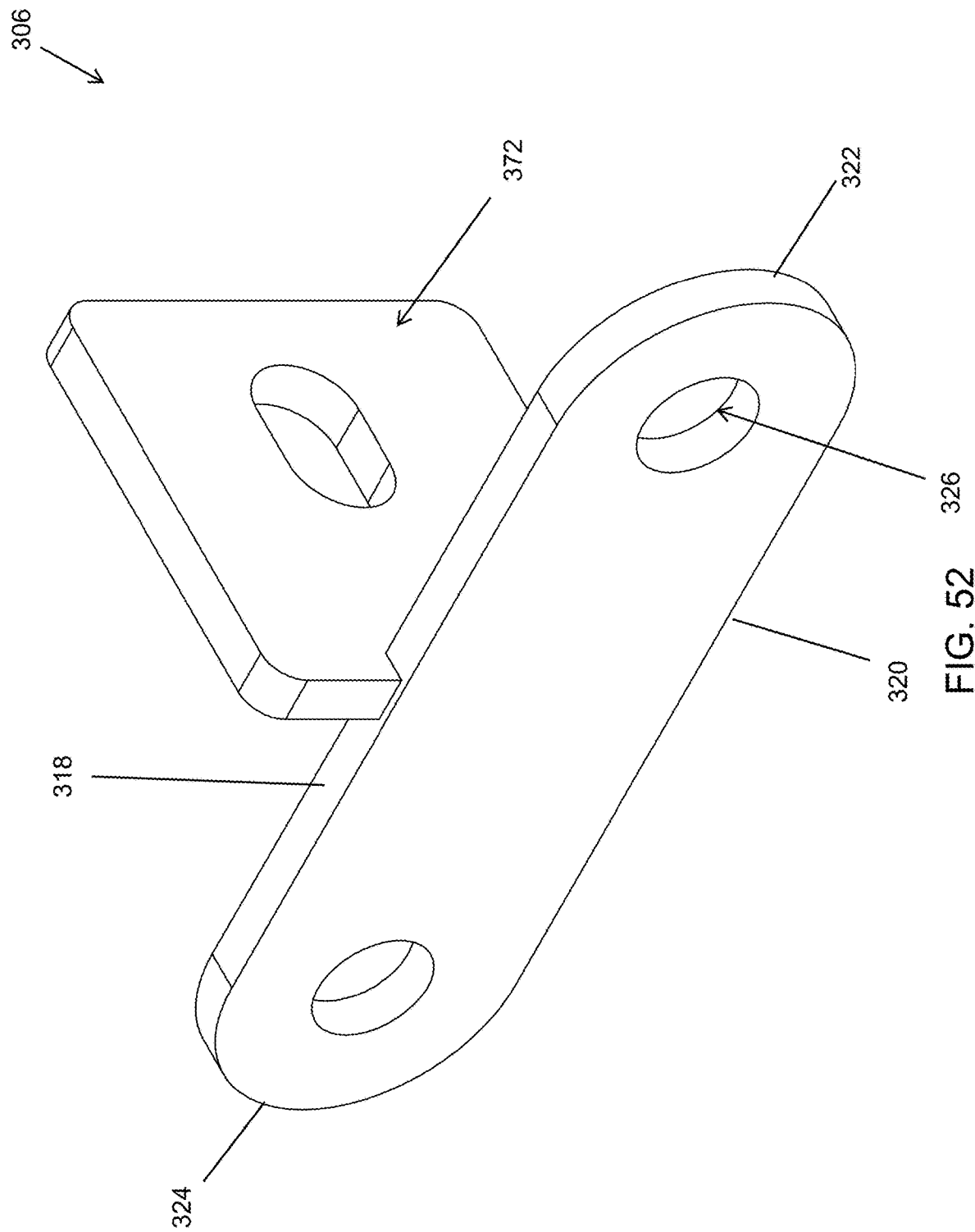
FIG. 52 shows a close up rear perspective view of the outer plate of the chain of the continuous track, in accordance with one or more embodiments; the view showing the outer plate having a rear edge, a lower edge, a hole, an upper edge, and a front edge.
Figure 54:
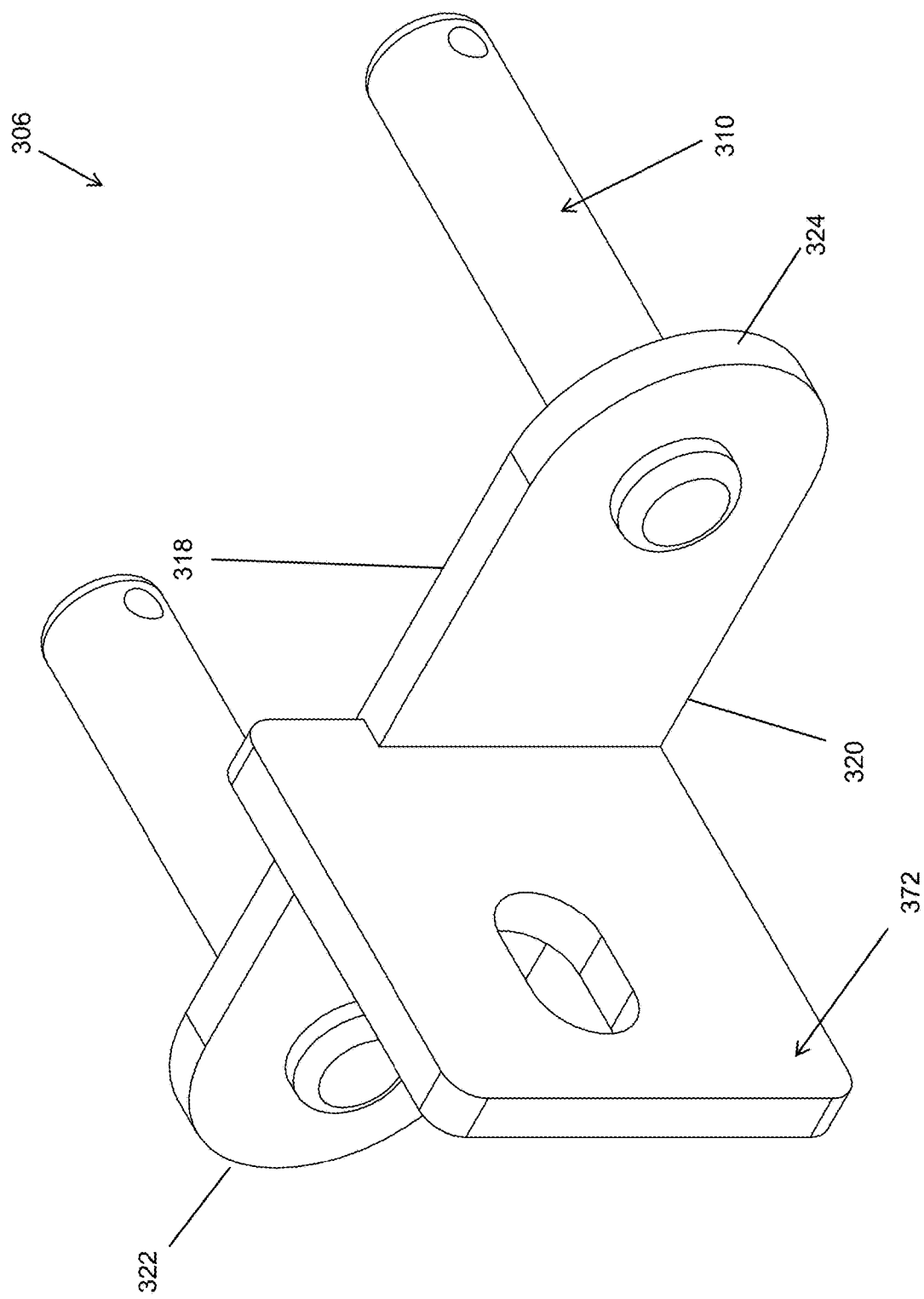
FIG. 54 shows a close up rear perspective view of the outer plate of the chain of the continuous track, in accordance with one or more embodiments; the view showing the outer plate having a rear edge, a lower edge, an upper edge, a front edge, and pins.
Figure 58:
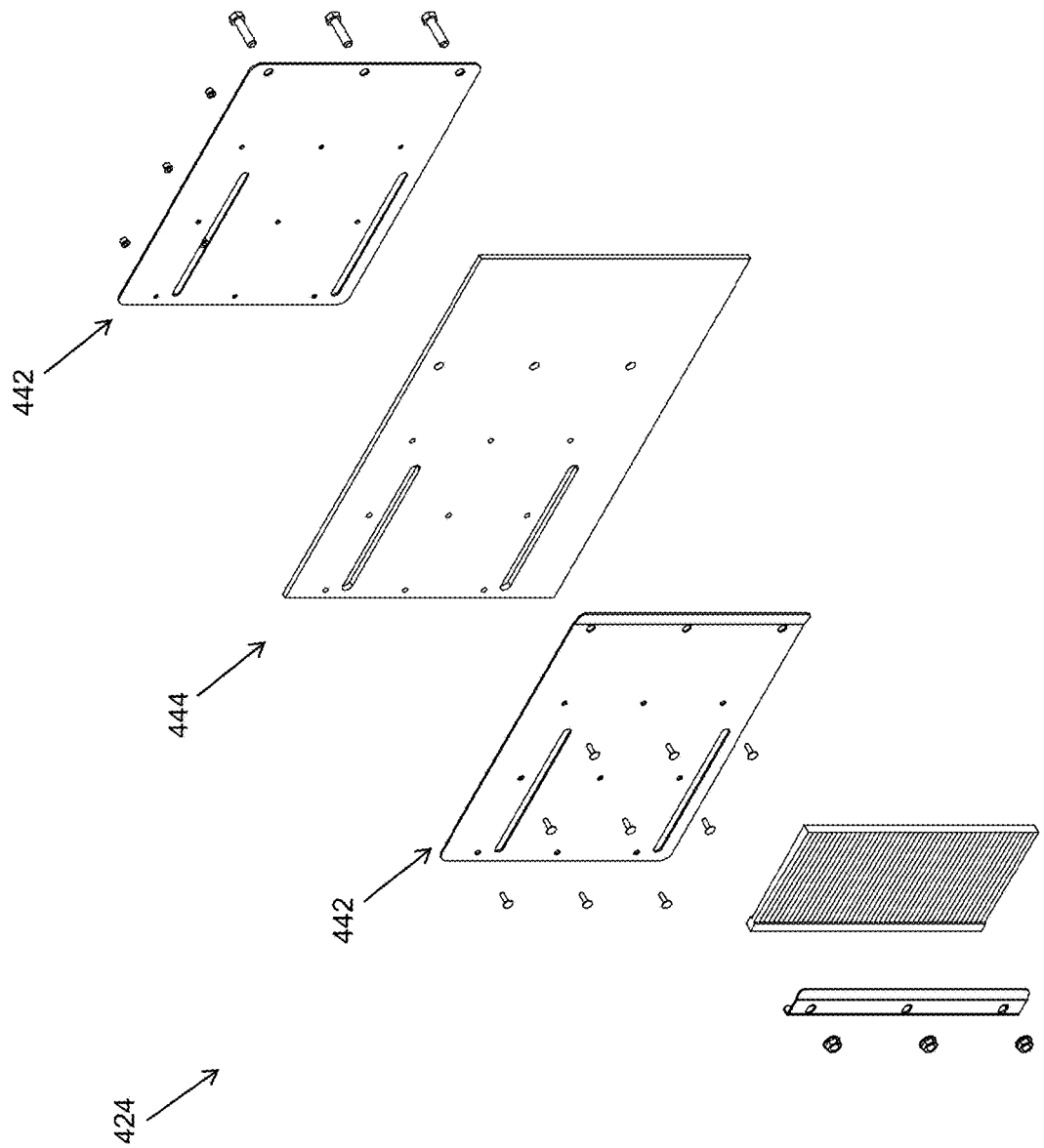
FIG. 58 shows an exploded perspective view of the scraper of the sweep of an exemplary sweep system, in accordance with one or more embodiments; the view showing the scraper having a flexible member and a rigid support member.
Figure 59:
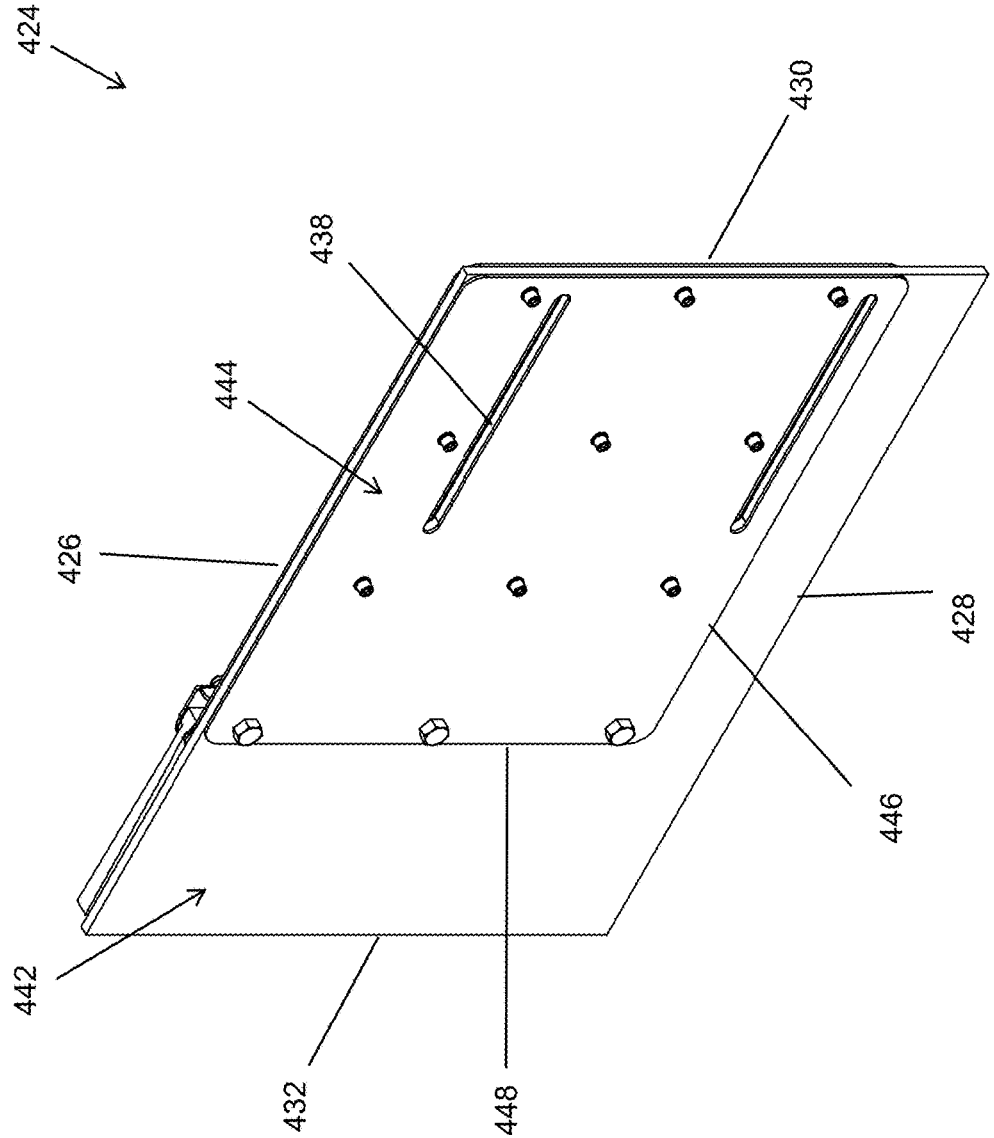
FIG. 59 shows a close up perspective view of the scraper of the sweep of an exemplary sweep system, in accordance with one or more embodiments; the view showing the scraper having a upper edge, lower edge, inner edge, outer edge; the view also showing a flexible member and a rigid support member with a lower edge and an outer edge.
Figure 60:
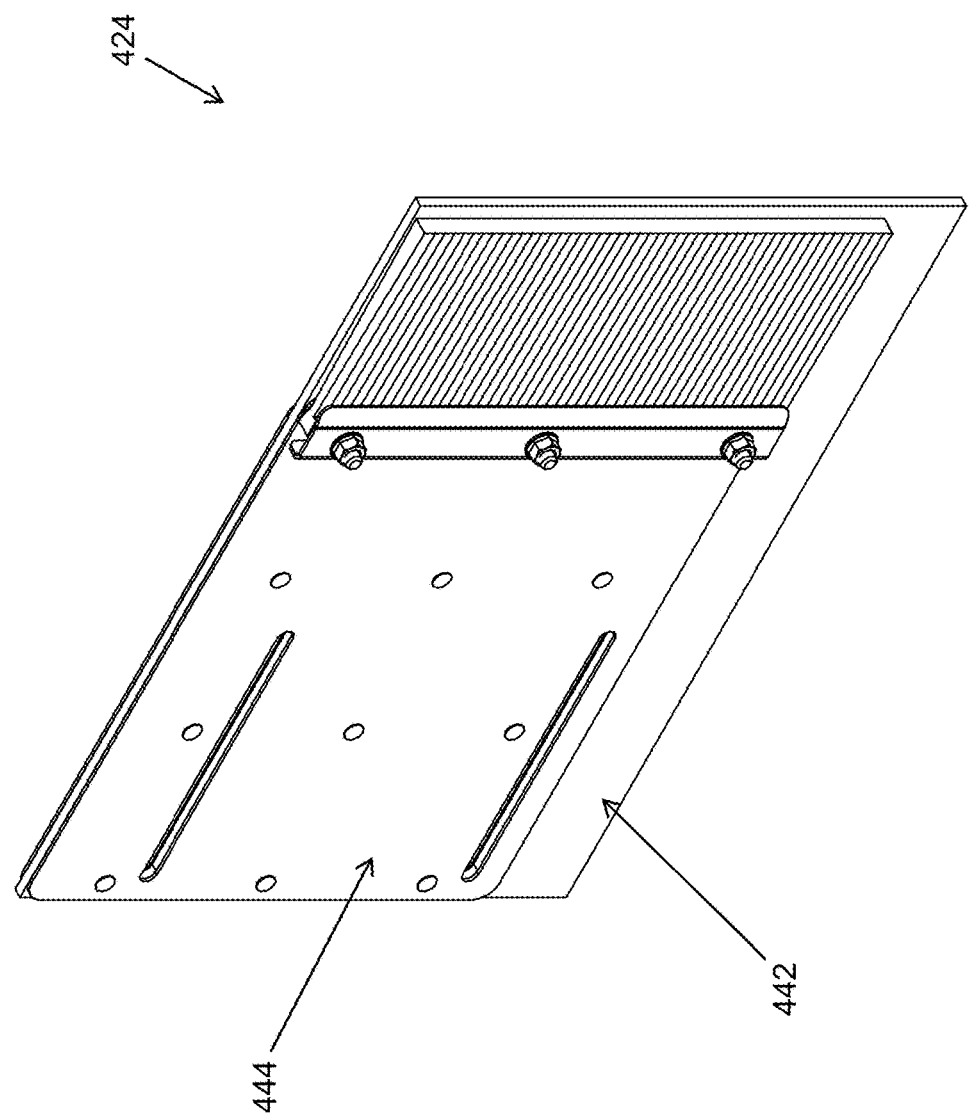
FIG. 60 shows a close up perspective view of the scraper of the sweep of an exemplary sweep system, in accordance with one or more embodiments; the view also showing a flexible member and a rigid support member.
Figure 61E:
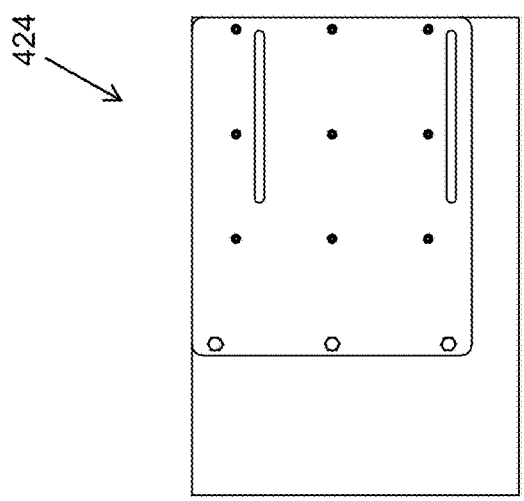
FIG. 61E shows a back elevation view of the scraper of the sweep of an exemplary sweep system, in accordance with one or more embodiments.
Figure 61D:
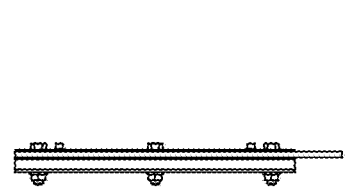
FIG. 61D shows a left side elevation view of the scraper of the sweep of an exemplary sweep system, in accordance with one or more embodiments.
Figure 61A:
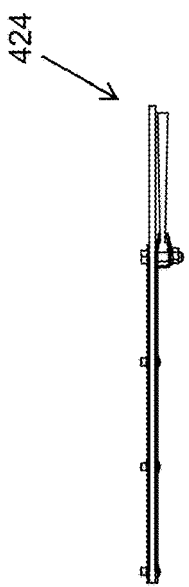
FIG. 61A shows a top elevation view of the scraper of the sweep of an exemplary sweep system, in accordance with one or more embodiments.
Figure 61C:
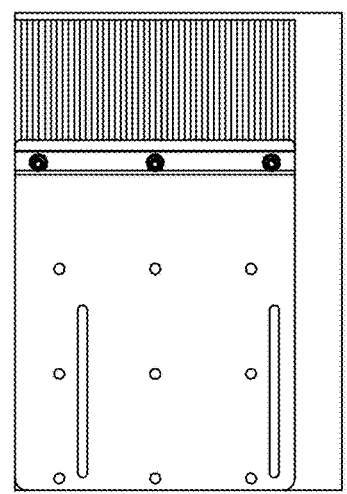
FIG. 61C shows a front elevation view of the scraper of the sweep of an exemplary sweep system, in accordance with one or more embodiments.
Figure 61F:
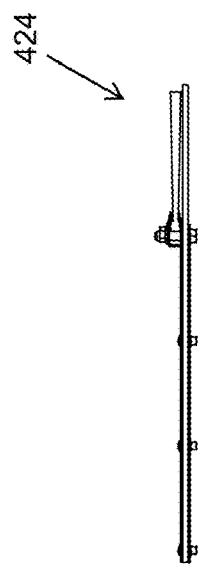
FIG. 61F shows a bottom elevation view of the scraper of the sweep of an exemplary sweep system, in accordance with one or more embodiments.
Figure 61B:
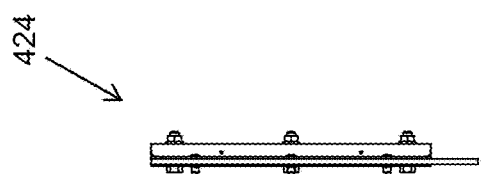
FIG. 61B shows a right side elevation view of the scraper of the sweep of an exemplary sweep system, in accordance with one or more embodiments.
Figure 62:
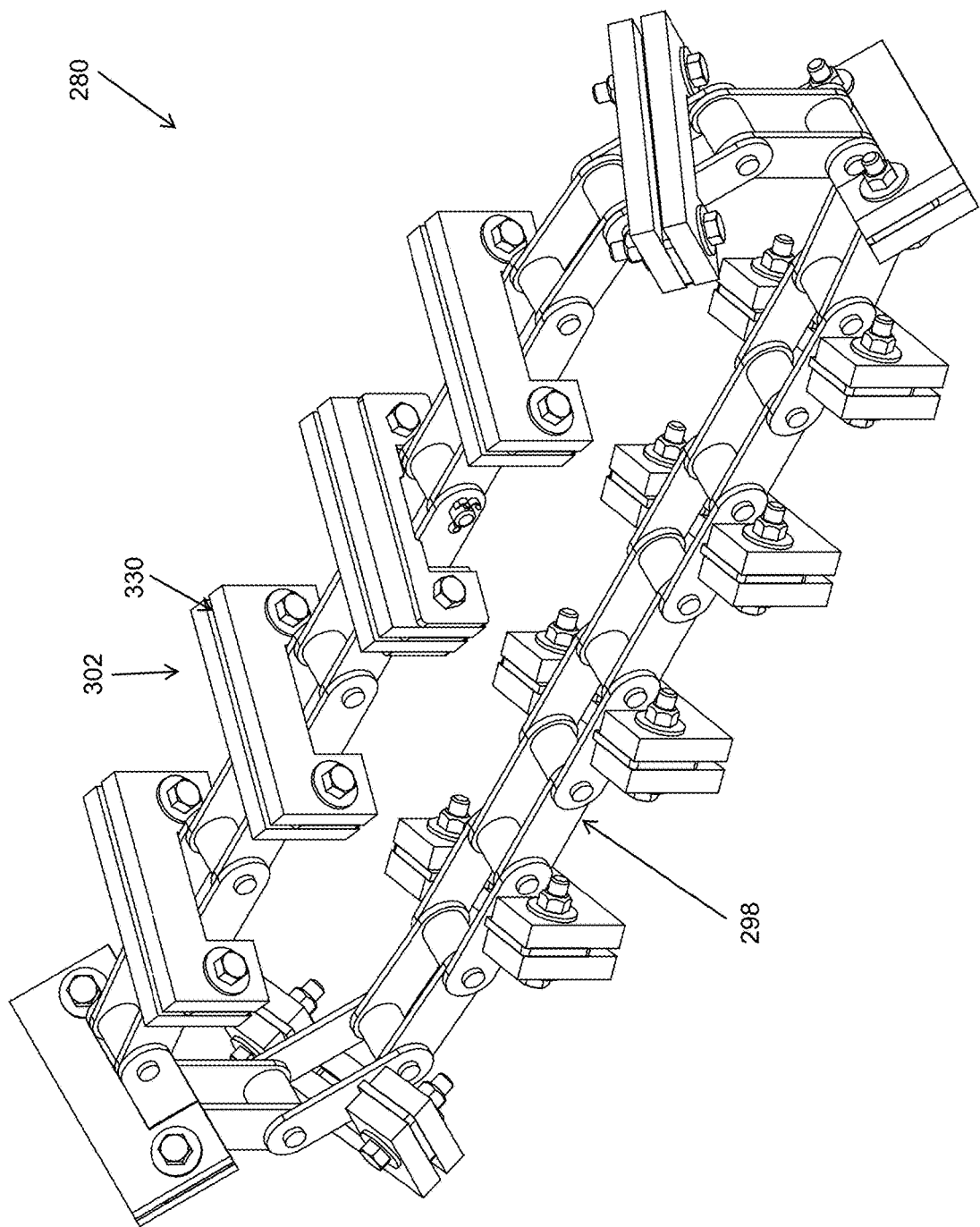
FIG. 62 shows a perspective view of a chain of a continuous track, in accordance with one or more embodiments; the view showing the chain having paddles and tracks.
Figure 64:
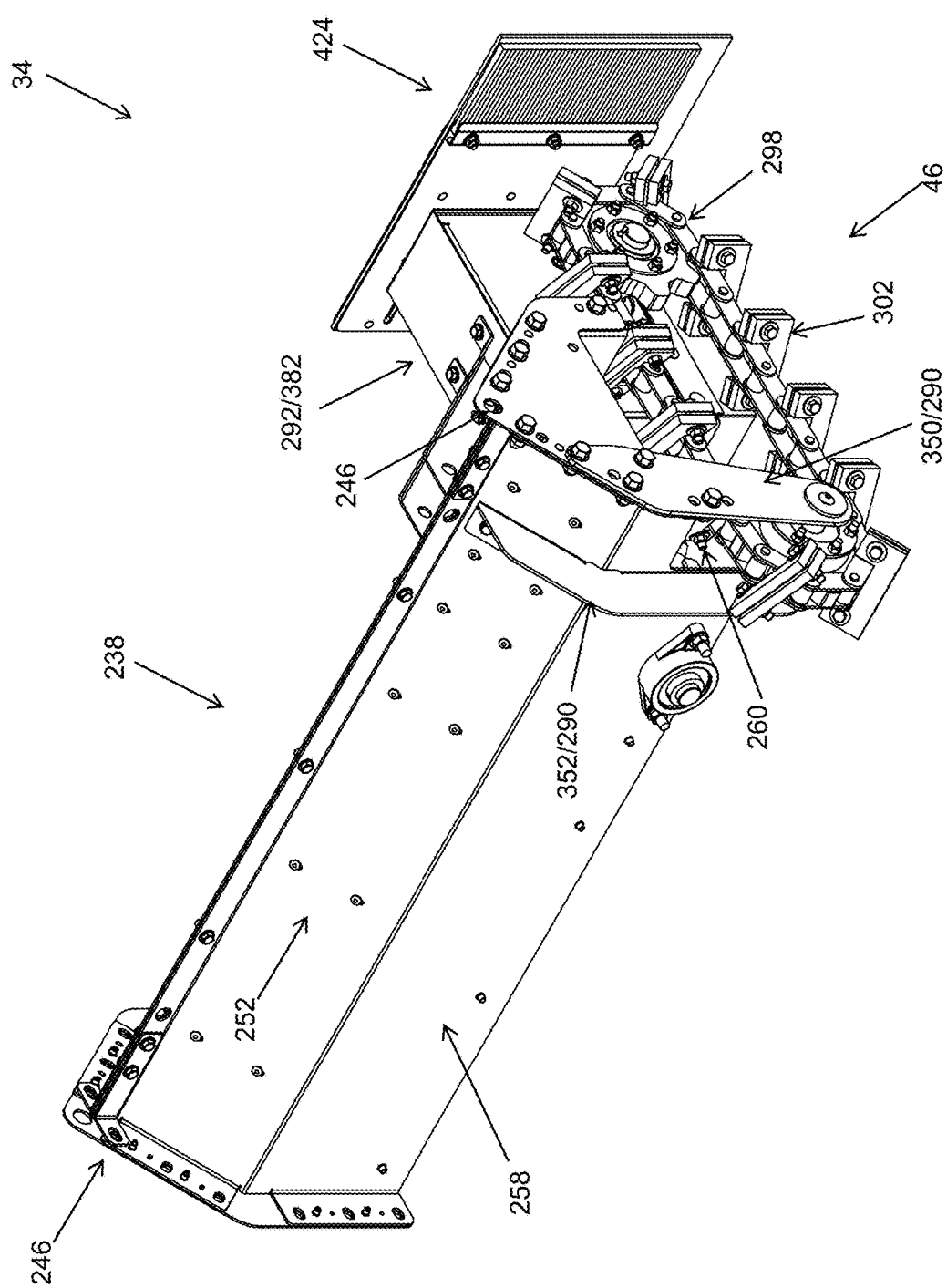
FIG. 64 shows a front perspective view of the tail section of a sweep of an exemplary sweep system, in accordance with one or more embodiments; the view showing the tail section having a track driven drive system, a weldment, and a drivetrain.
Figure 65:
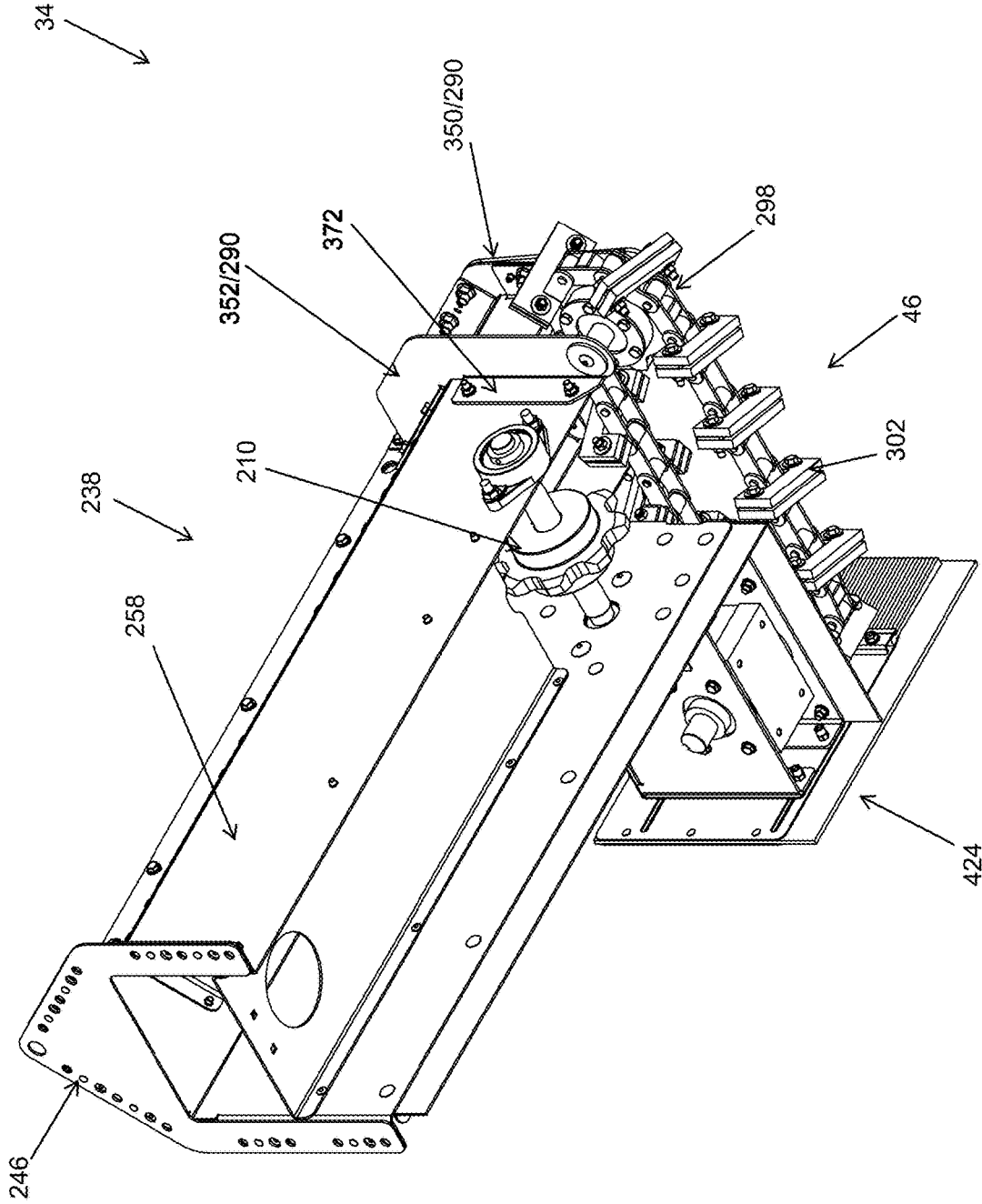
FIG. 65 shows a bottom perspective view of the tail section of a sweep of an exemplary sweep system, in accordance with one or more embodiments; the view showing the tail section having a track driven drive system, a weldment, and a drivetrain.
Figure 66:
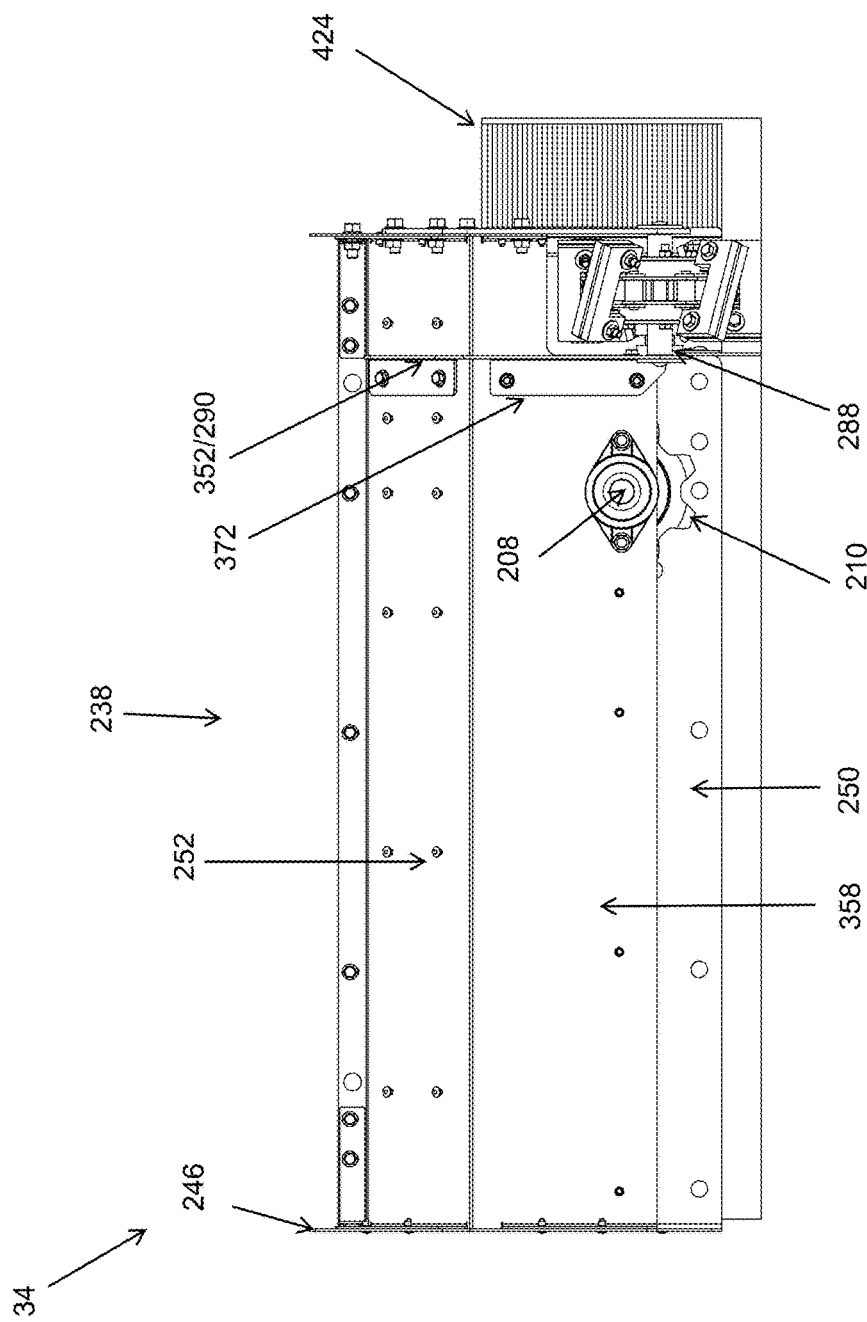
FIG. 66 shows an elevation view of the tail section of a sweep of an exemplary sweep system, in accordance with one or more embodiments; the view showing the tail section having a scraper, a weldment, and a mounting assembly.
Figure 67:
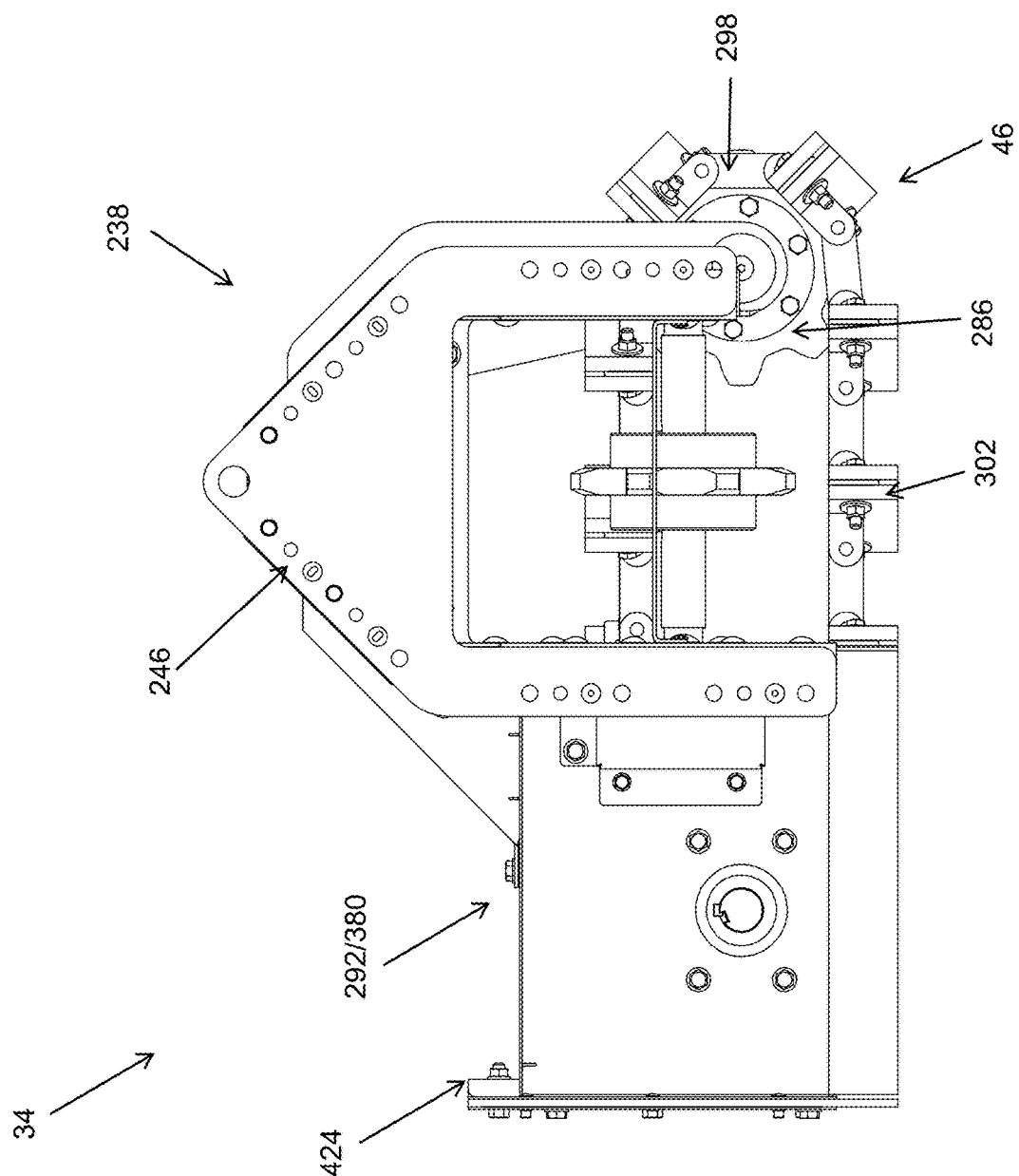
FIG. 67 shows a cross section view of a sweep of an exemplary sweep system, in accordance with one or more embodiments; the view showing the sweep in a parked position; the view also showing tail section of the sweep having a scraper, a weldment, and a track driven drive system.
Figure 68:
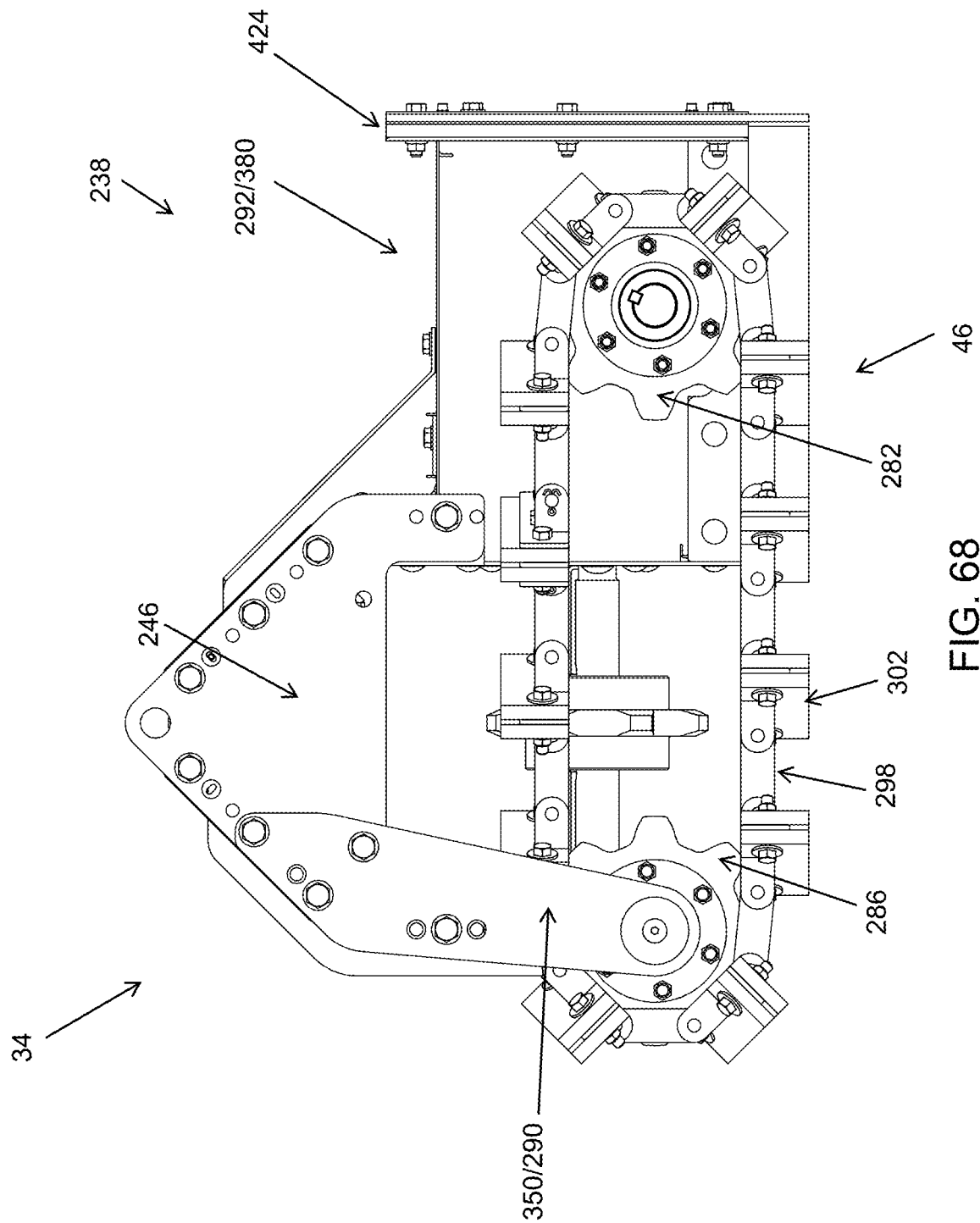
FIG. 68 shows a cross section view of a sweep of an exemplary sweep system, in accordance with one or more embodiments; the view showing the sweep in a parked position; the view also showing tail section of the sweep having a scraper, a weldment, and a track driven drive system.
Figure 69:
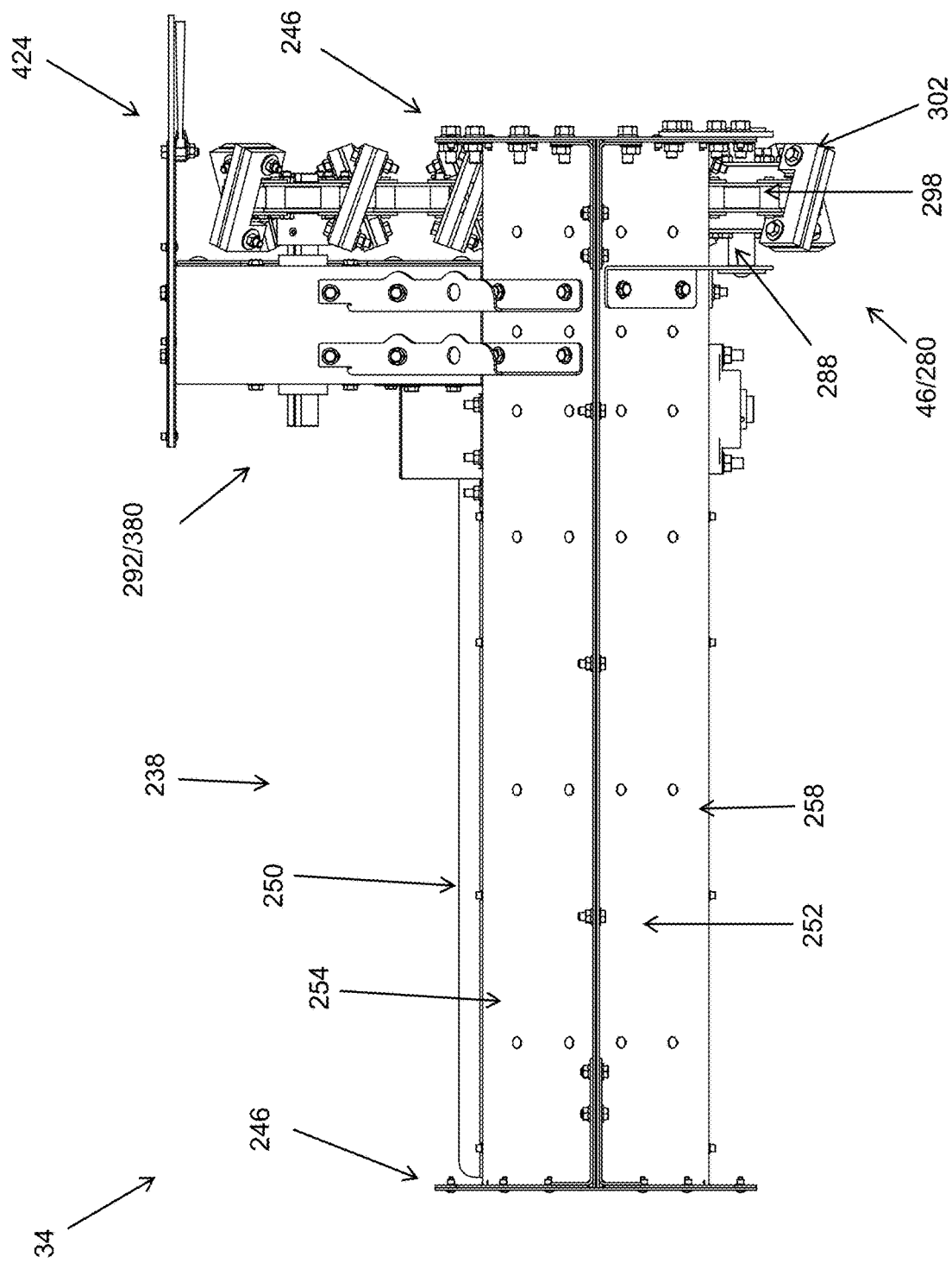
FIG. 69 shows an elevation view of the tail section of a sweep of an exemplary sweep system, in accordance with one or more embodiments; the view showing the tail section having a scraper, a weldment, and a gearbox.
Figure 70:
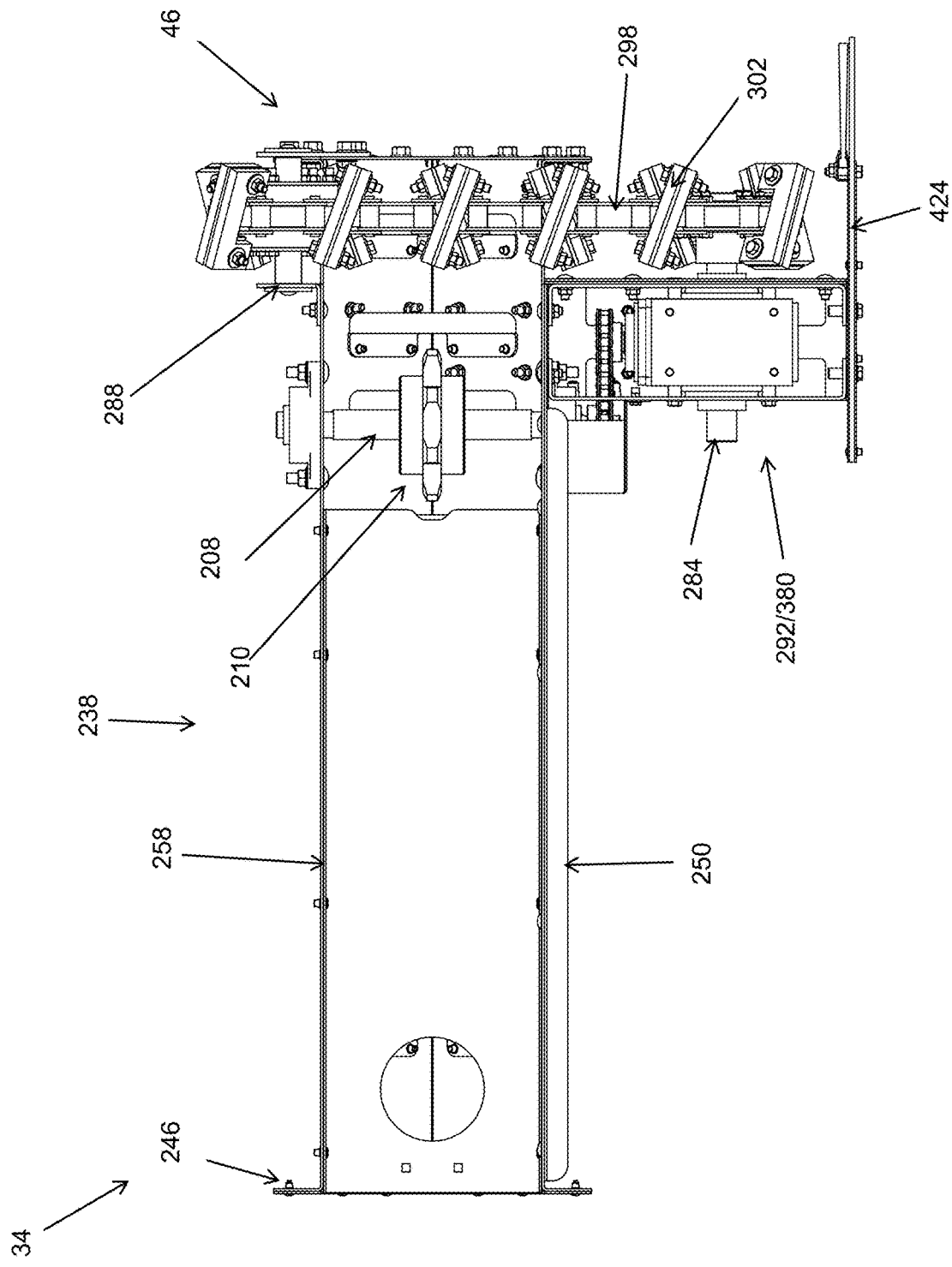
FIG. 70 shows an elevation view of the tail section of a sweep of an exemplary sweep system, in accordance with one or more embodiments; the view showing the tail section having a scraper, a weldment, and a gearbox.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in and/or described with reference to certain figures and/or embodiments, it will be appreciated that features from one figure and/or embodiment may be combined with features of another figure and/or embodiment even though the combination is not explicitly shown and/or explicitly described as a combination. In the depicted embodiments, like reference numbers refer to like elements throughout the various drawings.

It should be understood that any advantages and/or improvements discussed herein may not be provided by various disclosed embodiments, and/or implementations thereof. The contemplated embodiments are not so limited and should not be interpreted as being restricted to embodiments that provide such advantages and/or improvements. Similarly, it should be understood that various embodiments may not address all or any objects of the disclosure and/or objects of the invention that may be described herein. The contemplated embodiments are not so limited and should not be interpreted as being restricted to embodiments that address such objects of the disclosure and/or invention. Furthermore, although some disclosed embodiments may be described relative to specific materials, embodiments are not limited to the specific materials and/or apparatuses but only to their specific characteristics and capabilities and other materials and apparatuses can be substituted as is well understood by those skilled in the art in view of the present disclosure. Moreover, although some disclosed embodiments may be described in the context of window treatments, the embodiments are not so limited. In is appreciated that the embodiments may be adapted for use in other applications which may be improved by the disclosed structures, arrangements and/or methods.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation and/or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments and/or methods.

Similarly, the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, and/or sequentially, to provide looping and/or other series of operations aside from single operations described below. It should be presumed that any embodiment and/or method having features and functionality described below, in any workable combination, falls within the scope of example embodiments.

As used herein, various disclosed embodiments may be primarily described in the context of grain bins. However, the embodiments are not so limited. It is appreciated that the embodiments may be adapted for use in other applications which may be improved by the disclosed structures, arrangements and/or methods. The system is merely shown and described as being used in the context of grain bins for ease of description and as one of countless example applications.

Turning now to the figures, a sweep system is presented for grain storage devices such as a grain bin 12, as is shown as one example.

System 10:

With reference to the figures, a sweep system for full floor grain bins 10, or sweep system 10, or simply system 10 is presented. The system 10 is used in association with a grain bin 12 having a foundation 14, a sidewall 16, a peaked roof 18, an elevated floor 20 supported by a plurality of floor supports 22, a sump 24, and grain conveyor 26. The system 10 includes a sweep 28 having an elongated body 30, a head section 32, and a tail section 34, a pivot point 36, carrier wheels 40, a sweep mechanism 44, and a track-driven drive system 46 among other components as is described herein and shown in the figures.

Grain Bin 12:

In the arrangement shown, sweep system 10 is used in association with a grain bin 12. Grain bin 12 may be formed of any suitable size, shape, and design and is configured to hold a bulk amount of flowable material such as grain, granular materials or other like materials. In the arrangement shown, as one example, grain bin 12 is a large, generally cylindrical structure that sits upon a foundation 14. Foundation 14 may be formed of any suitable size, shape, and design and is configured to provide support to grain bin 12. In the arrangement shown, as one example, foundation 14 is a circular or cylindrical concrete slab, however any other form of a foundation is hereby contemplated for use. In the arrangement shown, as one example, foundation 14 provides support for the lower end of sidewall 16.

In the arrangement shown, as one example, grain bin 12 has a sidewall 16. Sidewall 16 may be formed of any suitable size, shape, and design and is configured to enclose the contents of grain bin 12 and enclose the hollow interior of grain bin 12. In the arrangement shown, as one example, sidewall 16 is cylindrical in nature and is formed of a plurality of sheets of corrugated material that are connected to one another in end-to-end relation to form rings. These rings are stacked on top of one another to form the desired height of sidewall 16 of grain bin 12. However, any other form or configuration of a sidewall 16 is hereby contemplated for use. In the arrangement shown, as one example, the upper end of sidewall 16 provides support for peaked roof 18.

In the arrangement shown, as one example, grain bin 12 has a peaked roof 18. Peaked roof 18 may be formed of any suitable size, shape, and design and is configured to enclose the upper end of grain bin 12 and enclose the hollow interior of grain bin 12. In the arrangement shown, as one example, peaked roof 18 is formed of a plurality of panels that extend from the peak of the roof 18 downward and outward to the upper edge of sidewall 16. However, any other form or configuration of a roof 18 is hereby contemplated for use.

In the arrangement shown, as one example, elevated floor 20, which is supported by a plurality of floor supports 22, is positioned within the hollow interior of grain bin 12.

Elevated Floor 20 & Planks 60:

In the arrangement shown, as one example, grain bin 12 includes an elevated floor 20 which is supported by a plurality of floor supports 22. Elevated floor 20 is formed of any suitable size, shape, and design and is configured to support a mass of grain poured within the hollow interior of grain bin 12. In one arrangement, as is shown, elevated floor 20 rests upon floor supports 22 and establishes a generally planar upper surface.

In the arrangement shown, as one example, elevated floor 20 is formed of a plurality of planks 60. Planks 60 are formed of any suitable size, shape, and design and are configured to connect to one another to form elevated floor 20.

In one arrangement, as is shown, planks 60 extend a length in a generally straight manner between opposing ends. In the arrangement shown, as one example, planks 60 include a center wall that is generally flat and planar in shape and extends horizontally. This center wall connects at its outward edges to sidewalls which extend vertically. In one arrangement, the center wall has a plurality of openings or perforations therein that are large enough to allow air flow through the elevated floor 20 but not so large that grain can fall through the perforations. The sidewalls are generally flat and planar in shape and extend downward from the outward edges of the center wall in approximate parallel spaced alignment to one another and form a channel at their lower ends that facilitate nesting with adjacent planks 60.

Any other shape or configuration is hereby contemplated for use for planks 60. In the arrangement shown, the combination of bends and shapes that form planks 60 provides strength and rigidity to planks 60 in much the same way that corrugation provides strength and rigidity to a sheet of sheet metal.

In the arrangement shown, as one example, planks 60 nest in side-to-side alignment with one another and rest upon floor supports 22 to form elevated floor 20. The space between elevated floor 20 and foundation 14 allows for the passage of air there through. The space between elevated floor 20 and foundation 14 also allows room for other components of the system 10 such as sump 24 and grain conveyor 26.

Sump(s) 24:

In the arrangement shown, as one example, system 10 includes at least one sump 24. Sump 24 is formed of any suitable size, shape, and design and is configured to selectively allow grain to pass through elevated floor 20 and into grain conveyor 26 thereby allowing grain out of grain bin 12. In the arrangement shown, as one example, a plurality of sumps 24 are shown in elevated floor 20 which are formed of an opening 62 that is covered by a gate 64 that selectively opens and closes by operation of a control mechanism 66 so as to facilitate grain to enter grain conveyor 26 positioned below sump 24. Opening 62 is framed by horizontal supports 68 that extend across the width of grain conveyor 26, and connectors 70, that extend between adjacent horizontal supports 68, thereby providing strength to sump 24 and preventing sagging of sump 24 due to the downward pressure on sump 24 due to the weight of grain. Horizontal supports 68 connect at their outward ends to vertical supports 72 that extend vertically from their upper ends, which connect to horizontal supports 68 to their lower ends which are configured to engage foundation 14 thereby providing support to sump 24. These components and this configuration may be referred to as a sump stand. In the arrangement shown, as one example, horizontal supports 68, connectors 70 and vertical supports 72 are formed of hollow square or rectangular shaped members. However, any other suitable structural member is hereby contemplated for use such as square tubing, round tubing, angle iron, I-beams, solid bars or rods, and/or any other structural member.

In the arrangement shown, as one example, grain conveyor 26 fits within opposing vertical supports 72 and is positioned just below horizontal supports 68 and connectors 70. In the arrangement shown, a plurality of sumps 24 extend in a line in spaced relation with one another from just inward of the sidewall 16 of grain bin 12 to a generally centrally positioned sump 24, also known as the center sump 24. This spacing of a plurality of sumps 24 allows grain to be drained out of grain bin 12 from various positions within grain bin 12. In the arrangement shown, as one example, center sump 24 includes two openings 62 or a single opening 62 separated by a generally centrally positioned horizontal support 68 that extends across the center of the opening 62.

In the arrangement shown, as one example, a mounting plate 76 is attached to the upper surface of the centrally positioned horizontal support 68 and includes a hole 78 that is generally centrally positioned within the center sump 24 as well as generally centrally positioned within grain bin 12. Mounting plate 76 serves to facilitate mounting of pivot point 36 to center sump 24, and the strength of the sump stand, formed of horizontal supports 68, connectors 70 and vertical supports 72, serve to support the weight of the sweep 28 at pivot point 36.

In the arrangement shown, as one example, the hollow interior of the centrally positioned vertical support 72 and the centrally positioned horizontal support 68 of center sump 24 provide a protected passageway for electrical lead 50 to pass there through. That is, electrical lead 50 extends through the space between foundation 14 and elevated floor 20, which protects the electrical lead 50. Electrical lead 50 then extends upward within the hollow interior of the centrally positioned vertical support 72 and then through the hollow interior of centrally positioned horizontal support 68. Electrical lead 50 then passes through the hole 78 at the center of mounting plate 76, up the hollow interior of pivot point 36 and into sweep 28, as is described herein.

In one arrangement, as is shown herein, sump 24 as is described herein may be assembled by screwing, bolting and/or welding the components together at the factory into a single unit which is then to be installed in the grain bin 12 as a single part. This arrangement saves installation time and improves quality and reduces cost.

Grain Conveyor 26:

In the arrangement shown, as one example, system 10 includes a grain conveyor 26. Grain conveyor 26 is formed of any suitable size, shape, and design and is configured to move grain out of grain bin 12, such as through a sump 24 or other opening in the elevated floor 20. As examples, grain conveyor 26 may be formed of an auger, a conveyor belt, a drag chain, and/or any other form of a grain movement device is hereby contemplated for use as grain conveyor 26.

In the arrangement shown, as one example, grain conveyor 26 is positioned between foundation 14 and elevated floor 20. Generally speaking, the larger the grain conveyor 26 the greater the amount of grain the grain conveyor 26 can move. While moving more grain faster is advantageous, especially for large grain bins, the larger the grain conveyor 26, the more problematic it becomes to provide support above and around the grain conveyor 26 as floor supports 22 must be moved or removed to make space for the large grain conveyor 26.

In the arrangement shown, as one example, grain conveyor 26 includes a cylindrical shaped housing 80 forming a hollow interior 84 extending from a center sump 24 to an output end 82. In this example arrangement, an auger 86 or other grain movement device (e.g., a belt or drag chain) is positioned within the hollow interior 84. In this example arrangement, Auger 86 includes a shaft 88 with fighting 90 configured to facilitate removal of grain from grain conveyor 26 as shaft 88 is rotated. In an arrangement shown, as one example, grain conveyor 26 is powered by a motor 92 operably connected to shaft 88 of auger 86 at outward end 82 of grain conveyor 26. Motor 92 is formed of any suitable size, shape, and design and is configured to generate movement to drive grain conveyor 26. In some various arrangements, motor 92 may be implemented using various methods and/or means for generating movement including but not limited to, for example, an AC electric motor, a DC electric motor, pneumatic motor, hydraulic motor, combustion motor, and/or any other method or means for generating movement. When operated, motor 92 causes the rotation of auger 86 which facilitates the below-floor 20 transportation of grain from grain bin 12, from sumps 24, through hollow interior 84 of housing 80 to output end 82 of grain conveyor 26.

Wear Track(s) 100:

In the arrangement shown, a plurality of carrier wheels 40 are spaced along the length of sweep 28 to provide support along the length of sweep 28. In the arrangement shown, as one example, outer wear tracks 100 are positioned at each place where carrier wheels 40 are attached to sweep 28. In the arrangement shown, as one example, these outer wear tracks 100 are formed of narrow sheets of solid material that is screwed or bolted to the upper surface of elevated floor 20 thereby forming narrow rings at each diameter where carrier wheels 40 are placed.

Unlike the center walls of planks 60 of elevated floor 20, outer wear tracks 100 are solid and smooth and do not have perforations therein that allow air to pass there through. The solid and smooth upper surface of outer wear tracks 100 improves the ability for carrier wheels 40 to roll thereon. Due to the narrow nature of outer wear tracks 100, air flow through the grain around outer wear tracks 100 is not substantially affected.

The addition of outer wear tracks 100 to elevated floor 20 provides some additional strength and rigidity to elevated floor 20 at the position wherein the additional forces are applied by carrier wheels 40, which may be adequate in some places on elevated floor 20. To provide additional bridging support over grain conveyor 26, bridging supports 102 are placed below outer wear tracks 100 and over grain conveyor 26.

Bridging Supports 102:

In the arrangement shown, as one example, system 10 includes one or more bridging supports 102. Bridging supports 102 are formed of any suitable size, shape, and design and are configured to provide support for carrier wheels 40 and outer wear tracks 100 at and where needed. In the arrangement shown, as one example, bridging supports 102 are positioned below outer wear tracks 100 and over grain conveyor 26. In the arrangement shown, as one example, bridging supports 102 are formed of one or more horizontal members 104 that connect to vertical members 106. Vertical members 106 connect at their upper ends to horizontal members 104 and connect at their lower ends to foundation 14. In this way, horizontal members 104 provide horizontal support while vertical members 106 provide vertical support. In the arrangement shown, as one example, bridging supports 102 are formed of a pair of horizontal members 104 and vertical members 106 are formed of square or rectangular hollow tubing that are positioned adjacent to one another. However, any other configuration is hereby contemplated for use and any other suitable structural member is hereby contemplated for use such as round tubing, angle iron, I-beams, solid bars or rods, or any other structural member.

In the arrangement shown, as one example, as carrier wheels 40 travel over outer wear tracks 100, force is applied to bridging supports 102 which help support the weight of sweep 28, especially when traveling over grain conveyor 26.

In one arrangement, as is shown herein, bridging support 102 as is described herein may be assembled by screwing, bolting and/or welding the components together at the factory into a single unit which is then to be installed in the grain bin 12 as a single part. This arrangement saves installation time and improves quality and reduces cost.

Sweep 28:

In the arrangement shown, as one example, system 10 includes a sweep 28. Sweep 28 is formed of any suitable size, shape, and design and is configured to rotate around pivot point 36 and move grain toward the center sump 24.

In the arrangement shown, as one example, sweep 28 includes an elongated body 30 that extends a length from an inward end, positioned adjacent the center of grain bin 12, or pivot point 36, and an outward end, positioned adjacent the sidewall 16 of grain bin 12. In the arrangement shown, as one example, a head section 32 is positioned adjacent the inward end of sweep 28 and a tail section 34 is positioned adjacent the outward end of sweep 28 and elongated body 30 extends between the inward end and outward end of sweep 28.

Head Section 32:

In the arrangement shown, as one example, sweep 28 includes a head section 32. Head section 32 is formed of any suitable size, shape, and design and is configured to connect the inward end of sweep 28 to pivot point 36 as well as house various components of sweep 28 as is described herein.

Grain bin sweeps, such as sweep 28, are generally parked in alignment with the grain conveyor 26 that is positioned below the elevated floor 20 before the grain bin 12 is filled with grain. This positioning aligns the sweep 28 with the plurality of sumps 24 in the elevated floor 20 that fluidly connect with the grain conveyor 26. As such, the sweep 28 is parked over the sumps 24 and, therefore, the sweep 28 blocks the natural flow of grain out of the sumps 24.

When the user of a grain bin 12 wants to drain grain out of the grain bin 12, the user generally opens the center sump 24 or sumps 24. In doing so, grain is drained out of the middle of the grain bin 12. Draining grain out of the center of a grain bin 12 is important to maintain equal forces, or hoop stresses, within the grain bin 12. However, when sweep system 10 is positioned above the center sump 24 or sumps 24, sweep systems 10 generally have a tendency to block the flow of grain out of the grain bin 12. In some cases, this blockage by the sweep 28 can cause the grain bin to get plugged.

However, it is important to align the sweep 28 above the sumps 24 as the sumps 24 must remove the grain around the sweep 28 before the sweep 28 can be operated. As such, there is a conflict. The sweep 28 must be positioned over the sumps 24 so that the sumps 24 can drain grain out of the grain bin 12 around the sweep 28. However, in doing so, that is positioning the sweep 28 above the sumps 24, the sweep 28 blocks the flow of grain out of the sumps 24.

In the arrangement shown, as one example, head section 32 is configured to allow the passage of grain through the head section 32. In the arrangement shown, as the grain flows through head section 32, the grain also flows through the inward end of sweep mechanism 44. This allows the grain to flow through the head section 32 and out the sumps 24 positioned below the head section 32. This improves the efficiency of emptying a grain bin 12 and reduces the potential for blocks or plugs. However, the embodiments are not so limited. Rather, it is contemplated that in some various arrangements, system 10 may be implemented with a conventional covered head section 32.

In the example arrangement shown, head section 32 extends a length from an outward end 112 to an inward end 114. The outward end 112 connects to and/or forms the inward end of sweep 28. The inward end 114 connects to arms 116 that connect to pivot point 36 as is further described herein.

In the arrangement shown, as one example, head section 32 includes a plurality of frame members 118 that extend in approximate parallel spaced relation to one another. In the arrangement shown, as one example, these frame members 118 are generally planar in shape and have straight sides with a peaked top and a hollow interior that lets the passage of sweep mechanism 44 there through. In the arrangement shown, as one example, a plurality of bars 120 extend through and connect adjacent frame members 118. In the arrangement shown, as one example, one bar 120 extends through the approximate peak of the frame members 118 with a plurality of bars 120 extending downward along the angled sides of the peak of frame members 118 in approximate equal spaced parallel spaced alignment. In the arrangement shown, as one example, these bars 120 connect all frame members 118 of head section 32 thereby giving head section 32 structural strength and rigidity while also allowing grain to pass through the head section 32.

In the arrangement shown, as one example, when viewed from above or below, there are large exposed openings 122 between uncovered frame members 118 and bars 120. These exposed openings 122 allow the passage of grain through the head section 32. In this way, the plurality of openings 122 in head section 32, gives head section 32 a skeletonized look and therefore in this way head section 32 may be described as skeletonized.

In the arrangement shown, although head section 32 is uncovered, the elongated body 30 of sweep 28 remains covered. The cover of elongated body 30 helps to facilitate movement of links 214 and paddles 212 of sweep mechanism 44 when large amounts of grain remain on top of elongated body 30 before the sweep mechanism 44 is operated. In one or more arrangements, shaft 204, which rotates the links 214 and paddles 212 of sweep mechanism 44, is located within skeletonized head section 32. In the arrangement shown, shaft 204 is positioned approximately in a central section of head section 32. In this location, lower paddles 212 are able to move grain for removal through center sump 24. It is recognized that the weight of the grain in the uncovered head section 32 may obstruct movement of links 214 and paddles 212 of sweep mechanism 44. However, shaft 204 of sweep mechanism 44 in this location provides a balance that promotes functional operability of the sweep system 10 with grain able to pass through the skeletonized head section 32 without overly inhibiting movement of sweep mechanism 44.

Head Section 32 Allows for Vertical Movement as Well as Angular Movement:

In the arrangement shown, as one example, head section 32 allows for vertical movement as well as angular movement of sweep system 10. This vertical movement as well as angular movement of the inward end of sweep 28 provides substantial advantages and allows sweep 28 to move and articulate as it engages variations in the elevated floor 20 during operation as it rotates around pivot point 36 and as it travels over elevated floor 20.

In the arrangement shown, as one example, the inward end 114 of head section 32 includes a pair of arms 116 that extend toward and connect to gearbox 124, which is positioned at the upper end of pivot point 36. Gearbox 124 is formed of any suitable size, shape, and design and is configured to transmit rotational energy and force from the shaft of pivot point 36 to shaft 126, which rotates sprocket 128, which rotates chain 130 (not shown), which rotates sprocket 132, which rotates shaft 204, which rotates the links 214 and paddles 212 of sweep mechanism 44. Connecting sweep 28 through head section 32 in this manner facilitates a relatively direct and secure and rigid connection with minimal chains, sprockets and gearing, which improves the robustness of the design, improves efficiencies and reduces loss of energy.

In the arrangement shown, as one example, one arm 116 receives a cylindrical collar 134 that surrounds shaft 126. Collar 134 is connected to a bracket 136 that connects to the exterior surface of gearbox 124 by way of fasteners such as screws of bolts. This collar 134 is received within opening 138 in arm 116. Opening 138 is generally cylindrical in shape so as to allow the upward and downward rotation of the outward end of sweep 28. This is also known as rotational movement of the outward end of sweep 28. This rotational movement allows the outward end of sweep 28 to climb or accommodate variations in the elevated floor 20 of grain bin 12, which is common due to variations in the poured concrete of the foundation 14 of grain bin 12, variations in the parts and components of the system 10, variations due to installation, as well as settling, shifting, or other movement or variation. If it were not for the ability for the outward end of sweep 28 to angularly adjust, the sweep 28 could engage the elevated floor 20 in the high spots, thereby damaging the elevated floor 20 and/or sweep 28. Similarly, if it were not for the ability for the outward end of sweep 28 to angularly adjust, the sweep 28 could pass-over grain on the elevated floor 20 in the low spots thereby not fully emptying the grain bin 12 and leaving grain behind.

However, this opening 138 is also taller than it is wide, and in this way, it is slot-shaped with flat sides and rounded ends. This added vertical height allows for the vertical movement of the inward end of sweep 28. This vertical movement allows for the inward end of sweep 28 to move up and down in a limited and controlled manner to accommodate variations in the elevated floor 20 of grain bin 12, which are common due to variations in the poured concrete of the foundation 14 of grain bin 12, variations in the parts and components of the system 10, variations due to installation, as well as settling, shifting, or other movement or variation.

The combination of the rotational freedom and the vertical freedom of the inward end of sweep 28 provides sweep 28 with unprecedented freedom and flexibility which leads to less potential for breakage, less potential for wear, and a more durable and more versatile sweep 28 that can operate under practically any conditions.

The opposite arm 116 also includes an opening 138 with flat sides 140 and rounded ends 142. This arm 116 however receives a shaft 144 of a bracket 146 that is similarly affixed to the exterior surface of gearbox 124. In the arrangement shown, as one example, shaft 144 is non-rotational in nature, meaning it is affixed to gearbox 124 and does not rotate.

In this way, both sides of gearbox 124 are connected to arms 116 by way of cylindrical components (134, 144). In this way, both sides of the connection of head section 32 or sweep 28 to gearbox 124 allow for vertical movement as well as rotational movement.

One Motor 92 that Powers Grain Conveyor 26 and Sweep Mechanism 44:

In the arrangement shown, sweep mechanism 44 of sweep 28 is operably connected to grain conveyor 26 to facilitate powering of grain conveyor 26 and sweep mechanism 44 by a single motor 92. That is, a single motor 92 powers and causes the rotation of a grain conveyor 26 that facilitates the below-floor 20 removal of grain from grain bin 12, as well as causes the rotation of the links 214 and paddles 212 of sweep mechanism 44 of sweep 28 that facilitates the movement of grain toward the sumps 24 in the center of grain bin 12. However, the embodiments are not so limited. Rather, it is contemplated that in one or more arrangements sweep 28 may be powered by a separate motor 92 (e.g., connected to gearbox 124) to facilitate powering of sweep 28 independent of grain conveyor 26.

Sweep mechanism 44 of sweep 28 may be operably connected to grain conveyor 26 (or motor) using any suitable mechanical arrangement. In the arrangement shown, as one example, the inward end of shaft 88 of grain conveyor 26 connects to gearbox 158 that transmits laterally, vertically extending rotation. Gearbox 158 causes the rotation of shaft 160, which causes the rotation of sprocket 162 that is connected to the upper end of shaft 160. Sprocket 162 is connected to chain 164 and as such the rotation of sprocket 162 causes rotation of chain 164. The opposite side of chain 164 is connected to sprocket 166, which is connected to the lower end of the shaft of pivot point 36.

In this example arrangement, the rotation of pivot point 36 causes the rotation of the gears within a gearbox 124 positioned within head section 32, which causes the rotation of shaft 126, which causes the rotation of sprocket 128, which causes the rotation of chain 130, which causes the rotation of sprocket 132, which causes the rotation of shaft 204, which causes the rotation of sprocket 206, which causes the rotation of the inward end of sweep mechanism 44.

In this way, a single motor 92 drives or powers grain conveyor 26 and sweep mechanism 44 of sweep 28. This mechanical arrangement saves cost by reducing expensive components, such as multiple motors as well as the coordinated control and electrical connection of multiple motors. This mechanical arrangement also improves efficiencies, durability and uptime by eliminating additional motors and the potential for any one of the multiple motors to go down or fail.

Elongated Body 30 and Sweep Mechanism 44

Elongated Body 30:

In the arrangement shown, as one example, sweep 28 includes an elongated body 30. Elongated body 30 is formed of any suitable size, shape, and design and is configured to connect at its inward end to head section 32, to connect at its outward end to tail section 34, and to house sweep mechanism 44.

In the arrangement shown, as one example, elongated body 30 is formed of a plurality of sections 170 that connect to one another in end-to-end linear alignment. In the arrangement shown, as one example, each section 170 includes an end frame 172 positioned at each opposing end of the section 170 that extend in approximate parallel spaced relation to one another.

In the arrangement shown, as one example, end frames 172 include an opening 184 at their middle that allows the passage of sweep mechanism 44 there through. In the arrangement shown, as one example, end frames 172, when viewed from the leading side 186 or the trailing side 188 or from above or below, are generally flat and planar in shape.

In the arrangement shown, as one example, the lower side of end frame 172 on the trailing side 188 extends a distance below the leading side 186. The lower extension of the trailing side 188 of end frame 172 supports and/or holds and/or is connected to a back plate 190 that stops grain and prevents grain from being passed over as the sweep 28 moves around pivot point 36. In the arrangement shown, as one example, back plate 190 is a generally flat and straight member that extends between opposing end frames 172 and is positioned just rearward of sweep mechanism 44. In use, the lower edge of back plate 190 passes over the upper surface of elevated floor 20 with close tolerances thereby scraping most if not all of the grain off of the elevated floor 20.

In this example arrangement the lower end of end frame 172 on the leading side 186 supports and/or holds and/or is connected to a front plate 200 that helps prevent grain from entering into an upper portion of sweep mechanism 44. In the arrangement shown, as one example, front plate 200 is a generally flat and straight member that extends between opposing end frames 172 and is positioned just forward of sweep mechanism 44. In the arrangement shown, as one example, the lower edge of front plate 200 is positioned a distance above the upper surface of elevated floor 20 to permit grain to enter a lower portion of sweep mechanism 44 so it may be moved by sweep mechanism 44 toward center sump 24.

In the arrangement shown, as one example, a front cover plate 194 is connected to and covers the front side or leading edge 186 of section 170 and extends between opposing end frames 172. In the arrangement shown, as one example, a rear cover plate 196 is connected to and covers the rear side or trailing edge 188 of section 170 and extends between opposing end frames 172. In the arrangement shown, as one example, a rear support 198 is connected to the rearward side of rear cover plate 196. Rear support 198 is formed of any suitable size, shape, and design and is configured to provide structural support to rear cover plate 196 and/or may provide a cover for an electrical lead or conduit to extend along the rearward side of section 170 so as to provide power to electrical components of sweep 28, such as track-driven drive system 46 (if electrically powered).

In the arrangement shown, as one example, the elongated body 30 of sweep 28 is formed by attaching sections 170 in end-to-end relation to one another. More specifically, the outward facing surfaces of two end frames 172 are placed in planar engagement with one another and are affixed to one another by passing a plurality of screws and/or bolts through the overlapping exterior peripheral edges of end frames 172. This process is repeated using sections 170 until the desired length of elongated body 30 is formed. A tail section 34 is then added to the outward end of elongated body 30.

Carrier Wheels 40:

In the arrangement shown, as one example, system 10 includes a plurality of carrier wheels 40. Carrier wheels 40 are formed of any suitable size, shape, and design and are configured connect to either the leading side or trailing side of the elongated body 30 of sweep 28 and provide support to sweep 28. In the arrangement shown, as one example, carrier wheels 40 include a rolling member 222 that connects to an axle 224 that extends through rolling member 222 as well as a pair of opposing guides 226 that converge together at a point overhead of rolling member 222 and extend rearward on each side of rolling member 222, where opposing guides 226 connect to an attachment plate 228. In the arrangement shown, as one example, attachment plate 228 operably connects opposing guides 226 to elongated body 30.

In the arrangement shown, as one example, carrier wheels 40 are spaced along the length of elongated body 30 to provide support along the length of elongated body 30. In the arrangement shown, as one example, carrier wheels 40 may be attached to the leading edge 186 or trailing edge 188 by connecting attachment plates 228 to joined end frames 172 (e.g., screwing, bolting, and/or welding the attachment plates 228 to end frames 172. In the arrangement shown, as one example, the angle and/or orientation of rolling member 222 may be set by rotating the position of attachment plates 228 relative to elongated body 30.

Sweep Mechanism 44:

In the arrangement shown, as one example, system 10 includes a sweep mechanism 44 positioned in elongated body 30 of sweep 28. Sweep mechanism 44 is formed of any suitable size, shape, and design and is configured move grain along the length of elongated body 30 and into center sump 24. In the arrangement shown, as one example, sweep mechanism 44 is what is known as a paddle sweep, having a plurality of links 214 that separate adjacent paddles 212.

In the arrangement shown, as one example, the links 214 of sweep mechanism 44 wrap around the sprocket 206 and shaft 204 at the inward end of sweep 28. In the arrangement shown, as one example, the links 214 of sweep mechanism 44 wrap around the sprocket 210 and shaft 208 of the tail section 34 weldment 238 at the outward end of sweep 28. Sprockets 206 and 210 may be toothed wheels, as is shown, or may be any other device that supports or facilitates rotation of another member such as a paddle sweep, a drag chain, a belt, a conveyor or any other grain movement device.

As sweep mechanism 44 rotates around the inward positioned shaft 204 and sprocket 206 and the outward positioned shaft 208 and sprocket 210, the paddles 212 extend downward from links 214 and engage the grain and urge the grain toward center sump 24.

While some arrangements may be primarily shown and/or described with reference to a paddle sweep type sweep mechanism 44, the embodiments are not so limited. Rather, it is contemplated that in some various arrangements, a sweep mechanism 44 may be configured to move grain toward center sump 24 using various methods and/or means including but not limited to, for example, a paddle sweep, a drag chain, a belt, an auger or any other grain moving device.

Tail Section 34:

In the arrangement shown, as one example, sweep 28 includes a tail section 34 connected to the outward end of elongated body 30 of sweep 28. Tail section 34 is formed of any suitable size, shape, and design and is configured to facilitate the rotation of sweep 28 around pivot point 36. In the arrangement shown, as one example, tail section 34 includes tail section 34 weldment 238 and a track-driven drive system 46 connected to weldment 238 among other components.

Weldment 238:

In the arrangement shown, as one example, tail section 34 includes a tail section 34 weldment 238. Tail section 34 weldment 238 is formed of any suitable size, shape, and design and is configured to attach to the outward end of elongated body 30 and connect a track-based drive system 46 to sweep 28 to facilitate the movement of sweep 28 around pivot point 36. In the arrangement shown, as one example, tail section 34 weldment 238 includes an end frame 246, a back plate 250, a front cover plate 252, a rear cover plate 254, rear support 256, and a front plate 258, which are similar, if not identical to, end frame 172, back plate 190, front cover plate 194, rear cover plate 196, rear support 198, and front plate 200 described with reference to sections 170.

In the arrangement shown, as one example, the lower corner of outward ends of a back plate 250 and front plate 258 have cutaways 260 to accommodate a track-based drive system 46. In this example arrangement, lower edges of end frame 246 are also raised so as to avoid contacting tracks of track-based drive system 46.

Track-Driven Drive System 46:

Conventional grain sweeps utilize one or more drive wheels positioned behind the sweep to push the sweep around its pivot point. However, it can be difficult for such drive wheels to support the weight of sweep 28 and/or grain at an outward end of sweep 28. Accordingly, some sweep systems utilize foam filed tires to provide additional support at the outward end of sweep 28. However, such tires can be expensive and difficult to source. Additionally or alternatively, some sweep systems include an additional carrier wheel at the outward end to provide additional support. However, the addition of a carrier wheel causes traction of the drive wheel to be reduced. Such reduction may cause the drive wheel to slip and/or damage grain due to the limited contact area of drive wheels.

In the arrangement shown, as one example, tail section 34 includes a track-based drive system 46 positioned proximate to an outward end of sweep 28. In one or more arrangements, the use of a track-based drive system 46 may increase contact and traction with elevated floor 20 while providing firm support of outward end of sweep 28 in comparison to conventional powered drive wheels.

Track-driven drive system 46 is formed of any suitable size shape or design, and is configured to rotate a continuous track 280 to facilitate movement of sweep 28. In the arrangement shown, as one example, track-driven drive system 46 includes a continuous track 280, a rear sprocket 282, a rear axle 284, a front sprocket 286, a front axle 288, a mounting assembly 290, and a drivetrain 292, among other components.

In the arrangement shown, as one example, continuous track 280 is positioned to rotate in an elongated loop extending around rear sprocket 282, and front sprocket 286. However, the arrangements are not so limited. Rather, it is contemplated that in some various arrangement track-driven drive system 46 may include any number of sprockets and/or positions of continuous track 280 in loops of various shapes including but not limited to, for example, ovals, rectangles, squares, triangles, rhombuses, trapeziums, and/or any other shape. In one or more arrangements, as is shown, front sprocket 286 is positioned to extend continuous track 280 forward in front of sweep 28 to help break up grain and assist with advancement of sweep 28.

Continuous Track 280:

Continuous track 280 is formed of any suitable size, shape, and design and is configured to contact an upper surface of elevated floor 20 in grain bin 12 to facilitate movement of sweep 28 as continuous track 280 is rotated. In the arrangement show, as one example, continuous track 280 includes a plurality of chain links 300 having tracks 302 connected thereto.

Chain Links 300:

Chain links 300 are formed of any suitable size, shape, and design and are configured to form a continuous chain 298 with tracks 302 operably connected thereto. In the arrangement shown, as one example, links 300 of chain 298 each include a pair of outer plates 306, a pair of inner plates 308, pins 310 interconnecting the pair of inner plates 308 and pair of outer plates 306, and rollers 312 positioned on the pins 310.

Inner plates 308 and outer plates 306 are formed of any suitable size, shape, and design and are configured to pivotally interconnect to form chain links 300. In the arrangement shown, as one example, inner plates 308 and outer plates 306 have a generally planar elongated shape extending between an upper edge 318, a lower edge 320, a front edge 322, and a rear edge 324. In this example arrangement, inner plates 308 and outer plates 306 have a generally dog-bone shape when viewed from the side with holes 326 positioned proximate to front edges 322 and rear edges 324.

Pins 310 are formed of any suitable size, shape, and design and are configured to be positioned within holes 326 to interconnect inner plates 308 with outer plates 306 to form a chain link 300. Rollers 312 are formed of any suitable size, shape, and design and are configured to be positioned around pins 310 between inner plates 308, when chain links 300 are assembled to form chain 298. In one or more arrangement, rollers 312 operate as roller bearings on pins 310 to facilitate smooth movement of continuous track 280 when track-driven drive system 46 is operated. In this example arrangement, outer plates 306 have flanges 328 extending outward to the side to facilitate connection with tracks 302. However, the arrangements are not so limited. Rather, it is contemplated that in one or more arrangements, chain links 300 may additionally or alternatively have flanges 328 connected to inner plates 308 to facilitate connection with tracks 302.

Tracks 302:

Tracks 302 are formed of any suitable size, shape, and design and are configured to connect with chain links 300 and contact an upper surface of elevated floor 20 to facilitate supporting of track-driven drive system 46 and outward end of sweep 28 on elevated floor 20 and facilitate movement of sweep 28 around pivot point 36.

In the arrangement shown, as one example, tracks 302 have a generally planar rectangular shape paddles 330, similar to paddles 212 of sweep mechanism 44. With reference to a track 302 positioned on a lower side of continuous track 280 and in contact with elevated floor 20, paddle 330 in this example arrangement has a generally planar rectangular shape extending between an upper edge 332, a lower edge 334, and opposing side edges 336.

In this example arrangement, paddle 330 has a rectangular shaped cutaway 338 in upper edge 332, giving tracks a U-shape when viewed from the front. Cutaway 338 permits paddle 330 to be positioned around chain link 300. In this example arrangement, paddle 330 of tracks 302 have holes 340 positioned proximate to upper edge 332 on each side of cutaway 338 to facilitate connection with flanges 328 (or other portion of chain links 300) using fasteners 342 (e.g., bolts) that extend through tracks 302 and flanges 328. However, the embodiments are not so limited. Rather, it is contemplated that paddles 330 of tracks 302 may be connected to chain links 300 using various means and methods known in the art including but not limited to, for example, adhesive bonding, chemical bonding, welding, and/or mechanical attachment means such as screws, bolts, threading, interlocks, clips, pins, and/or other coupling devices.

In the arrangement shown, as one example, tracks 302 include two paddles 330 positioned on opposite sides of flanges 328. In this example arrangement, tracks 302 also includes washers 346 or plates 346 positioned on outward sides of the two paddles 330 to facilitate a secure attachment of paddles 330 to flanges 328 with fasteners 342. For example, in one or more arrangements, washers 346 or plates 346 permit fasteners 342 to be sufficiently tightened to clamp paddles 330 and flanges 328 between plates 346. In this example arrangement, fasteners 342 extend through washers 346 (or plates), paddles 330 and flanges 328. When fasteners 342 are tightened, flange 328 is clamped between paddles 330, which are clamped between washers 346, thereby securing the track 302 to the chain link 300. However, the embodiments are not so limited. Rather, it is contemplated that tracks 302 may include any number of paddles 330 and/or may have any other alternative shapes or arrangements.

In the arrangement shown, as one example, while most of the components of system 10 are made of metal, in one or more arrangements, paddles 330 are formed of a plastic or composite or non-metallic material, such as an ultra-high molecular weight polyethylene (UHMW) or other UHMW or similar material. In some embodiments, using a non-metallic material may provide a number of benefits including, for example, being easier or softer on the grain, being easier on the other components of the system, being more-durable than metal, being self-lubricating, being lighter than metal, being lower friction, being impact resistant, and/or eliminating metal on metal contact among many other benefits.

In the arrangement shown, chain 298 of continuous track 280 is positioned around a rear sprocket 282 and a front sprocket 286 in a loop. Sprockets 282 and 286 may be toothed wheels, as is shown, or may be any other device that supports or facilitates rotation of another member such as a paddle sweep, a drag chain, a belt, a conveyor and/or any other grain movement device. In this example arrangement, front sprocket 286 is positioned on a front axle 288, which is operably connected to weldment 238 of tail section 34 by mounting assembly 290.

Mounting assembly 290 is formed of any suitable size, shape, and design and is configured to operably connect front axle 288 and front sprocket 286 to weldment 238. In the arrangement shown, as one example, mounting assembly 290 includes a first arm 350 and a second arm 352 configured to operably connect ends of front axle 288 with weldment 238 of tail section 34 of sweep 28. In this example arrangement, first arm 350 has an elongated generally planar shape extending from an upper end 356, where arm 350 is connected to end frame 246 of weldment 238, to a lower end 358, where first arm 350 is connected an outer end 362 of front axle 288.

In this example arrangement, second arm 352 has an elongated generally planar shape extending a length from an upper end 368 to a lower end 370, where second arm 352 is connected an inner end 364 of front axle 288. In this example arrangement second arm 352 include a flange 372 extending the length of second arm 352 along a rear edge of second arm 352 to facilitate connection with front cover plate 252 and front plate 258 of weldment 238.

In this example arrangement, first arm 350 and second arm 352 have holes 374 to facilitate connection of first arm 350 and second arm 352 with end frame 246, front cover plate 252, and front plate 258 of weldment 238 and with inner end 364 and outer end 362 of front axle 288 using fasteners 376 (e.g., bolts and/or screws). However, the embodiments are not so limited. Rather, it is contemplated that in one or more arrangements, first arm 350, second arm 352, or other components of mounting assembly 290 may connected to front axle 288 and/or weldment 238 using various means and methods known in the art including but not limited to, for example, adhesive bonding, chemical bonding, welding, and/or mechanical attachment means such as screws, bolts, threading, interlocks, clips, pins, and/or other coupling devices.

In this example arrangement, rear sprocket 282 is positioned on rear axle 284, which is operably connected to drivetrain 292. In this example arrangement, when rear axle 284 is rotated by drivetrain 292, rear sprocket 282 is rotated, which rotates continuous track 280, which moves sweep 28 forward.

Drivetrain 292:

Drivetrain 292 is formed of any suitable size, shape, and design and is configured to operably connect with and rotate rear axle 284 to facilitate rotation of continuous track 280 of track-driven drive system 46 when operated, and thereby move sweep 28. In the arrangement shown, as one example, drivetrain 292 is configured to mechanically connect rear axle 284 track-driven drive system 46 to sweep mechanism 44 of sweep 28 to facilitate powering of track-driven drive system 46 by the same motor used to drive sweep mechanism 44 (e.g. motor 92). In this example arrangement, drivetrain 292 includes a gearbox 380 positioned in a housing 382 connected to back plate 250 at an outer end of weldment 238 proximate to end frame 246.

Gearbox 380:

In one or more arrangements, gearbox 380 is formed of any suitable size, shape, and design and is configured to transmit rotational energy and force from the shaft 208 of sweep mechanism 44 in tail section 34 to rear axle 284 of track-driven drive system 46. In the arrangement shown, as one example, gearbox 380 transfers rotation of shaft 208 of sweep mechanism 44 ninety degrees to rear axle 284 of track-driven drive system 46. When shaft 208 of sweep mechanism 44 transfers rotation to rear axle 284, gearbox 380 rotates rear axle 284, which causes the rotation of rear drive sprocket 282 that is connected to the outer end of rear axle 284, which causes rotation of chain 298 of continuous track 280. The opposite side of chain 298 of continuous track 280 is connected to front drive sprocket 286 which is connected to front axle 288. As continuous track 280 is rotated, tracks 302 engage elevated floor 20 of grain bin 12, which causes sweep 28 be moved forward.

In some various arrangements, gearbox 380 is configured to rotate rear axle 284 at a fixed gear ratio (e.g., 1:1, 1:2, 1:4, and/or any other ratio) relative to shaft 208. Additionally or alternatively, in one or more arrangements, gearbox 380 is configured to adjust rotation speed of rear axle 284 relative to shaft 208 dynamically during operation to facilitate control of forward movement of sweep 28 that is independent of sweep mechanism 44. Such independent control of rear axle 284 of track-driven drive system 46 may be desirable, for example to maintain sweep 28 in position to contact with grain to optimize movement of grain by sweep mechanism 44.

As one example, in one or more arrangements, gearbox 380 may include a transmission (not shown) to facilitate adjustment of the gear ratio of gearbox 380 during operation. As another example, in one or more arrangements, gearbox 380 may include a clutch (not shown) to enable rear axle 284 relative to shaft 208 of track-driven drive system 46 to be selectably connected to and disconnected from shaft 208 of sweep mechanism 44 so forward movement of sweep 28 can be controlled independently from operation of sweep mechanism 44.

Although one or more arrangements may be primarily discussed and/or illustrated with reference to a drivetrain 292 configured to power track-driven drive system 46 by operably connecting track-driven drive system 46 to sweep mechanism 44, the embodiments are not so limited. Rather, it is contemplated that in one or more arrangements, track-driven drive system 46 may be powered by a separate motor 92 (e.g., connected to drivetrain 292 and/or directly to track-driven drive system 46) to facilitate powering of track-driven drive system 46 independent of sweep 28 and/or grain conveyor 26.

Housing 382:

Housing 382 is formed of any suitable size, shape, and design and is configured to contain and support gearbox 380 and rear axle 284 and rear drive sprocket 282 of track-driven drive system 46 connected thereto. In the arrangement shown, as one example, housing 382 includes an outer side bracket 388, an inner side bracket 390, and a cover 392 forming a top 394 and a back 396 of housing 382, among other components.

Outer Side Bracket 388 and Inner Side Bracket 390:

Outer side bracket 388 and inner side bracket 390 are formed of any suitable size, shape, and design and are configured to operably connect support gearbox 380 and weldment 238 of tail section 34 of sweep 28. In the arrangement shown, as one example, outer side bracket 388 and inner side bracket 390 each have a generally rectangular planar shape extending between an upper edge 402, a lower edge 404, a front edge 406, and a back edge 408.

In this example arrangement, outer side bracket 388 and inner side bracket 390 have flanges 410 extending outward from front edge 406, upper edge 402, and back edge 408 to facilitate connection with back plate 250 of weldment 238, cover 392, and scraper 424 among other components. In this example arrangement, rear axle 284 of track-driven drive system 46 that is connected to gearbox 158 extends through openings 414 in outer side bracket 388 and inner side bracket 390.

In this example arrangement, outer side bracket 388 and inner side bracket 390 have holes 416 to facilitate connection of outer side bracket 388 and inner side bracket 390 with weldment 238, cover 392, scraper 424, and gearbox 380 using fasteners 418 (e.g., bolts and/or screws). However, the embodiments are not so limited. Rather, it is contemplated that in one or more arrangements, housing 382 may be interconnected and connected with weldment 238, scraper 424, gearbox 380 and/or other components of system 10 using various means and methods known in the art including but not limited to, for example, adhesive bonding, chemical bonding, welding, and/or mechanical attachment means such as screws, bolts, threading, interlocks, clips, pins, and/or other coupling devices.

Scraper 424:

In one or more arrangements, sweep 28 of system includes a scraper 424 positioned behind track-driven drive system 46. Scraper 424 is formed of any suitable size, shape, and design and is configured to connect to the outward end of tail section 34 and capture grain that passes through track-driven drive system 46 to facilitate the return of this grain into the path of the sweep 28 so that it may be removed by the sweep mechanism 44 instead of being left behind.

In the arrangement shown, as one example, scraper 424 is a generally square or rectangular planar member that extends a height between an upper edge 426 and a lower edge 428 and extends a length between an inner edge 430 and an outer edge 432. In the arrangement shown, as one example, scraper is attached to flanges 410 of back edge 408 and/or back 396 of housing 382.

Fasteners 436 extend through slots 438 in scraper 424 and into housing 382, thereby rigidly affixing scraper 424 to the outward end of tail section 34. The position of scraper 424 may be adjusted by loosening fasteners 436 and sliding scraper 424 further outward or further rearward and then tightening the fasteners 436 again once scraper 424 is in its desired position. In this way, scraper 424 may be quickly and easily and precisely adjusted so as to ensure scraper 424 extends as close as is desired to the interior surface of grain bin 12 so as to capture as much grain as possible.

In the arrangement shown, scraper 424 include a flexible member 442 and ridged support member 444. In this example arrangement, flexible member 442 has a generally rectangular planar shape extending between upper edge 426, lower edge 428, inner edge 430, and outer edge 432 of scraper 424. In this example arrangement, ridged support member 444 has a generally rectangular planar shape extending downward from upper edge 426 to a lower edge 446 located a distance above lower edge 428. Ridged support member 444 also extends from inner edge 430 to an outer edge 448 located a distance inward from outer edge 432 of scraper 424. In other words, lower edge 428 and outer edge 432 of scraper 424, which may contact the grain bin 12 in operation, are formed by a portion of flexible member 442 that extends beyond ridged support member 444. In this manner, portions of scraper 424 that may contact the elevated floor 20 and/or sidewall 16 of grain bin 12 are permitted to flex during operation to avoid causing damage.

During operation, scraper 424 captures grain that passes through track-driven drive system 46. As the sweep 28 is moved forward, grain piles up in front of scraper 424. When a sufficient amount of grain is piled up in front of scraper 424, an upper portion of continuous track 280 of track driven drive system 46 moves the captured grain forward where grain may be guided by gravity into the path of sweep 28.

Outward End of the Sweep 28 is Levitated Above the Grain Bin Floor 20:

In the arrangement shown, as one example, sweep 28 of system 10 is biased to cause the outward end of elongated body 30 of sweep 28 to levitate above the elevated floor 20 of the grain bin 12 in a natural state. Or, said another way, when the grain bin 12 is empty, or empty enough for the operation of the sweep 28, the carrier wheels 40 at the middle and at the outward end of elongated body 30 of sweep 28 (if included) are levitated above the elevated floor 20 of grain bin 12 a small distance such that they are not in constant contact with elevated floor 20. In addition, when the sweep 28 is operating, and rotating around the grain bin 12, the carrier wheels 40 at the middle and at the outward end of elongated body 30 of sweep 28 (other than the inward-most carrier wheels 40 that engage wear track 100) are levitated above the elevated floor 20 of grain bin 12 (other than perhaps an occasional engagement of a bump in the floor or other aberration or variance).

Configuring the outward end of elongated body 30 of sweep 28 such that the carrier wheels 40 at the middle and at the outward end of elongated body 30 of sweep 28 (other than the inward-most carrier wheels 40 that engage wear track 100) levitate above the elevated floor 20 of grain bin 12 as it rotates around grain bin 12 eliminates most if not all the contact between the elongated body 30 of sweep 28 and elevated floor 20 other than the engagement of the inward most carrier wheels 40 that ride on wear track 100 and the engagement of track-driven drive system 46. This reduces the wear and tear that occurs on the elevated floor 20 by engagement of the carrier wheels 40 of sweep 28 (as well as reduces damage to grain trapped between the elevated floor 20 and the elongated body 30 of sweep 28). Also, the elimination of the engagement between the carrier wheels 40 at the middle and at the outward end of elongated body 30 of sweep 28 (other than the inward-most carrier wheels 40 that engage wear track 100) allows the elimination of wear tracks 100 for these middle-positioned and outward-positioned carrier wheels 40 in the elevated floor 20 that prevent the elevated floor 20 from being dented. The elimination of wear tracks 100 reduces cost, reduces parts, reduces installation time, reduces weight, and increases airflow through the elevated floor 20 by removing portions that are covered or blocked.

In addition, by levitating these middle-positioned and outward-positioned carrier wheels 40 of elongated body 30 of sweep 28, the weight of the outward end of elongated body 30 of sweep 28 is carried by track-driven drive system 46. This helps to drive the elongated body 30 of sweep 28 around the pivot point 36.

In one arrangement, the outward end of elongated body 30 of sweep 28 is configured to be naturally sprung in the levitated state such that the carrier wheels 40 at the middle and at the outward end of elongated body 30 of sweep 28 (other than the inward-most carrier wheels 40 that engage wear track 100) are not in contact with the elevated floor 20 and instead only the track-driven drive system 46 and the inward-most-positioned carrier wheels 40 are in engagement with the elevated floor 20. However, when the grain bin 12 is filled with grain, and the elongated body 30 of sweep 28 is covered with grain, the pressure of the grain on top of the elongated body 30 of sweep 28 causes the elongated body 30 of sweep 28 to bend or flex downward which causes the carrier wheels 40 at the middle and at the outward end of elongated body 30 of sweep 28 to contact the elevated floor 20, which is in addition to the track-driven drive system 46 and the inward-most-positioned carrier wheels 40 being in engagement with the elevated floor 20. However, whenever the grain is removed, the carrier wheels 40 at the middle and at the outward end of elongated body 30 of sweep 28 (other than the inward-most carrier wheels 40 that engage wear track 100) return to their natural levitated non-contact state. In one arrangement, in its natural state, when the grain bin 12 is not loaded with grain, sweep 28 contacts elevated floor 20 at three points of contact, the inward-most positioned carrier wheels 40, which engage the wear track 100, one of which is in front of the sweep 28 in the direction of travel and one of which is behind the sweep 28 in the direction of travel, and the track-driven drive system 46 at or near the outward end of sweep 28. The sweep 28 is also connected to gearbox 158 at the inward end of head section 32 at arms 306 which is connected to other components of grain bin 12.

Control System 500:

In one or more arrangements, system 10 includes a control system 500. Control system 500 is formed of any suitable any suitable size, shape, and design and is configured to control operation of track-driven drive system 46, sweep mechanism 44, grain conveyor 26, and/or other components of system 10 to facilitate removal of grain from grain bin 12 in response to signals from sensors 506 and/or input from user interface 504. In the arrangement shown, as one example, control system 500 includes a control circuit 502, user interface 504, and/or sensors 506, among other components.

Control Circuit 502:

Control circuit 502 is formed of any suitable size, shape, design and is configured to control operation of track-driven drive system 46, sweep mechanism 44, grain conveyor 26, and/or other components of system 10 to facilitate removal of grain from grain bin 12 in response to signals of sensors 506 and/or input from user interface 504. In the arrangement shown, as one example implementation, control circuit 502 includes a communication circuit 510, a processing circuit 512, and a memory 514 having software code 516 (not shown) or instructions that facilitates the operation of system 10.

Processing circuit 512 may be any computing device that receives and processes information and outputs commands according to software code 516 stored in memory 514. For example, in some various arrangements, processing circuit 512 may be discreet logic circuits or programmable logic circuits configured for implementing these operations/activities, as shown in the figures and/or described in the specification. In certain arrangements, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of software code stored in and accessible from memory 514. Memory 514 may be any form of information storage such as flash memory, ram memory, dram memory, a hard drive, and/or any other form of memory.

Processing circuit 512 and memory 514 may be formed of a single combined unit. Alternatively, processing circuit 512 and memory 514 may be formed of separate but electrically connected components. Alternatively, processing circuit 512 and memory 514 may each be formed of multiple separate but communicatively connected components.

Software code 516 is any form of instructions or rules that direct processing circuit 512 how to receive, interpret, and respond to information to operate as described herein. Software code 516 or instructions is stored in memory 514 and accessible to processing circuit 512. As an illustrative example, in one or more arrangements, software code 516 or instructions may configure processing circuit 512 control circuit 502 to monitor sensors 506 and perform various preprogramed actions in response to signals from sensors 506 satisfying one or more trigger conditions.

As some illustrative examples, some actions that may be initiated by control circuit 502 in response to signals from sensors 506 and/or user input from user interface 504 include but are not limited to, for example, controlling operation and/or speed of track-driven drive system 46, sweep mechanism 44, grain conveyor 26, and/or other components of system 10, and/or sending notifications to users (e.g., emails, SMS, push notifications, automated phone call, social media messaging, and/or any other type of messaging).

Communication circuit 510 is formed of any suitable size, shape, design, technology, and in any arrangement and is configured to facilitate communication with devices to be controlled, monitored, and/or alerted by control system 500. In one or more arrangements, as one example, communication circuit 510 includes a transmitter (for one-way communication) or transceiver (for two-way communication). In various arrangements, communication circuit 510 may be configured to communicate with various components of system 10 using various wired and/or wireless communication technologies and protocols over various networks and/or mediums including but not limited to, for example, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, FM/VHF/UHF networks, and/or any other communication protocol, technology or network.

Sensors 506:

Sensors 506 are formed of any suitable size, shape, design, technology, and in any arrangement configured to measure environmental conditions that may affect storage of contents of grain bin 12. In some various arrangements, sensors 506 may include but are not limited to, for example, position sensors (e.g., indicative position of sweep 28), optical sensors, grain detection sensors, current and/or voltage sensors, temperature sensors, humidity sensors, moisture sensors, chemical sensors, and/or any other type of sensor. In some arrangements, sensors 506 may be formed along with control circuit 502 as a single combined unit. Alternatively, in some arrangement sensors 506 and control circuit 502 may be communicatively connected by communication circuit 510.

User Interface 504:

User Interface 504 is formed of any suitable size, shape, design, technology, and in any arrangement and is configured to facilitate user control and/or adjustment of various components of system 10. In one or more arrangements, as one example, user interface 504 includes a set of inputs (not shown). Inputs are formed of any suitable size, shape, and design and are configured to facilitate user input of data and/or control commands. In various different arrangements, inputs may include various types of controls including but not limited to, for example, buttons, switches, dials, knobs, a keyboard, a mouse, a touch pad, a touchscreen, a joystick, a roller ball, and/or any other form of user input. Optionally, in one or more arrangements, user interface 504 includes a display (not shown). Display is formed of any suitable size, shape, design, technology, and in any arrangement and is configured to facilitate display information of settings, sensor readings, time elapsed, and/or other information pertaining to proper storage of contents of grain bin 12. In one or more arrangements, display may include, for example, LED lights, meters, gauges, screen or monitor of a computing device, tablet, and/or smartphone. Additionally or alternatively, in one or more arrangements, the inputs and/or display may be implemented on a separate device that is communicatively connected to control circuit 502. For example, in one or more arrangements, operation of control circuit 502 may customized using a smartphone or other computing device that is communicatively connected to the control circuit 502 (e.g., via Bluetooth, WIFI, and/or the internet).

In Operation:

As an illustrative example, in one or more arrangements, grain conveyor 26, sweep mechanism 44, and track-driven drive system 46 may be controlled independently by control system 500 to optimize removal of grain from grain bin 12 and minimize damage to grain. For example, in one or more arrangements, control circuit 502 of control system 500 is configured to monitor movement of grain using sensors 506 and adjust operation of grain conveyor 26, sweep mechanism 44, and track-driven drive system 46 based on detected grain movement.

In some various arrangements, control circuit 502 may monitor movement of grain by system 10 using various different methods and/or means. For example, in one or more arrangements, control circuit 502 may be configured to monitor one or more sensors 506 (e.g., optical and/or mechanical sensors located in sweep 28 and/or grain conveyor 26) to determine when grain is being through sweep 28 and/or grain conveyor 26.

Additionally or alternatively, in one or more arrangements, control circuit 502 may be configured to monitor one or more sensors 506 (e.g., optical and/or mechanical sensors 506) to determined when sweep 28 is moved forward into contact with remaining grain in grain bin 12 to permit grain to be removed by sweep 28.

Additionally or alternatively, in one or more arrangements, control circuit 502 may be configured to monitor speed of or current drawn by motors used to drive grain conveyor 26, sweep mechanism 44, and/or track-driven drive system 46 to determine when grain is being moved by grain conveyor 26 and/or sweep mechanism 44 and/or determine when sweep 28 is pressed against remaining grain in grain bin 12 by track-driven drive system 46. For instance, when a grain transportation system (e.g., grain conveyor 26 and/or sweep mechanism 44) is moving grain, workload on motor (e.g., motor 92) powering the grain transportation system increases, which causes electric current drawn by the motor 92 to increase. Conversely, when less grain is moved by grain transportation system, workload of the motor 92 decreases which causes electric current drawn by the motor 92 to decrease.

Additionally or alternatively, in one or more arrangements, control circuit 502 is configured to control operation of grain conveyor 26, sweep mechanism 44, and/or track-driven drive system 46 based on speed of grain conveyor 26, sweep mechanism 44, and/or track-driven drive system 46. For instance, when sweep mechanism 44 is moving grain, more resistance is placed on paddles 212 and speed of sweep mechanism 44 decreases. Conversely, when less grain is moved by sweep mechanism 44, less resistance is placed on paddles 212 and speed of sweep mechanism 44 increases.

Figure 73:
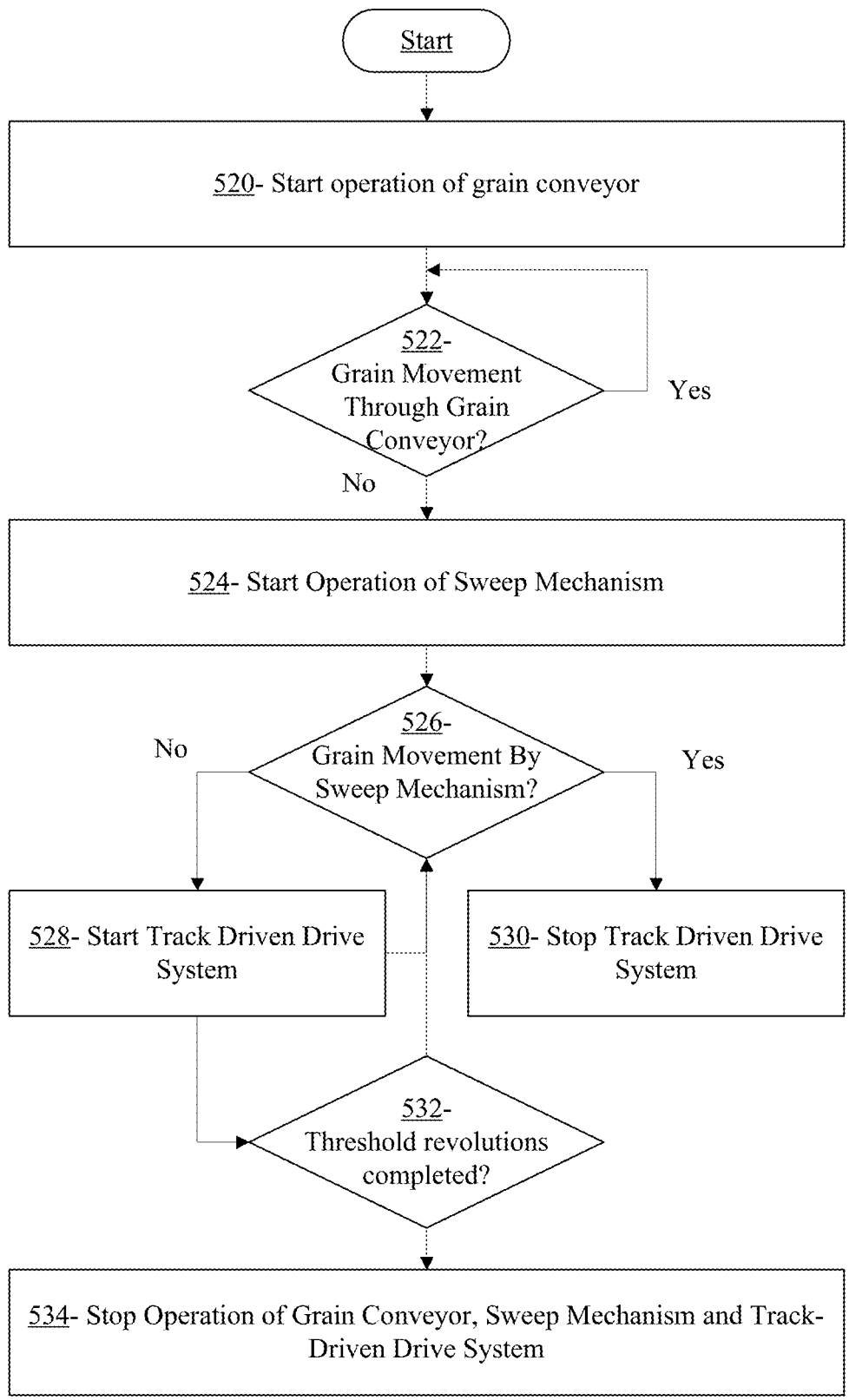
FIG. 73 shows an example control system for use in a track driven sweep system for use in grain bins, in accordance with one or more embodiments.

FIG. 73 shows an example process for controlling operation of system 10 by control system 500 in accordance with one or more arrangements. In this illustrative example, the process may be started after a center sump 24 is opened by an operator to permit grain to be moved out of grain bin. When the process is started at process block 520, control system 500 causes grain conveyor 26 to operate and move grain out of grain bin 12 through sump 24. At decision block 522, control system 500 determines if grain is being moved through grain conveyor 26, for example, as previously described. The process loops at decision block 522, while grain is being moved through grain conveyor 26.

When gravity can no longer move grain through the center sump 24 to grain conveyor 26, grain is no longer being moved through grain conveyor 26. When this occurs, the process will continue from decision block 522 to process block 524. At process block 524, control system 500 starts operation of sweep mechanism 44, to assist in moving remaining grain toward center sump 24.

In this example, the process starts and stops the track-driven drive system 46 as required to maintain sweep 28 in position against a wall of remaining grain so grain may be removed from grain bin 12 by system 10. If control system 500 determines that grain is not moving through sweep 28 at decision block 526, control system 500 starts track driven drive system 46 at process block 528 to move sweep 28 forward toward the remaining grain. When control system 500 determines that grain is moving through sweep 28 at decision block 526, control system 500 stops track driven drive system 46 at process block 530 to maintain sweep 28 in the current position while sweep 28 removes grain adjacent to sweep 28.

The process repeats in this manner until the sweep 28 has completed a threshold number of revolutions around grain bin 12 at decision block 532. When the threshold number of revolutions have been completed, control system 500 stops operation of grain conveyor 26, sweep mechanism 44, and track driven drive system 46 at process block 534.

Alternative Arrangement:

With reference to FIGS. 62-70, an alternative arrangement of system 10 is presented. This alternative arrangement presented in FIGS. 62-70 is similar to the system 10 presented in FIGS. 1-61 and therefore unless specifically stated otherwise herein, the prior teaching and disclosure shown in FIGS. 1-61 applies equally to the alternative arrangement shown in FIGS. 62-70. That is, the arrangement shown in FIGS. 62-70 includes similar if not identical components as the arrangements shown in FIGS. 1-61 with the primary differences pertaining to the continuous track 280.

In the arrangement shown in FIGS. 62-70, as one example, tracks 302 are connected to links 300 with paddles 330 positioned at an angle relative to links 300. Having paddles 330 positioned at an angle may help move grain inward toward elongated body 30 of sweep 28, where the grain may be transported by sweep mechanism 44 toward center sump 24. More specifically, angled paddles 330 move captured gain inward as the captured grain is moved forward by the upper portion of continuous track 280. Angled paddles 330, also move grain inward as paddles 330 are moved from the upper portion of continuous track 280, around the front of continuous track 280 and through the remaining grain in grain bin 12, to the lower portion of continuous track 280.

Alternative Arrangement:

Although some arrangements shown in FIGS. 1-61 may be primarily illustrated and/or described with reference to a continuous track 280 formed by interconnected links 300 and/or tracks 302, the embodiments are not so limited. Rather, it is contemplated that in some various arrangements, continuous track 280 may include various types of tracks including but not limited to, for example, molded track (e.g., formed by a belt of flexible material), interconnected tracks, tracks on a chain, and/or any other track arrangement.

Figure 71:
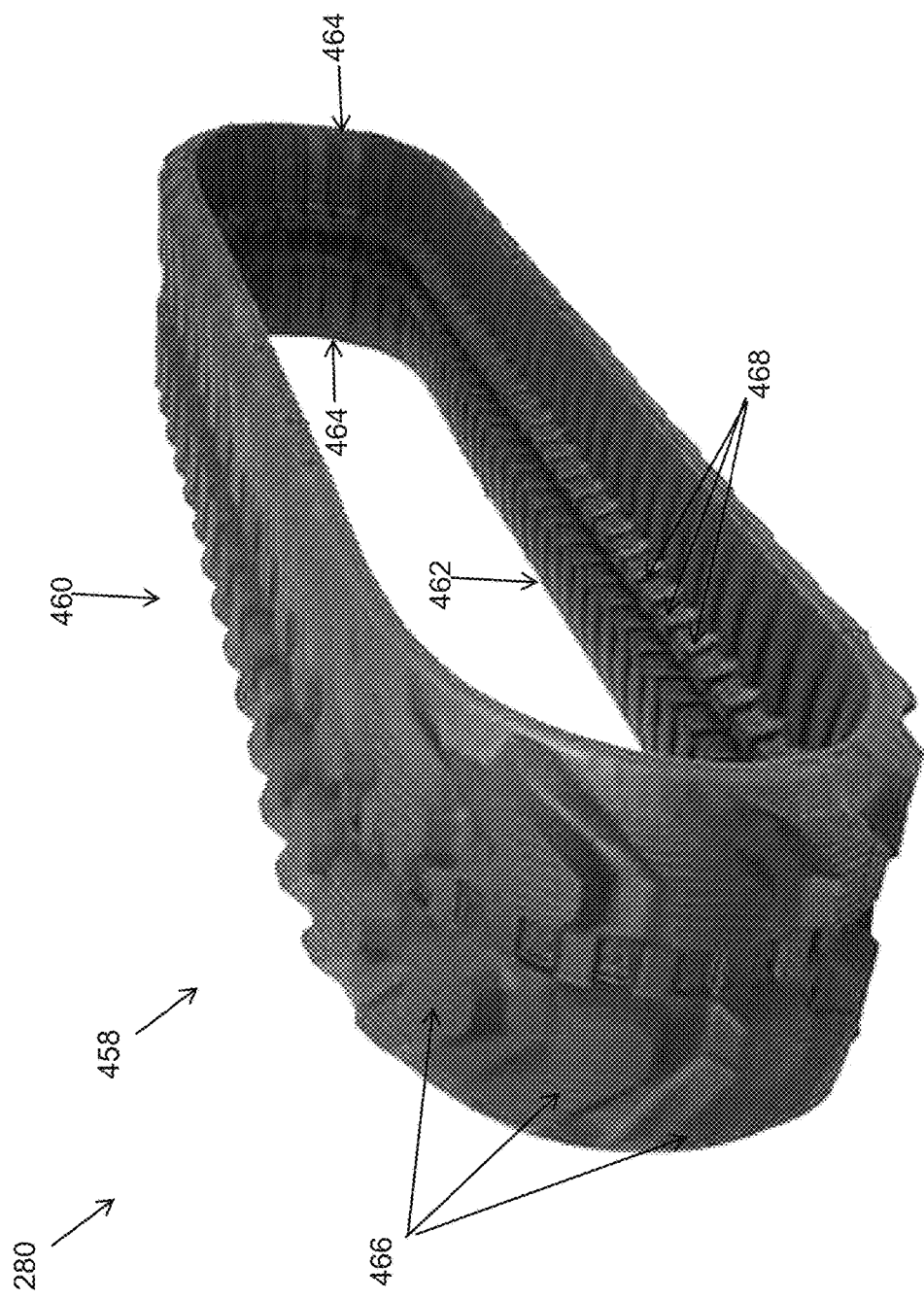
FIG. 71 shows a perspective shaded view of a continuous track of a sweep of an exemplary sweep system, in accordance with one or more embodiments; the view showing the continuous track having a flexible belt, an exterior surface, an interior surface, opposing side edges, treads, and teeth.
Figure 72:
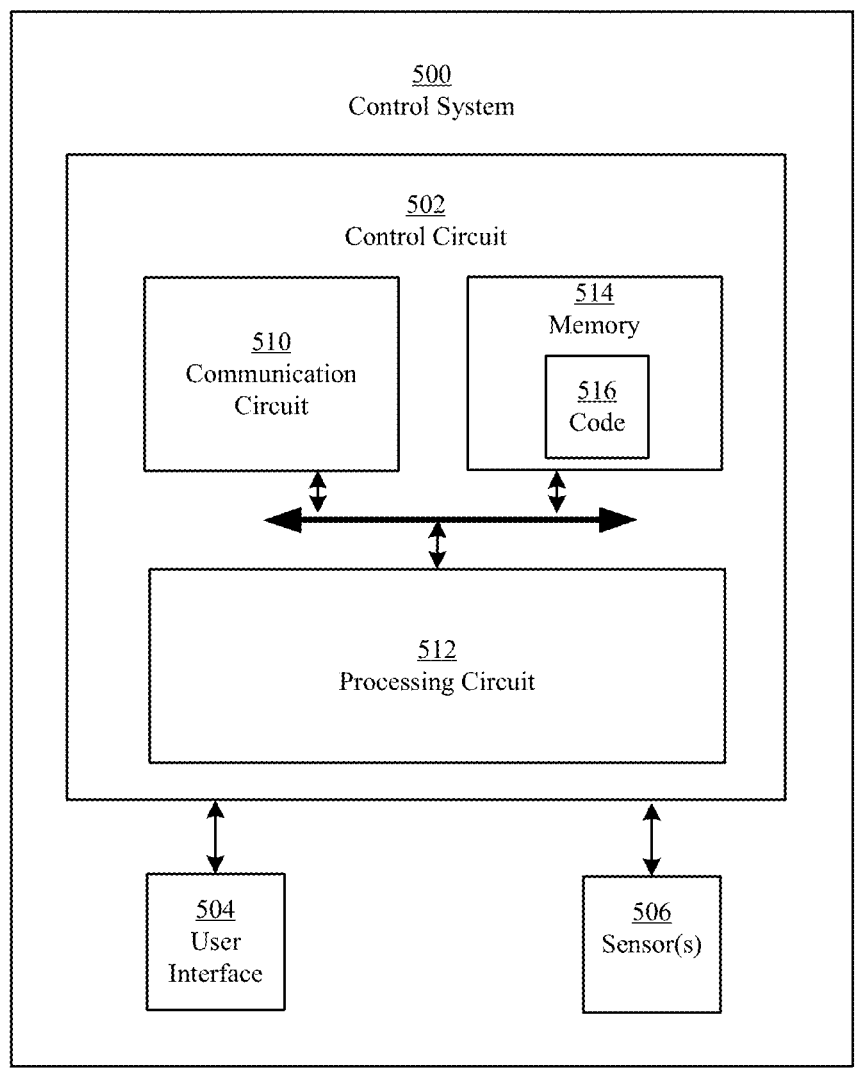
FIG. 72 shows an example control system for use in a track driven sweep system for grain bins, in accordance with one or more embodiments.

With reference to FIG. 71, another alternative arrangement of system 10 is presented. This alternative arrangement presented in FIG. 71 is similar to the system 10 presented in FIGS. 1-70 and therefore unless specifically stated otherwise herein, the prior teaching and disclosure shown in FIGS. 1-70 applies equally to the alternative arrangement shown in FIG. 71. That is, the arrangement shown in FIG. 71, system 10 includes similar if not identical components as the arrangements shown in FIGS. 1-70 with the primary differences pertaining to the continuous track 280.

In one or more arrangements, system 10 includes a track-driven drive system 46 having continuous track 280 implemented by a molded track. FIG. 71 shows an example molded track that may be used to form continuous track 280 in one or more arrangements. In the example arrangement shown, continuous track 280 is a molded track configured to rotate on sprockets to support sweep 28 and facilitate movement of sweep 28 when rotated. In this example arrangement, continuous track 280 is formed of a flexible belt 458 configured to rotate on front drive sprocket 286 and rear drive sprocket 282. In this example arrangement, flexible belt 458 is formed of an elongated strip of flexible material having an exterior surface 460 and an interior surface 462 extending between opposing side edges 464 and connected in a loop.

In this example arrangement, continuous track 280 includes a set of treads 466 formed on exterior surface 460. Treads 466 are formed of any suitable size, shape, and design and are configured to facilitate frictional engagement of continuous track 280 with elevated floor 20 of grain bin 12 to facilitate movement of sweep 28 when continuous track 280 is rotated. In the arrangement shown, as one example, treads 466 are rectangular shaped protrusions positioned in a symmetrical angled pattern. However, the embodiments are not so limited. Rather, it is contemplated that in some various different arrangements, continuous track 480 may have various different type of treads 466 including but not limited to, for example, protrusions, recesses, grooves, knobs, grousers, and/or any other type, shape, and/or pattern of treads.

In one or more arrangements, treads 466 may be shaped to facilitate movement of grain inward when continuous track 480 is rotated. For example, in one or more arrangements, treads 466 may have a shape and angled orientation similar to angled paddles 330 of tracks 302 of continuous track 480 discussed with reference to FIGS. 62-70. In one or more arrangements, continuous track 480 may additionally or alternatively have treads 466 positioned on interior surface 462 to facilitate inward movement of grain that becomes positioned within continuous track 480 between front drive sprocket 286 and rear drive sprocket 282.

Additionally or alternatively, in one or more arrangements, treads 466 may be configured to prevent damaging grain during operation. For example, in one or more arrangements, treads 466 may be shaped to encourage grains be move into channels between treads 466 so the grain will not be crushed between treads 466 and elevated floor 20 during operation. In one or more arrangements, treads 466 may include structural reinforcement to prevent the weight of sweep 28 from deforming the channels to an extent that grain in the channels would be damaged.

In the arrangement shown, continuous track 280 includes a row of teeth 468 extending along the length of the interior surface 462 of flexible belt 458. Teeth 468 are formed of any suitable size, shape, and design, and are configured to engage front drive sprocket 286 and rear drive sprocket 282 to facilitate rotation of continuous track 280 when track-driven drive system 46 is operated.

In some various different arrangements, continuous track 280 may be formed of various different materials to provide suitable frictional engagement with elevated floor 20 and sustain large stresses imposed by rotation of front drive sprocket 286 and/or rear drive sprocket 282 including but not limited to, for example, rubbers, polymers, fibers, and other reinforcement structures (e.g., steel belts).

From the above discussion it will be appreciated that the sweep system for grain bins improves upon the state of the art. More specifically, and without limitation, it will be appreciated that in one or more arrangements a sweep system for grain bins is provided: that utilizes a track-driven drive system to facilitate movement of a sweep; that utilizes a track-driven drive system having a continuous track; that utilizes a track-driven drive system having a continuous track with paddles attached thereto; that reduces or eliminates the need for a user to enter the grain bin; that works effectively; that is robust; that is durable; that can be used with all kinds of grain; that has a long useful life; that can be used with an elevated floor without damaging the elevated floor; that can be used with paddle sweeps, auger sweeps, and/or any other sweep mechanism; that effectively removes the vast majority of grain from the grain bin; that is efficient to use; that improves safety; that is high quality; and/or that helps to clear clumps in the grain, among other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A sweep system for a grain bin, comprising:
an elongated body extending from an inward end to an outward end;
a drive system;
the drive system having a chain;
the drive system having a first plurality of paddles connected to the chain;
wherein the drive system is operably connected adjacent the outward end of the elongated body;
wherein the drive system is configured to push the outward end of the elongated body around the grain bin thereby facilitating emptying of grain from the grain bin;
wherein the elongated body includes a paddle sweep type grain conveyor configured to move grain toward the inward end of the elongated body, wherein the paddle sweep type grain conveyor includes a second plurality of paddles.

2. The system of claim 1, wherein the chain of the drive system is configured to rotate thereby driving the outward end of the elongated body around the grain bin.

3. The system of claim 1, wherein each paddle of the first plurality of paddles is generally rectangular in shape.

4. The system of claim 1, wherein each paddle of the first plurality of paddles are oriented at an angle relative to the chain;
wherein the angle of the paddles causes grain to be moved inward toward the inward end of the sweep system.

5. The system of claim 1, wherein each paddle of the first plurality of paddles is comprised of one or more plates.

6. The system of claim 1, wherein the first plurality of paddles are formed of a first material, wherein the first material is non-metallic and is durable yet flexible in nature.

7. A sweep system for a grain bin, comprising:
an elongated body extending from an inward end to an outward end;
a drive system;
the drive system having a chain;
a plurality of paddles connected to the chain;
wherein the drive system is operably connected adjacent the outward end of the elongated body;
wherein the drive system is configured to push the outward end of the elongated body around the grain bin thereby facilitating emptying of grain from the grain bin;
wherein the chain rotates about one or more rollers and wherein rotation of the chain facilitates movement of the plurality of paddles.

8. The system of claim 1, further comprising:
a first sprocket;
wherein the first sprocket is operatively connected to the chain of the drive system;
wherein the first sprocket is configured to facilitate rotation of the chain of the drive system to facilitate driving of the sweep system around a floor of the grain bin.

9. The system of claim 1, further comprising:
a second sprocket;
wherein the second sprocket is operatively connected to the chain of the drive system;

wherein the second sprocket is configured to facilitate rotation of the chain of the drive system to facilitate driving of the sweep system around a floor of the grain bin.

10. The system of claim 1, wherein the sweep system includes a grain transportation system operably connected to the elongated body;
the grain transportation system configured to move grain toward the inward end;
wherein a single motor drives operation of the grain transportation system as well as the drive system.

11. The system of claim 1, wherein the sweep system includes a grain transportation system operably connected to the elongated body;
the grain transportation system configured to move grain toward the inward end;
wherein the grain transportation system is operated by a first motor and the drive system is operated by a second motor.

12. The system of claim 1, wherein the drive system is in contact with a floor of the grain bin such that the drive system pushes the elongated body around the floor of the grain bin.

13. A sweep system for a grain bin, comprising:
an elongated body extending from an inward end to an outward end;
a drive system;
the drive system having a chain;
a plurality of paddles connected to the chain;
wherein the drive system is operably connected adjacent the outward end of the elongated body;
wherein the drive system is configured to push the outward end of the elongated body around the grain bin thereby facilitating emptying of grain from the grain bin;
wherein the drive system is in engagement with a wear track on a floor of the grain bin as the elongated body rotates around the floor of the grain bin.

14. A sweep system for a grain bin, comprising:
an elongated body extending from an inward end to an outward end;
a drive system;
the drive system having a chain;
a plurality of paddles connected to the chain;
wherein the drive system is operably connected adjacent the outward end of the elongated body;
wherein the drive system is configured to push the outward end of the elongated body around the grain bin thereby facilitating emptying of grain from the grain bin
wherein the elongated body includes a paddle sweep type grain conveyor configured to move grain toward the inward end of the elongated body, wherein the paddle sweep type grain conveyor does not include the plurality of paddles.

15. A sweep system for a grain bin, comprising:
an elongated body extending from an inward end to an outward end;
a drive system;
the drive system having a chain;
a plurality of paddles connected to the chain;
wherein the drive system is operably connected adjacent the outward end of the elongated body;
wherein the drive system is configured to push the outward end of the elongated body around the grain bin thereby facilitating emptying of grain from the grain bin;
wherein the elongated body includes an auger type grain conveyor configured to move grain toward the inward end of the elongated body.

16. The system of claim 1, wherein the chain is formed by a plurality of interconnected segments of chain.

17. The system of claim 1, wherein the chain is formed by a plurality of segments operably connected together in a loop.

18. A sweep system for a grain bin, comprising:
a drive system;
the drive system having a continuous track;
the drive system having a first sprocket;
wherein the first sprocket is operatively connected to the continuous track of the drive system;
the drive system having a second sprocket;
wherein the second sprocket is operatively connected to the continuous track of the drive system;
an elongated body extending from an inward end to an outward end;
wherein the elongated body includes a grain conveyor configured to move grain toward the inward end of the elongated body;
wherein the drive system is operably connected to the outward end of the elongated body;
wherein the drive system is operably connected to an outward end of the sweep;
wherein the drive system is configured to push the outward end of the elongated body around the grain bin, thereby facilitating emptying of grain from the grain bin by the sweep system, by rotating the continuous track;
wherein when the continuous track is rotated, the track engages and rolls on an upper surface of the floor of the grain bin thereby pushing the outward end of the elongated body and rotating the elongated body around the floor of the grain bin.

19. The system of claim 18, wherein the continuous track is formed by a plurality of interconnected segments.

20. The system of claim 18, wherein the continuous track is formed by a plurality of segments operably connected together in a loop.

21. The system of claim 18, wherein the continuous track includes a continuous chain and plurality of tracks operably connected to the continuous chain.

22. The system of claim 18, wherein the continuous track includes a continuous chain and plurality of paddles operably connected to the continuous chain.

23. The system of claim 18, wherein the continuous track is a molded track formed of a belt of flexible material connected in a loop.

24. The system of claim 18, wherein the continuous track is a unitary molded track formed of a flexible material.

25. A sweep system for a grain bin, comprising:
an elongated body;
the elongated body extending a length from an inward end to an outward end;
a grain transportation system operably connected to the elongated body;
the grain transportation system configured to move grain toward a center of the grain bin as the elongated body rotates around a floor of the grain bin;
a drive system;
the drive system positioned adjacent the outward end of the elongated body;
the drive system having a track extending in a loop
wherein when the track is rotated, the track engages an upper surface of the floor of the grain bin thereby rotating the elongated body around the floor of the grain bin.

26. A sweep system for a grain bin, comprising:

an elongated body;

the elongated body extending a length from an inward end to an outward end;

a grain transportation system operably connected to the elongated body;

the grain transportation system configured to move grain toward a center of the grain bin as the elongated body rotates around a floor of the grain bin;

a drive system;

the drive system positioned adjacent the outward end of the elongated body;

the drive system having a track extending in a loop wherein when the track is rotated, the track engages the floor of the grain bin thereby rotating the elongated body around the floor of the grain bin;

wherein the track includes a continuous chain and a plurality of paddles attached to the continuous chain.

* * * * *